(12) United States Patent
Bian et al.

(10) Patent No.: US 12,483,770 B2
(45) Date of Patent: Nov. 25, 2025

(54) DRIVE APPARATUS AND CAMERA MODULE

(71) Applicant: NINGBO SUNNY OPOTECH CO., LTD., Ningbo (CN)

(72) Inventors: Qianglong Bian, Ningbo (CN); Jinjun Zhao, Ningbo (CN); Xueying Zheng, Ningbo (CN); Xi Rao, Ningbo (CN)

(73) Assignee: NINGBO SUNNY OPOTECH CO., LTD., Ningbo (CN)

( * ) Notice: Subject to any disclaimer, the term of this patent is extended or adjusted under 35 U.S.C. 154(b) by 324 days.

(21) Appl. No.: 18/266,299

(22) PCT Filed: Dec. 10, 2021

(86) PCT No.: PCT/CN2021/137009
§ 371 (c)(1),
(2) Date: Jun. 9, 2023

(87) PCT Pub. No.: WO2022/122008
PCT Pub. Date: Jun. 16, 2022

(65) Prior Publication Data
US 2024/0048830 A1  Feb. 8, 2024

(30) Foreign Application Priority Data

Dec. 11, 2020 (CN) .......................... 202011459096.X
Dec. 11, 2020 (CN) .......................... 202011462276.3

(51) Int. Cl.
*H04N 23/54* (2023.01)
*G03B 13/32* (2021.01)
*H04N 23/68* (2023.01)

(52) U.S. Cl.
CPC ............. *H04N 23/54* (2023.01); *G03B 13/32* (2013.01); *H04N 23/685* (2023.01)

(58) Field of Classification Search
CPC .... H04N 23/54; H04N 23/685; H04N 23/687; H04N 23/57; G02B 7/08; G02B 27/646; G03B 13/32
See application file for complete search history.

(56) References Cited

U.S. PATENT DOCUMENTS

2015/0296112 A1* 10/2015 Park ...................... G02B 7/08
348/208.7
2016/0070115 A1* 3/2016 Miller ...................... G03B 5/02
359/557

(Continued)

FOREIGN PATENT DOCUMENTS

CN      103826053 A      5/2014
CN      105137696 A      12/2015

(Continued)

*Primary Examiner* — Twyler L Haskins
*Assistant Examiner* — John H Morehead, III
(74) *Attorney, Agent, or Firm* — Che-Yang Chen

(57) ABSTRACT

The present disclosure provides a driving device and a camera module, wherein the driving device includes an auto-focus assembly and an optical image stabilizing assembly, the auto-focus assembly includes a focusing base, a focusing actuator and a fixed base, the focusing actuator includes at least one focusing coil and at least one focusing magnet disposed on an outer sidewall of the focusing base, the focusing coil is supported by the fixed base and corresponds to the focusing magnet so as to drive the lens to move along an optical axis direction of the lens by the focusing base in a case where the focusing coil is energized; and the optical image stabilizing assembly is supported by the fixed base and is transmissibly connected to the imaging assembly, so that the optical image stabilizing assembly drives the imaging assembly for vibration compensation.

13 Claims, 29 Drawing Sheets

(56) References Cited

U.S. PATENT DOCUMENTS

| | | | |
|---|---|---|---|
| 2016/0241787 A1* | 8/2016 | Sekimoto | G02B 7/09 |
| 2019/0101771 A1* | 4/2019 | Takimoto | G03B 13/36 |
| 2019/0339542 A1* | 11/2019 | Murakami | H04N 23/687 |
| 2020/0052621 A1* | 2/2020 | Yu | G03B 3/10 |
| 2020/0209711 A1* | 7/2020 | Tseng | H04N 23/57 |

FOREIGN PATENT DOCUMENTS

| | | | |
|---|---|---|---|
| CN | 105573014 A * | 5/2016 | G03B 13/36 |
| CN | 106899192 A | 6/2017 | |
| CN | 107329348 A | 11/2017 | |
| CN | 108153081 A | 6/2018 | |
| CN | 111650715 A | 9/2020 | |
| CN | 111880278 A | 11/2020 | |
| JP | 2015141389 A | 8/2015 | |
| KR | 20150104009 A | 9/2015 | |

\* cited by examiner

DRIVE APPARATUS AND CAMERA MODULE

CROSS REFERENCE OF RELATED APPLICATION

This is a U.S. National Stage under 35 U.S.C. 371 of the International Application Number PCT/CN2021/137009, filed on Dec. 10, 2021, which claims priority to Chinese Patent Applications No. CN202011462276.3, filed on Dec. 11, 2020, and No. CN202011459096.X, filed on Dec. 11, 2020, the contents of which are incorporated herein by reference in their entireties.

FIELD OF INVENTION

The present disclosure relates to camera technology, more particularly to a driving device and a camera module.

DESCRIPTION OF RELATED ARTS

With the increasing demand of consumers for mobile phone photography, the functions of mobile phone camera (i.e. camera module) are becoming more and more plentiful. Portrait shooting, long-distance shooting, optical zoom, optical image stabilization, and other functions are integrated into the camera with limited volume, and the auto-focus and optical image stabilization functions often need to be realized by optical actuators (or motors).

Auto Focus (AF) is under the principle of object light reflection, and the reflected light is received by the sensor CCD on the camera, which is processed by the computer to drive the electric focusing device to focus. Optical Image Stabilization (OIS) means that in cameras or other similar imaging instruments, the setting of optical components, such as lens settings, can avoid or reduce the phenomenon of instrument vibration in the process of capturing optical signals, thus improving the imaging quality. Optical image stabilization is employed with the special lens or CCD photosensitive element structure to avoid image instability caused by the operator due to vibration in the using process to the greatest extent.

With the higher and higher requirements of imaging quality of mobile phone camera module, the volume and weight of the lens are getting bigger and bigger, and the driving force of the motor is getting higher and higher. However, the current electronic devices (such as mobile phones) also have great limitations on the volume of the camera module, and the occupied volume of the motor increases with the increase of the lens. In other words, with the development of the lens to a larger volume and weight, the driving force provided by the motor is difficult to increase accordingly. On the premise of the limited driving force, the heavier the lens, the shorter the travel that the motor can drive the lens to move, which affects the focusing and anti-vibration ability. On the other hand, the heavier the lens, the slower the motor can drive the lens to move, and the longer it takes the lens to reach the predetermined compensation position, which also affects the focusing and anti-vibration effects. On the other hand, the motor mechanism is complicated, the number of components increases, and the thickness of the device body tends to increase.

With the increasing requirement of miniaturization of mobile devices, the density of internal components of the motor also increases. Magnets and coils are arranged in the motor to generate the necessary magnetic field to drive the lens to move, and the magnetic field force is employed to drive the lens to move, thus realizing optical focusing and optical image stabilization. In a case where the distance between the two magnets in the motor is too close (less than 7 mm), the internal magnetic field will influence each other, which will lead to the displacement or vibration of the magnets and affect the focusing and imaging quality of the lens.

SUMMARY OF THE PRESENT INVENTION

A main advantage of the present disclosure is to provide a driving device and a camera module, wherein the driving device has optical image stabilization and auto-focus functions, which is beneficial to improve the shooting effect and imaging quality of the camera module.

Another advantage of the present disclosure is to provide a driving device and a camera module, wherein the driving device includes an auto-focus assembly and an optical image stabilizing assembly, the auto-focus assembly and the optical image stabilizing assembly are separately arranged with a simple structure, larger anti-vibration travel, thereby compensating the larger vibration of the camera module.

Another advantage of the present disclosure is to provide a driving device and a camera module, wherein the driving device includes a focusing magnet and an anti-vibration magnet, wherein the focusing magnet and the anti-vibration magnet are located around a motor to avoid magnetic interference.

Another advantage of the present disclosure is to provide a driving device and a camera module, wherein the driving device can combine the lens focusing with the chip anti-vibration, which can make the motor structure simple and improve the anti-vibration travel of the camera module, thereby compensating the larger vibration of the camera module.

Another advantage of the present disclosure is to provide a driving device and a camera module, wherein the anti-vibration of the driving device is designed in a single-layer roller manner, the roller is employed to maintain the distance between the movable portion and the fixed portion, and the friction force between the movable portion and the fixed portion is reduced.

Another advantage of the present disclosure is to provide a driving device and a camera module, wherein the anti-vibration component of the driving device drives the photosensitive chip to move on a plane perpendicular to the optical axis of the lens and rotate around the optical axis of the lens to realize the movement of multiple degrees of freedom, so as to compensate image blurring caused by vibration, which is beneficial to improve imaging quality.

Other advantages and features of the present disclosure are fully embodied by the following detailed description and may be achieved by combinations of means and devices particularly pointed out in the appended claims.

According to one aspect of the present disclosure, a driving device of the present disclosure capable of achieving the aforementioned and other purposes and advantages is adapted to a camera module, wherein the camera module further includes a lens and an imaging assembly, the driving device including:

an auto-focus assembly, wherein the auto-focus assembly includes a focusing base, a focusing actuator, and a fixed base, wherein the focusing actuator includes at least one focusing coil and at least one focusing magnet disposed on an outer sidewall of the focusing base, and the focusing coil is supported by the fixed base and corresponds to the focusing magnet so as to drive the lens to move along an optical axis direction of the lens by the focusing base in a case where the focusing coil is energized; and an optical image stabilization assembly, wherein the optical image stabilization assembly includes a vibration compensation base and a vibration compensation actuator, wherein the vibration compensation actuator includes at least one vibration compensation coil and at least one vibration compensation magnet supported on the bottom of the fixed base, wherein the vibration compensation coil is disposed on the vibration compensation base and corresponding to the vibration compensation magnet for driving the imaging assembly to move by the vibration compensation base in a case where the vibration compensation coil is energized.

According to at least one embodiment of the present disclosure, the focusing actuator further includes a focusing substrate, wherein the focusing coil is electrically connected to the focusing substrate, whereby the focusing substrate is electrically connected to the focusing coil to the imaging assembly.

According to at least one embodiment of the present disclosure, the fixed base includes a base plate and at least one supporting sidewall integrally extended upward from the outer side of the base plate, the fixed base is further provided with an actuator mounting portion, the actuator mounting portion is formed on the supporting sidewall, the focusing coil is disposed on the actuator mounting portion of the fixed base, and the focusing substrate is attached to the supporting sidewall.

According to at least one embodiment of the present disclosure, the auto-focus assembly further includes at least one focusing roller unit, at least one roller rail groove is disposed between the focusing base and the fixed base, the focusing roller unit is disposed in the roller rail groove, the distance between the focusing base and the fixed base is supported and maintained by the focusing roller unit, and the movement of the focusing base relative to the fixed base along the optical axis direction is provided.

According to at least one embodiment of the present disclosure, the vibration compensation actuator further includes a vibration compensation substrate, wherein the vibration compensation substrate is electrically connected to the vibration compensation coil of the vibration compensation actuator.

According to at least one embodiment of the present disclosure, the vibration compensation magnet further includes three vibration compensation magnet groups, the vertical plane of the first vibration compensation magnet group is corresponding to the vertical plane of the focusing magnet, the vertical plane of the second vibration compensation magnet group is corresponding to the vertical plane of the third vibration compensation magnet group, and is located on two sides of the first vibration compensation magnet group.

According to at least one embodiment of the present disclosure, the vibration compensation coil is disposed on the vibration compensation substrate, wherein the vibration compensation substrate is disposed on the upper surface of the vibration compensation base in a direction perpendicular to the optical axis.

According to at least one embodiment of the present disclosure, the vibration compensation coil further includes a first vibration compensation coil unit, a second vibration compensation coil unit, a third vibration compensation coil unit, a fourth vibration compensation coil unit, and a fifth vibration compensation coil unit, the first vibration compensation coil unit is disposed on a side facing to the first vibration compensation magnet group, the second vibration compensation coil unit, the third vibration compensation coil unit is disposed on a side facing to the second vibration compensation magnet group, and the fourth vibration compensation coil unit and the fifth vibration compensation coil unit are disposed on a side facing to the third vibration compensation magnet group.

According to at least one embodiment of the present disclosure, the optical image stabilization assembly further includes at least one vibration magnetic induction member, the vibration magnetic induction member is electrically connected to the vibration compensation substrate, and the vibration magnetic induction member is disposed face to face with the vibration compensation magnet groups.

According to at least one embodiment of the present disclosure, the optical image stabilization assembly further includes at least one anti-vibration roller, the anti-vibration roller is disposed between the vibration compensation base and the fixed base for supporting and maintaining a distance between the vibration compensation base and the fixed base.

According to at least one embodiment of the present disclosure, the device further includes an outer frame, the outer frame further includes a housing fixed to an upper end of the fixed base, a bottom frame fixed to a lower end of the fixed base, and a protective space formed by the housing and the bottom frame, and the auto-focus assembly and the optical image stabilization assembly are held in the protective space of the outer frame.

According to at least one embodiment of the present disclosure, the vibration compensation coil further includes a sixth vibration compensation coil unit, the first vibration compensation coil unit and the sixth vibration compensation coil unit are disposed on the same side of the vibration compensation base.

According to at least one embodiment of the present disclosure, the auto-focus assembly further includes a focusing yoke, the focusing yoke is disposed on the focusing substrate and located on the opposite side of the focusing coil, the optical image stabilization assembly further includes at least one anti-vibration yoke, and the anti-vibration yoke is disposed on the vibration compensation base and located on the opposite side of the vibration compensation coil.

According to at least one embodiment of the present disclosure, the auto-focus assembly further includes at least one focusing reset member, one end of the focusing reset member is fixed to the focusing base, the other end of the focusing reset member is fixed to the fixed base, the optical image stabilization assembly further includes at least one anti-vibration reset member, one end of the anti-vibration reset member is fixed to the vibration compensation base, and the other end of the anti-vibration reset member is fixed to the fixed base.

According to at least one embodiment of the present disclosure, the outer frame of the driving device further includes at least one frame roller, the frame roller is disposed between the bottom frame and the vibration compensation base, so as to reduce friction between the bottom frame and the vibration compensation base by the frame roller.

According to another aspect of the present disclosure, the present disclosure further provides a camera module including:

a driving device; and an imaging assembly and a lens, wherein the lens and the imaging assembly are movably disposed on the driving device, the driving device drives the lens to move along an optical axis direction of the lens, and drives the imaging assembly to rotate in a direction perpendicular to and/or around the optical axis; and the driving device further includes:

an auto-focus assembly, wherein the auto-focus assembly includes a focusing base, a focusing actuator and a fixed base, wherein the focusing actuator includes at least one focusing coil and at least one focusing magnet disposed on an outer sidewall of the focusing base, and the focusing coil is supported by the fixed base and corresponds to the focusing magnet so as to drive the lens to move along an optical axis direction of the lens by the focusing base in a case where the focusing coil is energized; and an optical image stabilization assembly, wherein the optical image stabilization assembly includes a vibration compensation base and a vibration compensation actuator, wherein the vibration compensation actuator includes at least one vibration compensation coil and at least one vibration compensation magnet supported on the bottom of the fixed base, wherein the vibration compensation coil is disposed on the vibration compensation base and corresponding to the vibration compensation magnet for driving the imaging assembly to move by the vibration compensation base in a case where the vibration compensation coil is energized.

According to at least one embodiment of the present disclosure, the imaging assembly includes a filter assembly and a circuit board assembly, the circuit board assembly is disposed below the filter assembly along an optical axis direction, and the filter assembly of the imaging assembly is fixed to the optical image stabilization assembly, and the imaging assembly filter assembly and the circuit board assembly are driven by the optical image stabilization assembly.

According to at least one embodiment of the present disclosure, the filter assembly includes a filter supporter and at least one filter mounted on the filter supporter. The circuit board assembly includes a circuit board, at least one photosensitive chip, and at least one electronic component mounted on the surface of the circuit board, wherein the electronic component is located outside the photosensitive chip.

According to at least one embodiment of the present disclosure, the vibration compensation base further includes a supporting leg, the supporting leg is extended integrally downward from the base body, and the supporting leg is connected to the imaging assembly.

According to at least one embodiment of the present disclosure, the camera module further includes a first connecting belt and a second connecting belt, the focusing substrate is electrically connected to the imaging assembly by the first connecting belt, and the vibration compensation substrate is electrically connected to the imaging assembly by the second connecting belt.

According to at least one embodiment of the present disclosure, the first connecting belt and the second connecting belt are flexible circuit boards.

According to at least one embodiment of the present disclosure, the focusing substrate and the vibration compensation substrate are in separate structure, and the focusing substrate is in a vertical structure, and the vibration compensation substrate is in a horizontal structure.

According to one aspect of the present disclosure, the present disclosure further provides a driving device adapted to a camera module, wherein the camera module further includes a lens and an imaging assembly, including:

an auto-focus assembly, wherein the auto-focus assembly includes a focusing base, a focusing actuator and a fixed base, wherein the focusing actuator includes at least one focusing coil disposed on a sidewall of the focusing base, and at least one focusing magnet disposed on the focusing base and corresponds to the focusing coil, so as to drive the lens to move along an optical axis direction of the lens by the focusing base in a case where the focusing coil is energized; and an optical image stabilization assembly, wherein the optical image stabilization assembly includes a vibration compensation base and a vibration compensation actuator, the vibration compensation actuator includes at least one vibration compensation coil and at least one vibration compensation magnet, the vibration compensation magnet is disposed on the inner sidewall of the vibration compensation base, the vibration compensation coil is supported by the fixed base and corresponds to the vibration compensation magnet, so that in a case where the vibration compensation coil is energized, the vibration compensation magnet is driven by the vibration compensation coil and the imaging assembly is driven by the vibration compensation magnet to compensate the vibration.

According to at least one embodiment of the present disclosure, the focusing actuator further includes a focusing substrate, wherein the focusing coil is electrically connected to the focusing substrate, wherein the focusing substrate is disposed on an outer sidewall of the fixed base.

According to at least one embodiment of the present disclosure, the fixed base includes a base plate and at least one supporting sidewall integrally extended upward from the outer side of the base plate, the fixed base is further provided with an actuator mounting portion, the actuator mounting portion is formed on the supporting sidewall, the focusing coil is disposed on the actuator mounting portion of the fixed base, and the focusing substrate is attached to the supporting sidewall.

According to at least one embodiment of the present disclosure, the auto-focus assembly further includes at least one focusing roller unit, at least one roller rail groove is disposed between the focusing base and the fixed base, the focusing roller unit is disposed in the roller rail groove, the distance between the focusing base and the fixed base is supported and maintained by the focusing roller unit, and the movement of the focusing base relative to the fixed base along the optical axis direction is provided.

According to at least one embodiment of the present disclosure, the vibration compensation actuator further includes a vibration compensation substrate, wherein the vibration compensation substrate is electrically connected to the vibration compensation coil of the vibration compensation actuator.

According to at least one embodiment of the present disclosure, the fixed base has a first outer sidewall, a second outer sidewall, a third outer sidewall and a fourth outer sidewall, the focusing coil is disposed on the first outer sidewall of the fixed base, and the vibration compensation substrate is disposed on the second outer sidewall, the third outer sidewall and the fourth outer sidewall of the fixed base.

According to at least one embodiment of the present disclosure, the vibration compensation coil and the focusing coil are located in the same horizontal plane.

According to at least one embodiment of the present disclosure, the vibration compensation magnet further includes three vibration compensation magnet groups, wherein the first vibration compensation magnet group faces the second lateral wall of the fixed base, the second vibration compensation magnet group faces the third lateral wall of the fixed base, and the third vibration compensation magnet group faces the fourth lateral wall of the fixed base.

According to at least one embodiment of the present disclosure, the vibration compensation coil further includes a first vibration compensation coil unit, a second vibration compensation coil unit, a third vibration compensation coil unit, a fourth vibration compensation coil unit and a fifth vibration compensation coil unit, the first vibration compensation coil unit is disposed on a side facing to the first vibration compensation magnet group, the second vibration compensation coil unit, the third vibration compensation coil unit is disposed on a side facing to the second vibration compensation magnet group, and the fourth vibration compensation coil unit and the fifth vibration compensation coil unit are disposed on a side facing to the third vibration compensation magnet group.

According to at least one embodiment of the present disclosure, the vibration compensation coil further includes a sixth vibration compensation coil unit, and the first vibration compensation coil unit and the sixth vibration compensation coil unit are disposed on the same side of the vibration compensation base.

According to at least one embodiment of the present disclosure, the optical image stabilization assembly further includes at least one anti-vibration roller, the anti-vibration roller is disposed between the vibration compensation base and the fixed base for supporting and maintaining a distance between the vibration compensation base and the fixed base.

According to at least one embodiment of the present disclosure, the device further includes an outer frame, the outer frame further includes a housing fixed to an upper end of the fixed base, a bottom frame fixed to a lower end of the fixed base, and a protective space formed by the housing and the bottom frame, and the auto-focus assembly and the optical image stabilization assembly are held in the protective space of the outer frame.

According to at least one embodiment of the present disclosure, the outer frame of the driving device further includes at least one frame roller, the frame roller is disposed between the bottom frame and the vibration compensation base, so as to reduce friction between the bottom frame and the vibration compensation base by the frame roller.

According to at least one embodiment of the present disclosure, the vibration compensation substrate and the focusing substrate are flexible circuit boards.

According to another aspect of the present disclosure, the present disclosure further provides a camera module including:
  a driving device, and
  an imaging assembly and a lens, wherein the lens and the imaging assembly are movably disposed on the driving device, the driving device drives the lens to move along an optical axis direction of the lens, and drives the imaging assembly to rotate in a direction perpendicular to and/or around the optical axis; and the driving device further includes:
  an auto-focus assembly, wherein the auto-focus assembly includes a focusing base, a focusing actuator and a fixed base, wherein the focusing actuator includes at least one focusing coil disposed on a sidewall of the focusing base, and at least one focusing magnet disposed on the focusing base and corresponds to the focusing coil, so as to drive the lens to move along an optical axis direction of the lens by the focusing base in a case where the focusing coil is energized; and
  an optical image stabilization assembly, wherein the optical image stabilization assembly includes a vibration compensation base and a vibration compensation actuator, the vibration compensation actuator includes at least one vibration compensation coil and at least one vibration compensation magnet, the vibration compensation magnet is disposed on the inner sidewall of the vibration compensation base, the vibration compensation coil is supported by the fixed base and corresponds to the vibration compensation magnet, so that in a case where the vibration compensation coil is energized, the vibration compensation magnet is driven by the vibration compensation coil and the imaging assembly is driven by the vibration compensation magnet to compensate the vibration.

According to at least one embodiment of the present disclosure, the imaging assembly includes a filter assembly and a circuit board assembly, the circuit board assembly is disposed below the filter assembly along an optical axis direction, the filter assembly of the imaging assembly is fixed to the optical image stabilization assembly, and the imaging assembly filter assembly and the circuit board assembly are driven by the optical image stabilization assembly.

According to at least one embodiment of the present disclosure, the filter assembly includes a filter supporter and at least one filter mounted on the filter supporter. The circuit board assembly includes a circuit board, at least one photosensitive chip and at least one electronic component mounted on the surface of the circuit board, wherein the electronic component is located outside the photosensitive chip.

According to at least one embodiment of the present disclosure, the circuit board is transmissibly connected to the vibration compensation base of the optical image stabilization assembly, and the vibration compensation base drives the circuit board of the imaging assembly to move or rotate in a specific direction.

According to at least one embodiment of the present disclosure, the focusing substrate and the vibration compensation substrate are in separate structure, and the focusing substrate is in a vertical structure, and the vibration compensation substrate is in a horizontal structure.

According to at least one embodiment of the present disclosure, the camera module further includes a first connecting belt and a second connecting belt, the focusing substrate is electrically connected to the imaging assembly by the first connecting belt, and the vibration compensation substrate is electrically connected to the imaging assembly by the second connecting belt.

According to at least one embodiment of the present disclosure, the first connecting belt and the second connecting belt are flexible circuit boards.

Further objects and advantages of the present disclosure will be fully embodied by understanding the following description and accompanying drawings.

These and other objects features and advantages of the present disclosure are fully embodied by the following detailed description drawings and claims.

DETAILED DESCRIPTION OF THE EMBODIMENTS

Figure 1:
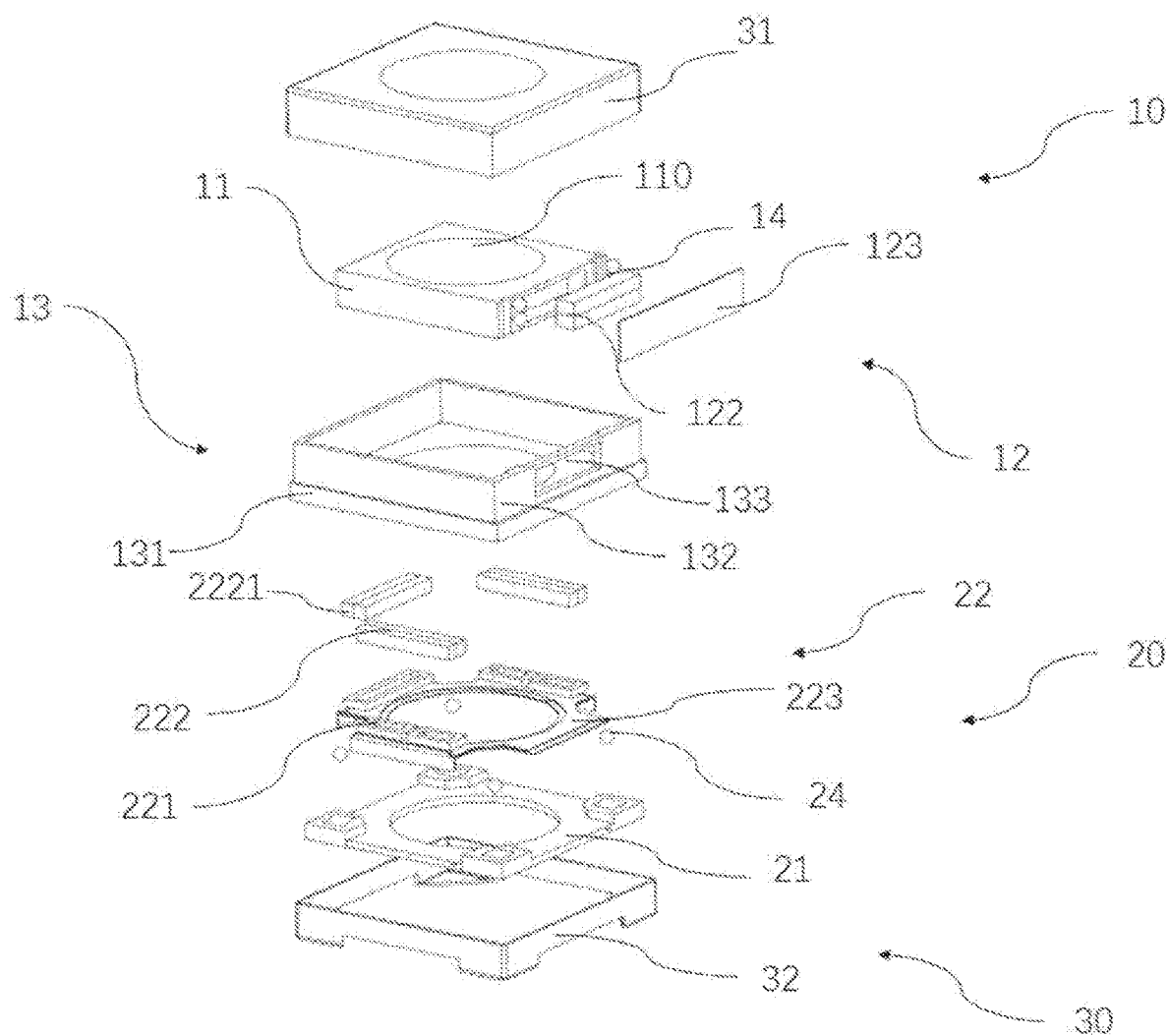
FIG. 1 is an exploded schematic view of a driving device according to a preferred embodiment of the present disclosure.

The following description is intended to disclose the present disclosure to enable those skilled in the art to practice the present disclosure. The preferred embodiments in the following description are by way of example only and other obvious variations are conceivable to those skilled in the art. The basic principles of the present disclosure as defined in the following description may be applied to other embodiments, variations, modifications, equivalents, and other technical solutions that do not depart from the spirit and scope of the present disclosure.

It will be understood by those skilled in the art that, in the disclosure of the present disclosure, the terms "longitudinal", "transverse", "up". "down". "front", "back", "left", "right", "vertical", "horizontal", "top", "bottom", "inside". "outside" and the like indicate orientation or positional relationships based on the orientation or positional relationships shown in the accompanying drawings and are intended only for ease of description and simplification of the description, and are not intended to indicate or imply that the device or element referred to must have, be constructed and operated in a particular orientation, so the above terms cannot be understood as limiting to the present disclosure.

It is understood that the term "a" should be understood as "at least one" or "one or more", i.e. in one embodiment, the number of an element may be one, while in other embodiments, the number of elements may be multiple, and the article "a" cannot be understood as limiting the number.

A driving device according to a first preferred embodiment of the present disclosure is illustrated in the following description with reference to FIGS. 1 to 10 of the drawings in the specification of the present disclosure. The driving device is adapted for a lens. The driving device drives a lens of a camera module and/or drives an imaging assembly of a camera module to move based on an optical axis O of the lens. The driving device has optical image stabilization and auto-focus functions. The driving device includes an auto-focus assembly 10 and an optical image stabilizing assembly 20, wherein the auto-focus assembly 10 drives the lens body to move along the optical axis direction to realize auto-focus, wherein the optical image stabilizing assembly 20 drives the imaging assembly to move perpendicular to the optical axis direction and/or rotate around the optical axis direction of the lens to realize optical image stabilization.

It is worth to mention that, in the preferred embodiment of the present disclosure, the optical image stabilization function and the auto-focus function of the driving device are separately arranged, so that not only the structure is simple, but also a larger anti-vibration travel can be obtained, so that a larger vibration of the camera module can be compensated.

In detail, the auto-focus assembly 10 includes a focusing base 11 and a focusing actuator 12, wherein the lens of the camera module is disposed on the focusing base 11, the focusing base 11 is transmissibly connected to the focusing actuator 12, and the focusing base 11 is driven to move by the focusing actuator 12. The focusing base 11 is driven by the focusing actuator 12 to drive the lens to move along the optical axis direction so as to realize optical focusing.

The lens of the camera module is disposed on the focusing base by glue, buckle or thread. Preferably, the lens and the focusing base 11 have an integrated structure, that is, the focusing base 11 is a lens barrel of the lens, and the optical components of the lens, such as optical lenses, are arranged on the focusing base 11. The focusing base 11 can also be defined as a carrier to drive the lens to move to realize auto-focusing. It will be understood by those skilled in the art that the integrated structure can reduce the size of the lens barrel in the lens and reduce the gap between the lens barrel and the carrier, thus achieving the beneficial effect of reducing the size of the imaging module.

The focusing base 11 has a lens aperture 110, wherein the lens is disposed on the lens aperture 110 of the focusing base 11, or the optical component of the lens is disposed on the lens aperture 110 of the focusing base 11.

Figure 2:
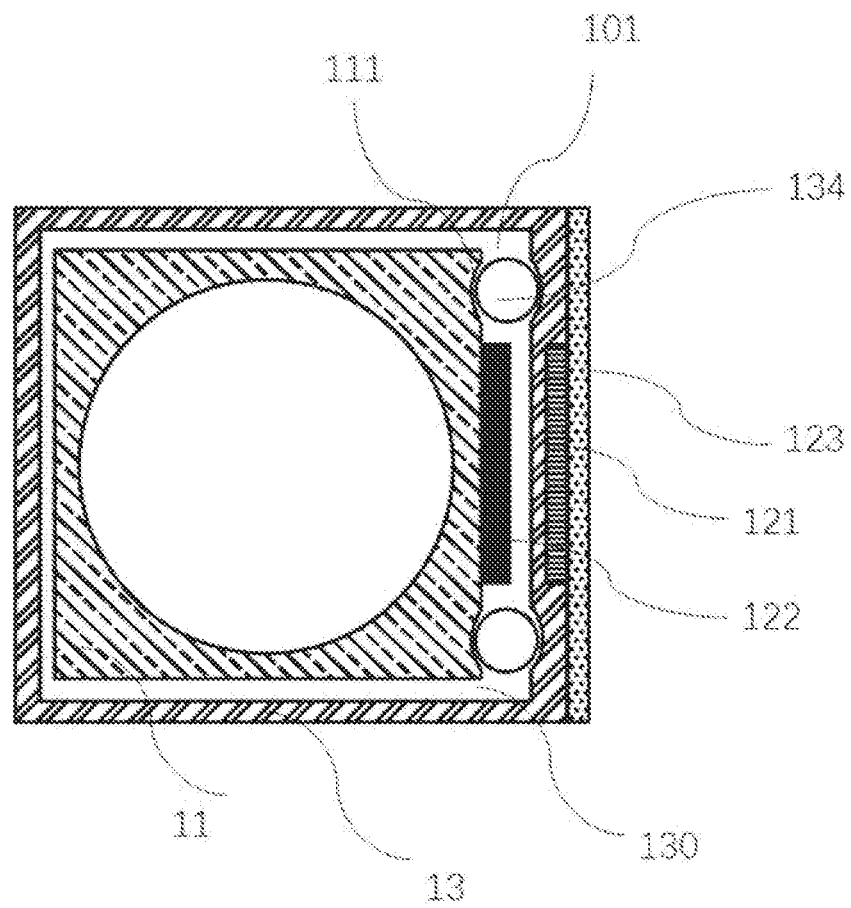
FIG. 2 is a cross-sectional view of the driving device in a direction perpendicular to the optical axis according to the preferred embodiment of the present disclosure.

As shown in FIG. 2, the focusing actuator 12 includes at least one focusing coil 121 and at least one focusing magnet 122, wherein the at least one focusing magnet 122 is disposed on an outer sidewall of the focusing base 11, wherein the focusing coil 121 and the focusing magnet 122 are disposed correspondingly. In a case where the focusing coil 121 is energized, a Lorentz force along the optical axis direction is generated between the focusing coil 121 and the focusing magnet 122, which drives the focusing base 11 to drive the lens to move along the optical axis direction to realize optical focusing.

It is worth to mention that in the preferred embodiment of the present disclosure, the focusing magnet 122 of the focusing actuator 12 is embedded in an outer sidewall of the focusing base 11, or the focusing magnet 122 is attached to the outer sidewall of the focusing base 11. The manner in which the focusing magnet 122 is fixed is not limited here.

It is worth to mention that the focusing magnet 122 of the focusing actuator 12 may also be embedded or attached to an inner sidewall of the focusing base 11, that is, the focusing magnet 122 of the focusing actuator 12 may also be embedded or attached to a sidewall of the focusing base 11 so that the focusing magnet 122 and the focusing coil 121 are positioned corresponding each other.

The focusing actuator 12 further includes a focusing substrate 123, wherein the focusing substrate 123 is electrically connected to the focusing coil 121, and the focusing coil 121 of the focusing actuator 12 is electrically conducted by the focusing substrate 123. Preferably, in the preferred embodiment of the present disclosure the focusing substrate 123 of the focusing actuator 12 is a flexible printed circuit board (FPC).

The focusing magnet 122 can be a group of magnets, the focusing magnet 122 is a magnet having an N pole and an S pole, and the number of the magnets can be one or more.

The focusing actuator 12 further includes at least one focusing magnetic inductive member 124, wherein the focusing magnetic inductive member 124 is corresponding to the focusing magnet 122, and the focusing magnetic inductive member 124 senses the position of the focusing magnet 122 and feeds back the change of the magnetic field caused by the change of the position of the focusing magnet 122. Preferably, in the preferred embodiment of the present disclosure, the focusing magnetic inductive member 124 is a Hall sensor, wherein the focusing magnetic inductive member 124 is disposed on the focusing substrate 123. Alternatively, in the preferred embodiment of the present disclosure the focusing magnetic inductive member 124 is a circuit module built into the focusing substrate 123.

The focusing magnetic inductive member 124 is electrically connected to the focusing substrate 123. During auto-focusing, the focusing magnet 122 moves along the optical axis direction with the lens, while the focusing magnetic inductive member 124 remains stationary. Because the up-down movement of the focusing magnet 122 causes a change in the magnetic field near the focusing magnetic inductive member 124, the focusing magnetic inductive member 124 senses the change, feeds back to the driving circuit of the focusing substrate 123, and adjusts the input current, so that the whole structure has a closed-loop system, thereby realizing the auto-focusing function quickly and accurately.

Figure 3:
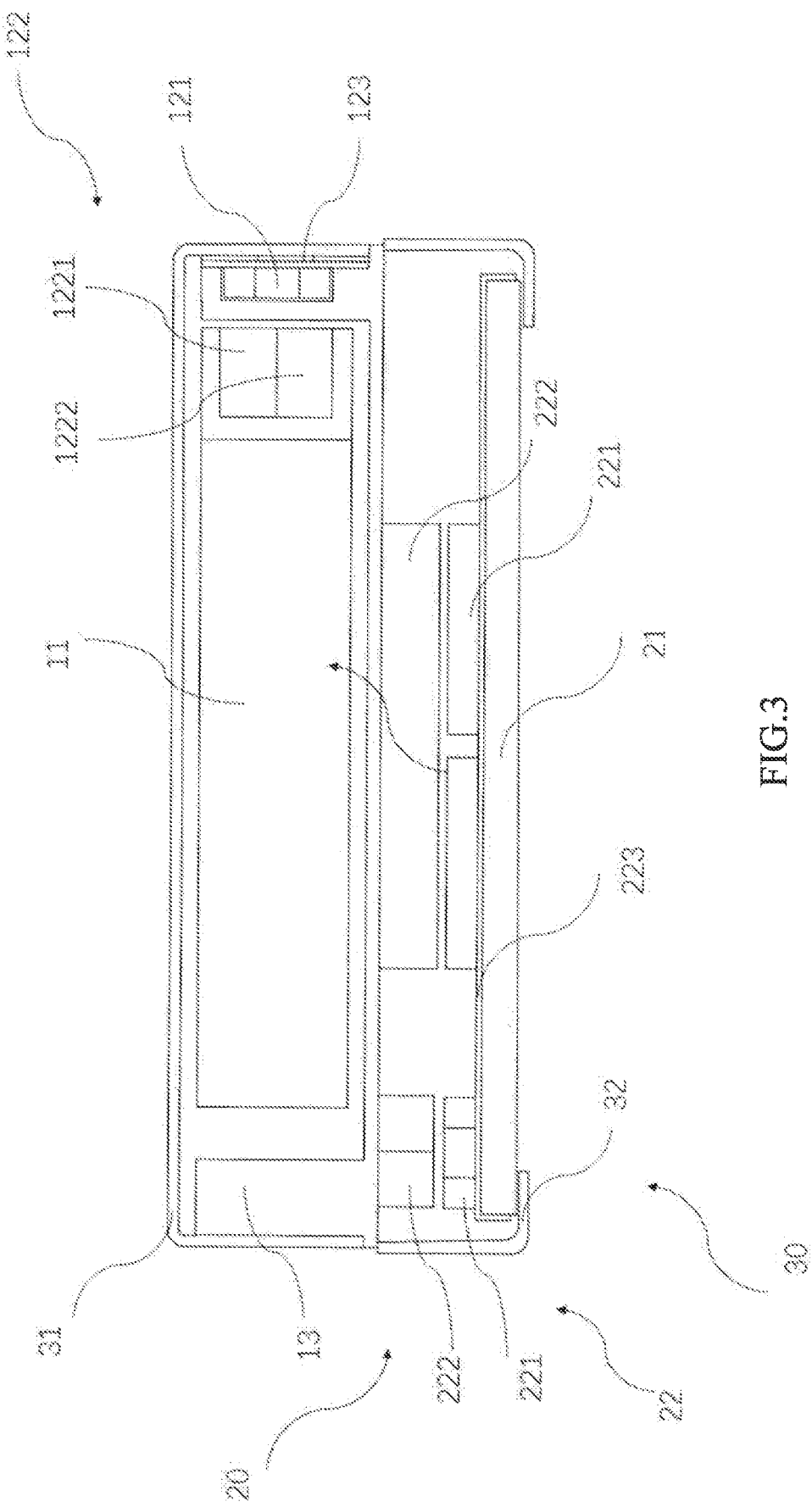
FIG. 3 is a cross-sectional view of the driving device along the optical axis direction according to the preferred embodiment of the present disclosure.
Figure 4:
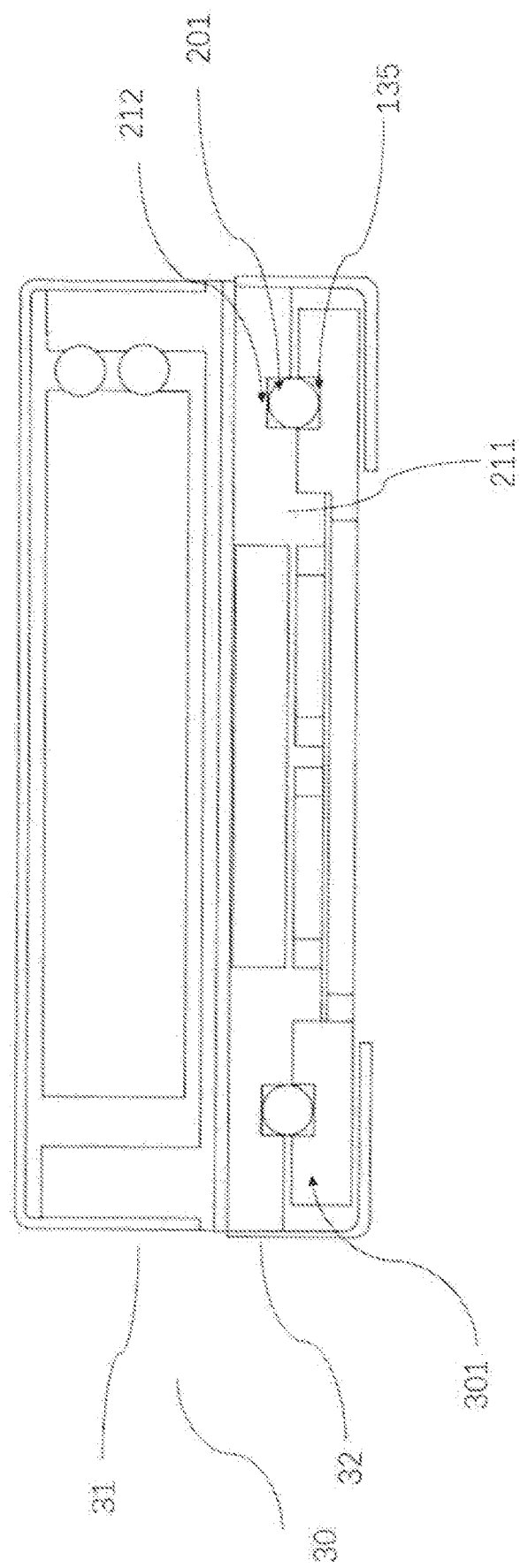
FIG. 4 is another cross-sectional view of the driving device along the optical axis direction according to the preferred embodiment of the present disclosure.
Figure 5:
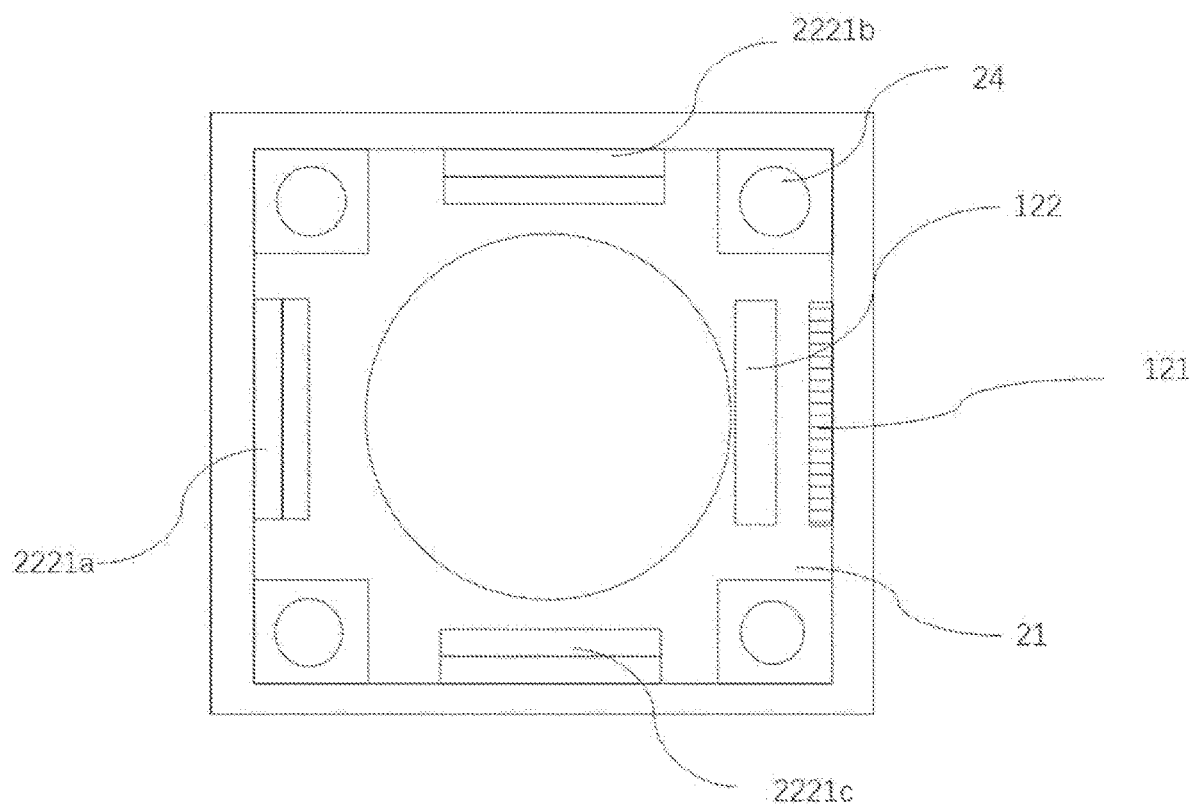
FIG. 5 is a structural schematic view of a vibration compensation actuator of the driving device according to the preferred embodiment of the present disclosure.
Figure 6:
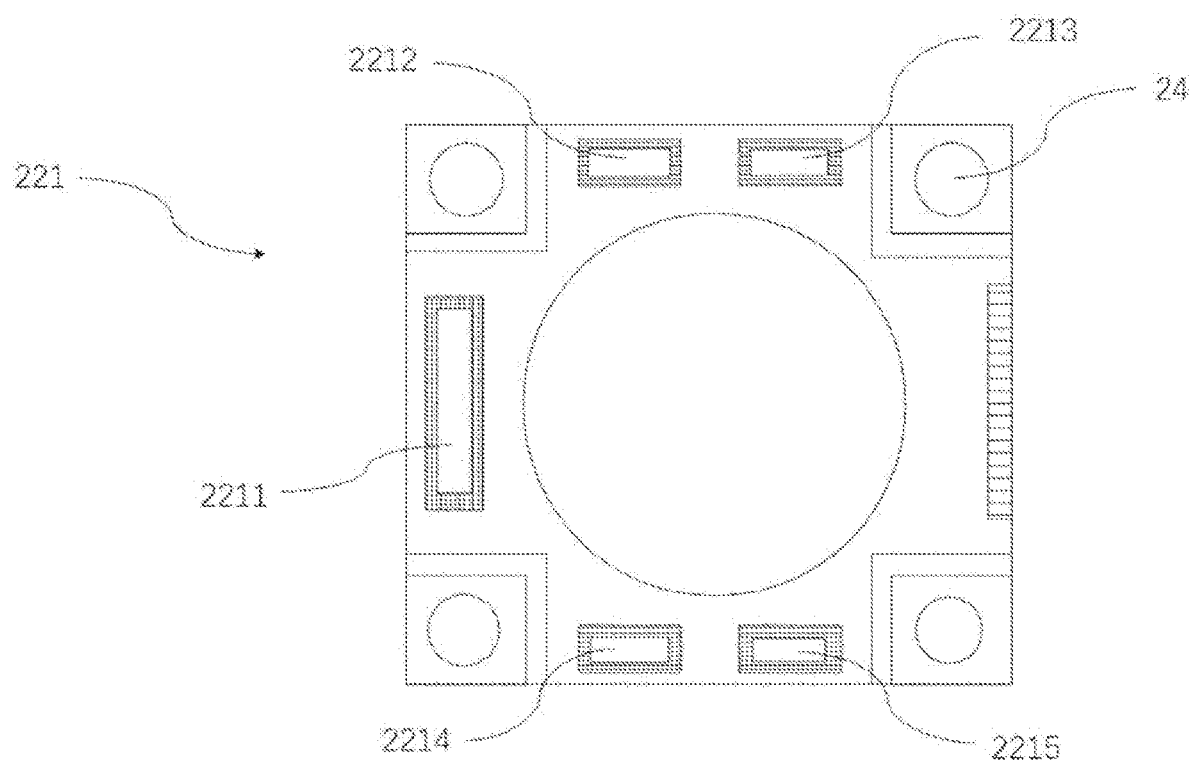
FIG. 6 is a schematic view of the structure of the vibration compensation actuator of the driving device according to the preferred embodiment of the present disclosure in another view.

As shown in FIGS. 1 to 3, the auto-focus assembly 10 further includes a fixed base 13, wherein the focusing base 11 and the focusing actuator 12 are provided on the fixed base 13. The fixed base 13 has a focusing chamber 130 in which the focusing base 11 and the focusing magnet 122 of the focusing actuator 12 are movably provided in the focusing chamber 130 of the fixed base 13 along the optical axis direction. The focusing coil 121 of the focusing actuator 12 and the focusing substrate 123 are fixed to the fixed base 13, wherein the focusing coil 121 is supported by the fixed base 13 and generates a magnetic force driving the focusing magnet 122 to move.

The fixed base 13 is a hollow structure passing through along the optical axis direction, wherein the fixed base 13 includes a base plate 131 and at least one supporting sidewall 132 which integrally is extended upward from the outer side of the base plate 131, wherein the focusing coil 121 of the focusing actuator 12 and the focusing substrate 123 are provided on the supporting sidewall 132 of the fixed base 13. The base plate 131 and the supporting sidewall 132 of the fixed base 13 are perpendicular to each other, and perpendicular to each other means that they are 90° perpendicular or the perpendicular tolerance within 3°.

The fixed base 13 is further provided with at least an actuator mounting portion 133 in which the focusing coil 121 and the focusing substrate 123 of the focusing actuator 12 are fixed to the actuator mounting portion 133 of the fixed base 13, and the focusing coil 121 and the focusing substrate 123 of the focusing actuator 12 are fixed and supported by the actuator mounting portion 133.

Preferably, the actuator mounting portion 133 is a groove formed in the supporting sidewall 132 of the fixed base 13, where the position of the actuator mounting portion 133 is corresponding to the position of the focusing magnet 122 of the focusing actuator 12. Alternatively, the actuator mounting portion 133 to which the focusing coil 121 is mounted is a through hole formed in the supporting sidewall 132 of the fixed base 13.

Preferably, the focusing substrate 123 of the focusing actuator 12 is attached to the outside of the supporting sidewall 132 of the fixed base 13. It is worth to mention that the focusing coil 121 is provided on the actuator mounting portion 133 formed on the supporting sidewall 132, and the focusing substrate 123 can be more flatly attached to the outer sidewall of the fixed base 13 without being dropped because the focusing coil 121 is raised and cannot be firmly attached.

It is worth to mention that the magnetic field generated when the focusing coil 121 is energized can interact with the magnetic field of the focusing magnet 122 to generate a driving force along the optical axis direction and drive the lens to move along the optical axis direction to realize auto-focusing.

The auto-focus assembly 10 further includes at least one focusing roller unit 14, wherein the focusing roller unit 14 is disposed between the focusing base 11 and the fixed base 13. In a case where the focusing substrate 123 of the focusing actuator 12 is energized, the focusing coil 121 and the focusing magnet 122 generate force, and the focusing magnet 122 is driven to move along the optical axis direction by the generated driving force. The focusing roller unit 14 is employed to reduce resistance to movement of the focusing base 11 and to support and maintain a distance between the focusing base 11 and the fixed base 13 so that the lens can stably move along the optical axis direction.

The auto-focus assembly further includes at least one roller rail groove 101 is disposed between the focusing base 11 and the fixed base 13, the focusing roller unit 14 is disposed in the roller rail groove 101, the distance between the focusing base 11 and the fixed base 13 is supported and maintained by the focusing roller unit 14, and the movement of the focusing base 11 relative to the fixed base 13 along the optical axis direction is provided. The roller rail groove 101 is provided along the optical axis direction and is formed between the outer sidewall of the focusing base 11 and the inner sidewall of the fixed base 13.

Specifically, the outer sidewall of the focusing base 11 has at least one first rail 111 in the Z-axis direction (optical axis direction), and the inner sidewall of the fixed base 13 has at least one second rail 134 in the Z-axis direction (optical axis direction), the position of the first rail 111 is disposed corresponding to the position of the second rail 134, wherein the roller rail groove 101 is formed between the first rail 111 of the focusing base 11 and the second rail 134 of the fixed base 13 to provide movement of the focusing base 11 along the optical axis direction (Z-axis direction) with respect to the fixed base 13. Since the roller rail groove 101 is defined to have directivity, that is, along the optical axis direction. Therefore, the focusing roller unit 14 can be moved in the Z-axis direction, and the moving direction of the lens can be made more accurate at the time of auto-focusing.

Preferably, in the preferred embodiment of the present disclosure, the number of the roller rail grooves 101 is two, and in a case where the roller rail grooves 101 are formed on one side of the focusing magnet 122, the roller rail grooves 101 are respectively formed on two sides of the focusing magnet 122, so that the movement of the focusing base 11 is more stable without inclination during auto-focusing. Alternatively, in other alternative embodiments of the present disclosure the roller rail groove 101 is formed on other sidewalls of the focusing base 11 and the fixed base 13 and is not limited by the present disclosure.

The optical image stabilization assembly 20 includes a vibration compensation base 21 and a vibration compensation actuator 22, wherein the vibration compensation base 21 is located below the fixed base 13, i.e. the focusing base 11 and the fixed base 13 are jointly located above the vibration compensation base 21. During optical image stabilization, the vibration compensation base 21 is moved relative to the fixed base 13 to realize optical image stabilization of the lens. It is worth to mention that the movement of the optical image stabilization assembly 20 in the direction perpendicular to the optical axis or rotation around the optical axis can facilitate the lens to achieve OIS of a larger travel, including XOY direction compensation and RZ direction compensation. It is worth to mention that the vibration compensation base 21 of the optical image stabilization assembly 20 is connected to an imaging assembly of the camera module in a transmission manner, and in a case where the camera module needs vibration compensation, the vibration compensation base 21 of the optical image stabilization assembly 20 is forced to drive the imaging assembly of the camera module to compensate in the XOY direction and the RZ direction.

The vibration compensation actuator 22 further includes at least one vibration compensation coil 221 and at least one vibration compensation magnet 222, wherein the vibration compensation magnet 222 is disposed on the lower end of the fixed base 13, the vibration compensation coil 221 is disposed on the vibration compensation base 21, and the vibration compensation coil 221 is positioned relative to the vibration compensation magnet 222. In a case where the vibration compensation coil 221 of the vibration compensation actuator 22 is energized, a Lorentz force is generated between the vibration compensation coil 221 and the vibration compensation magnet 222 which rotates perpendicular to and/or around the optical axis to drive the vibration compensation base 21 to drive an imaging assembly of the camera module to move perpendicular to and/or around the optical axis to realize optical anti-vibration.

The vibration compensation actuator 22 further includes a vibration compensation substrate 223, wherein the vibration compensation substrate 223 is electrically connected to the vibration compensation coil 221 of the vibration compensation actuator 22. The vibration compensation coil 221 of the vibration compensation actuator 22 is electrically conductive to the imaging assembly through the vibration compensation substrate 223.

The vibration compensation magnet 222 further includes three vibration compensation magnet groups 2221, namely a first vibration compensation magnet group 2221a, a second vibration compensation magnet group 2221b, and a third vibration compensation magnet group 2221c, wherein each of the vibration compensation magnet groups (2221a, 2221b, and 2221c) is a magnet having an N pole and an S pole, and the number of the magnets can be one or more.

Preferably, the three vibration compensating magnet groups 2221 are not in the same plane as the focusing magnet 122, and the three vibration compensating magnet groups 2221 are disposed on the other three sides relative to the side where the focusing magnet 122 is located on the focusing base 11, that is, the vertical planes where the vibration compensating magnet groups 2221 and the focusing magnet 122 are located are respectively located on four sides of the fixed base 13. It can also be said that the axis of the north and south poles of the focusing magnet 122 and the axis of the north and south poles of the vibration compensation magnet group 2221 are perpendicular to each other, and perpendicular to each other means that they are 90° perpendicular or the perpendicular tolerance of both is within 3°.

In a plane perpendicular to the optical axis direction (i.e., the XOY direction), the first vibration compensation magnet group 2221a is located on the bottom surface of the fixed base 13 in the X-axis direction, and the second vibration compensation magnet group 2221b and the third vibration compensation magnet group 2221c are located on the bottom surface of the fixed base 13 in the Y-axis direction, i.e. the first vibration compensation magnet group 2221a is for anti-vibration in the X-axis direction, and the second vibration compensation magnet group 2221b and the third vibration compensation magnet group 2221c are for anti-vibration in the Y-axis direction and the RZ direction. That is, the first vibration compensation magnet group 2221a, the second vibration compensation magnet group 2221b, and the third vibration compensation magnet group 2221c are respectively positioned on three sides of the bottom surface of the fixed base 13, and are provided on the sidewall of the focusing base 11 with respect to the focusing magnet 122. The distance between the vibration compensation magnet group 2221 and the focusing magnet 122 is longer, and the magnetic interference generated between them is smaller.

The vertical plane of the first vibration compensation magnet group 2221a is corresponding to the vertical plane of the focusing magnet 122, and the vertical plane of the second vibration compensation magnet group 2221b is corresponding to the vertical plane of the third vibration compensation magnet group 2221c. That is, the three vibration compensation magnet groups 2221 and the focusing magnet 122 are respectively disposed on four sides where the driving device does not intersect. By this arrangement, the optical image stabilizing assembly 20 and the auto-focus assembly 10 can not be interfered, so as to avoid affecting the imaging accuracy during optical image stabilization and/or auto-focusing.

In other words, the magnetic field generated by the vibration compensation magnet group 2221 does not affect the magnetic field generated by the auto-focusing magnet 122, and does not generate magnetic interference during optical image stabilization and auto-focus, thus avoiding affecting the imaging accuracy of the lens during optical image stabilization and/or auto-focus. That is to say, in a case where the lens moves in the X direction, the Y direction and/or the RZ direction, the lens does not shift in the Z axis direction; And, in a case where the lens moves in the Z-axis direction, the lens does not shift in the X-direction, the Y-direction, and/or the RZ direction.

Preferably, the vibration compensation substrate 223 is implemented as a flexible circuit board (FPC), wherein the vibration compensation coil 221 is disposed on the vibration compensation substrate 223, and the vibration compensation coil 221 is disposed corresponding to the vibration compensation magnet groups 2221, in a case where the vibration compensation coil 221 is energized, a Lorentz force is generated between the vibration compensation coil 221 and the vibration compensation magnet groups 2221, which rotates perpendicular to the optical axis and/or around the optical axis, and drives the vibration compensation base 21 to drive the imaging assembly of the camera module to move perpendicular to the optical axis and/or rotate around the optical axis of the lens, thus realizing optical image stabilization.

It is worth to mention that, in the preferred embodiment of the present disclosure, the vibration compensation substrate 223 is disposed on the upper surface of the vibration compensation base 21 along the direction perpendicular to the optical axis, the force between the vibration compensation coil 221 and the vibration compensation magnet 222 is transmitted to the vibration compensation base 21 by the vibration compensation substrate 223, and then the vibration compensation base 21 drives or drives the imaging assembly to move along the direction perpendicular to the optical axis and/or rotate around the lens optical axis to realize optical image stabilization.

The vibration compensation coil 221 further includes a first vibration compensation coil unit 2211, a second vibration compensation coil unit 2212, a third vibration compensation coil unit 2213, a fourth vibration compensation coil unit 2214, and a fifth vibration compensation coil unit 2215, wherein the first vibration compensation coil unit 2211, the second vibration compensation coil unit 2212, the third vibration compensation coil unit 2213, the fourth vibration compensation coil unit 2214, and the fifth vibration compensation coil unit 2215 are disposed on the upper surface of the vibration compensation base 21, and each of the vibration compensation coil units faces the vibration compensation magnet groups 2221.

The first vibration compensation coil unit 2211 is provided on a side directly corresponding to the first vibration compensation magnet group 2221a. In a case where the first vibration compensation coil unit 2211 is energized, the magnetic force between the first vibration compensation coil unit 2211 and the first vibration compensation magnet group unit 2211 is for anti-vibration in the X-axis direction. The second vibration compensation coil unit 2212, the third vibration compensation coil unit 2213, the fourth vibration compensation coil unit 2214, and the fifth vibration compensation coil unit 2215 are provided on two sides adjacent to the first vibration compensation coil unit 2211, wherein the magnetic force between the second vibration compensation coil unit 2212, the third vibration compensation coil unit 2213, the fourth vibration compensation coil unit 2214, and the fifth vibration compensation coil unit 2215 and the second vibration compensation magnet group 2221b and the third vibration compensation magnet group 2221c after being energized is for anti-vibration in the Y-axis direction and the RZ direction.

It is worth to mention that in the preferred embodiment of the present disclosure the second vibration compensation coil unit 2212 and the fourth vibration compensation coil unit 2214 are disposed corresponding each other in the forward direction based on the X-axis direction. The third vibration compensation coil unit 2213 and the fifth vibration compensation coil unit 2215 are disposed corresponding each other in the forward direction based on the Y-axis direction. The second vibration compensation coil unit 2212 and the fifth vibration compensation coil unit 2215 are disposed diagonally based on the plane where the XOY axis is located. The third vibration compensation coil unit 2213 and the fourth vibration compensation coil unit 2214 are disposed diagonally based on the plane where the XOY axis is located.

Preferably, the second vibration compensation coil unit 2212, the third vibration compensation coil unit 2213 are provided on a side facing to the second vibration compensation magnet group 2221b, and the fourth vibration compensation coil unit 2214 and the fifth vibration compensation coil unit 2215 are provided on a side facing to the third vibration compensation magnet group 2221c.

Figure 7:
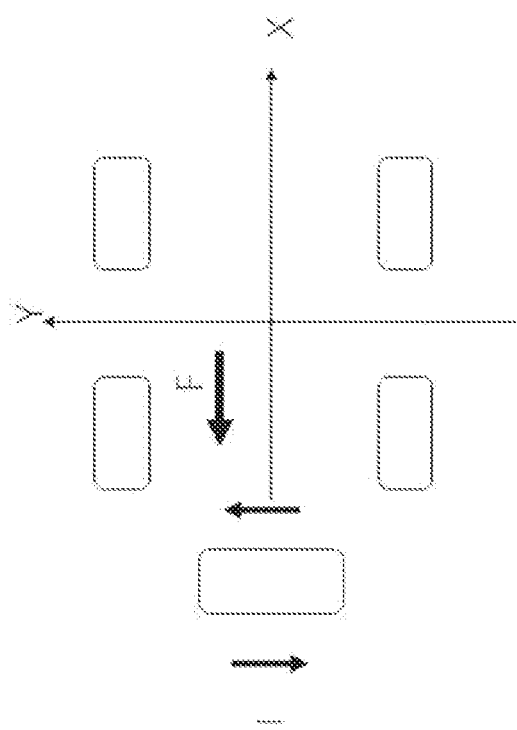
FIG. 7 is a schematic view showing that the driving device compensates for the X-axis direction movement according to the preferred embodiment of the present disclosure.
Figure 7:
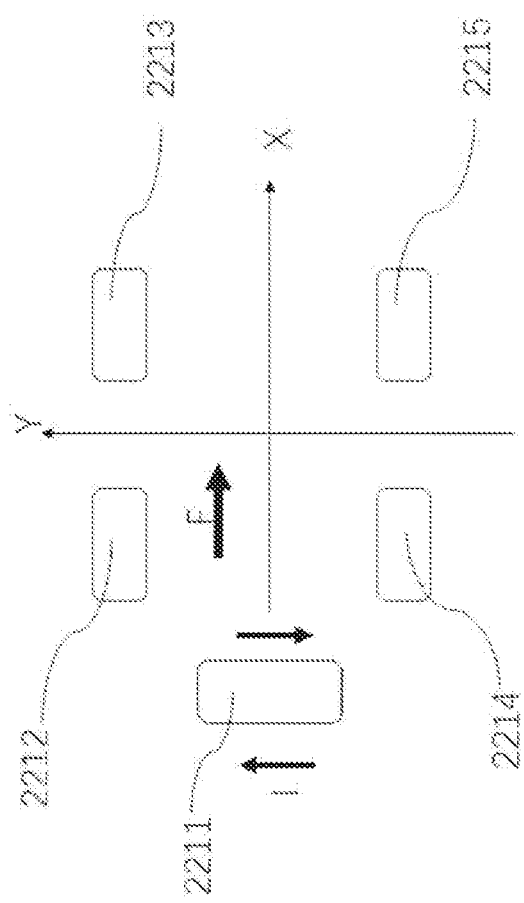

As shown in FIG. 7, in a case where the lens is to compensate in the X-axis direction, i.e. in a case where the imaging assembly needs to be controlled to move forward along the X-axis (for example, along the right side of the X-axis), a clockwise current is applied to the first vibration compensation coil unit 2211, and the first vibration compensation coil unit 2211 interacts with the first vibration compensation magnet group 2221a, so that the first vibration compensation coil unit 2211 is subjected to the forward force along the X-axis provided by the first vibration compensation magnet group 2221a, and then the imaging assembly is driven to move along the right side of the X-axis by the first vibration compensation coil unit 2211 through the vibration compensation base 21. Conversely, in a case where a counterclockwise current is applied to the first vibration compensation coil unit 2211, the first vibration compensation coil unit 2211 is subjected to a negative force along the X-axis provided by the first vibration compensation magnet group 2221a, and then the first vibration compensation coil unit 2211 drives the imaging assembly to move along the left side of the X-axis through the vibration compensation base 21, thereby realizing optical anti-vibration in the X-axis direction.

Figure 8:
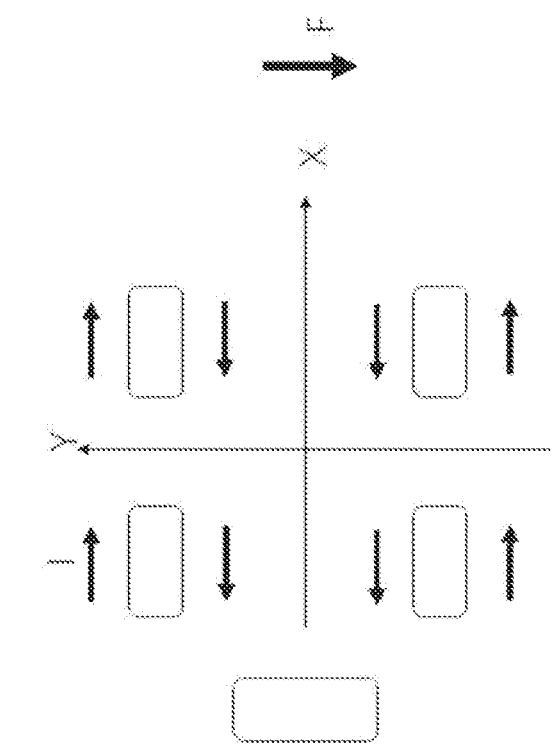
FIG. 8 is a schematic view showing that the driving device compensates for movement in the Y-axis direction according to the preferred embodiment of the present disclosure.
Figure 8:
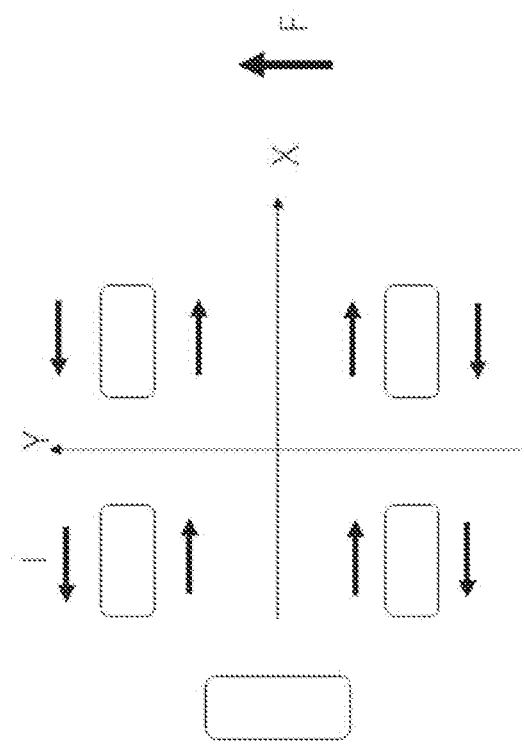

As shown in FIG. 8, in a case where the lens is to compensate for the Y-axis direction, i.e. in a case where the imaging assembly needs to be controlled to translate in the Y-axis forward direction, the second vibration compensation coil unit 2212, the third vibration compensation coil unit 2213 are supplied with counterclockwise current, and the fourth vibration compensation coil unit 2214 and the fifth vibration compensation coil unit 2215 are supplied with clockwise current. The second vibration compensation coil unit 2212 and the third vibration compensation coil unit 2213 interact with the second vibration compensation magnet group 2221b such that the second vibration compensation coil unit 2212 and the third vibration compensation coil unit 2213 are subjected to a force in the positive direction along the Y axis. The fourth vibration compensation coil unit 2214 and the fifth vibration compensation coil unit 2215 interact with the third vibration compensation magnet group 2221c such that the fourth vibration compensation coil unit 2214 and the fifth vibration compensation coil unit 2215 are subjected to a force in the positive direction along the Y axis. In short, in a case where the second vibration compensation coil unit 2212, the third vibration compensation coil unit 2213 are supplied with current in the counterclockwise direction, and the fourth vibration compensation coil unit 2214 and the fifth vibration compensation coil unit 2215 are supplied with current in the clockwise direction, the vibration compensation coil 221 is applied in the forward direction along the Y axis, and the vibration compensation coil 221 drives the imaging assembly to move in the forward direction along the Y axis through the vibration compensation base 21. Conversely, the second vibration compensation coil unit 2212, the third vibration compensation coil unit 2213 are supplied with a clockwise current, the fourth vibration compensation coil unit 2214 and the fifth vibration compensation coil unit 2215 are supplied with a counterclockwise current, the vibration compensation coil 221 is subjected to a force in the negative direction along the Y axis, and the vibration compensation coil 221 drives the imaging assembly to move in the negative direction along the Y axis through the vibration compensation base 21.

Figure 9:
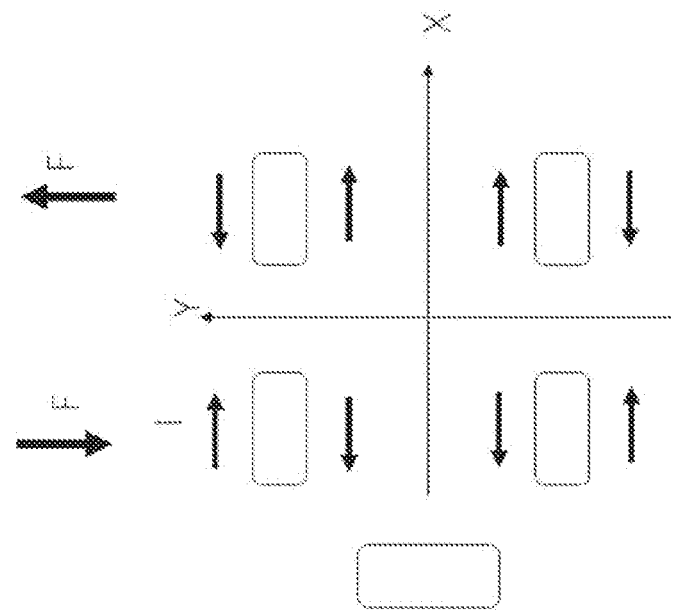
FIG. 9 is a schematic view showing that the driving device compensates for rotation along optical axis rotation according to the preferred embodiment of the present disclosure.
Figure 9:
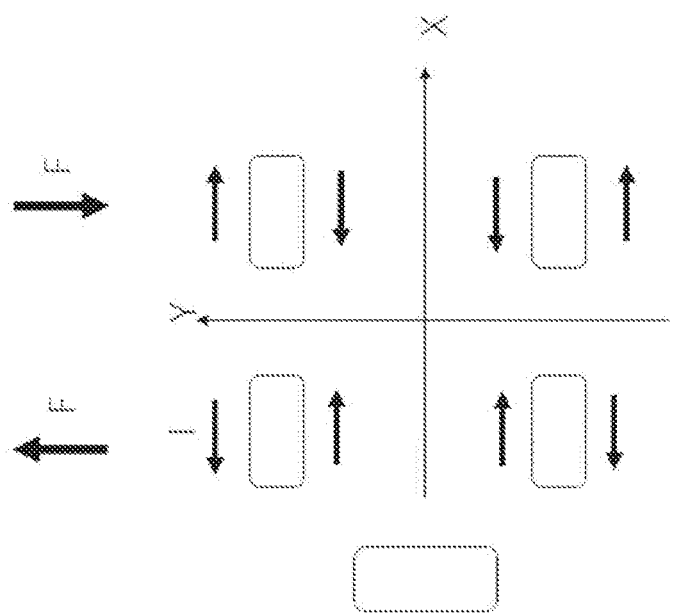

As shown in FIG. 9, in a case where the lens is to compensate for the rotation of the optical axis, i.e. in a case where it is necessary to control the imaging assembly to realize RZ clockwise rotation about the optical axis, the third vibration compensation coil unit 2213, the fourth vibration compensation coil unit 2214 are supplied with current in the clockwise direction, and the second vibration compensation coil unit 2212, the fifth vibration compensation coil unit 2215 are supplied with current in the counterclockwise direction. The third vibration compensation coil unit 2213 and the fifth vibration compensation coil unit 2215 are subjected to a force in the Y-axis negative direction. The second vibration compensation coil unit 2212 and the fourth vibration compensation coil unit 2214 are subjected to a Y-axis positive force, so two sides of the vibration compensation coil 221 are subjected to a positive force and a negative force in the Y-axis direction, thereby forming a clockwise torsional force. The vibration compensation coil 221 drives the imaging assembly to rotate clockwise around the optical axis through the vibration compensation base 21 to realize anti-vibration in the RZ direction. Conversely, the second vibration compensation coil unit 2212 and the fifth vibration compensation coil unit 2215 are supplied with current in the clockwise direction, and the third vibration compensation coil unit 2213 and the fourth vibration compensation coil unit 2214 are supplied with current in the counterclockwise direction. The third vibration compensation coil unit 2213 and the fifth vibration compensation coil unit 2215 are subjected to a force in the Y-axis positive direction. The second vibration compensation coil unit 2212 and the fourth vibration compensation coil unit 2214 are subjected to a force in the negative direction of the Y axis, thereby forming a counterclockwise torsional force. The vibration compensation coil 221 drives the imaging assembly to rotate counterclockwise around the optical axis to realize anti-vibration in the RZ direction.

The optical image stabilization assembly 20 further includes at least one vibration magnetic induction member 23, the vibration magnetic induction member 23 is electrically connected to the vibration compensation substrate 223, and the vibration magnetic induction member 23 is disposed face to face with the vibration compensation magnet 222. Preferably, the vibration magnetic induction member 23 is provided on the vibration compensation substrate 223, which is employed to sense the position of the vibration compensation magnet 222 and feedback a change in the magnetic field due to a change in the position of the vibration magnetic induction member 223 with respect to the vibration compensation magnet 222.

It is worth to mention that during optical image stabilization, the vibration compensation coil 221 rotates along with the imaging assembly in the direction perpendicular to and/or around the optical axis while the vibration compensation magnet 222 remain stationary. The movement of the vibration compensation coil 221 causes the vibration magnetic inductance element 23 to change the magnetic field relative to the vibration compensation magnet 222, and the vibration magnetic inductance element 23 senses the change and feeds back to the driving circuit through the vibration compensation substrate 223 to adjust the input current, so that the whole structure forms a closed-loop system, thereby realizing the optical image stabilization function quickly and accurately.

Preferably, in the preferred embodiment of the present disclosure the vibration compensation magnet 222 is implemented as a Hall element.

The optical image stabilization assembly 20 further includes at least one anti-vibration roller 24, the anti-vibration roller 24 is disposed between the vibration compensation base 21 and the fixed base 13 for supporting and maintaining a distance between the vibration compensation base 21 and the fixed base 13. The vibration compensation base 21 includes a base body 211 and at least one roller receiving groove 212, wherein the roller receiving groove 212 has a slot, and the anti-vibration roller 24 is disposed in the roller receiving groove 212 of the vibration compensation base 21. It is worth to mention that the receiving space of the roller receiving groove 24 is slightly larger than the roller diameter of the anti-vibration roller 24 to allow the anti-vibration roller 24 to roll in the roller receiving groove 212 and to reduce the friction between the vibration compensation base 21 and the fixed base 13 by the rolling friction of the anti-vibration roller 24.

Preferably, in the preferred embodiment of the present disclosure, the number of the anti-vibration rollers 24 of the optical image stabilization assembly 20 is four, wherein the number of the roller receiving grooves 212 of the vibration compensation base 21 corresponds to the number of the anti-vibration rollers 24. Preferably, the roller receiving grooves 212 are located at four corner positions of the base body 211 of the vibration compensation base 21.

The anti-vibration roller 24 is supported between the upper side of the vibration compensation base 21 and the lower side of the fixed base 13, and forms an anti-vibration adjustment space 201, wherein the anti-vibration roller 24 supports and maintains the distance between the vibration compensation base 21 and the fixed base 13, and reduces the friction between the vibration compensation base 21 and the fixed base 13 by rolling friction instead of sliding friction.

The fixed base 13 further includes at least a lower groove 135 formed on the lower surface of the fixed base 13 and facing the roller receiving groove 212 of the vibration compensation base 21. The anti-vibration roller 24 is limited between the lower groove 135 of the fixed base 13 and the roller receiving groove 212. It will be understood that the lower groove 135 and the roller receiving groove 212 together form the anti-vibration adjustment space 201. It will be understood that in the preferred embodiment of the present disclosure, the number of the lower grooves 135 of the fixed base 13 is four, wherein the lower grooves 135 are facing to the roller receiving grooves 212 of the vibration compensation base 21, forming four of the anti-vibration adjustment spaces 201 to provide rotation of the vibration compensation base 21 relative to the fixed base 13 in a direction perpendicular to and/or around the optical axis.

It is worth to mention that the anti-vibration adjustment space 201 is formed at the four corners of the vibration compensation base 21 and the fixed base 13, which reduces the space occupation of the driving device, and the supporting action of the vibration roller 24 can keep a certain gap between the vibration compensation magnet 222 and the vibration compensation coil 221, thereby making the vibration compensation base 21 move more smoothly.

It is worth to mention that in the preferred embodiment of the present disclosure the focusing magnet 122 is provided on the outer sidewall of the focusing base 11 which is located in the fixed base 13. The anti-vibration magnet 222 is disposed on the bottom of the fixed base 13, wherein the focusing magnet 122 is not on the same plane as the anti-vibration magnet 222, which is beneficial to reduce or even avoid the magnetic interference phenomenon. The auto-focus assembly 10 drives the lens to move along the optical axis direction to realize auto-focus. The optical image stabilization assembly 20 drives the imaging assembly to rotate in a direction perpendicular to and/or around the optical axis to achieve optical image stabilization.

Figure 10:
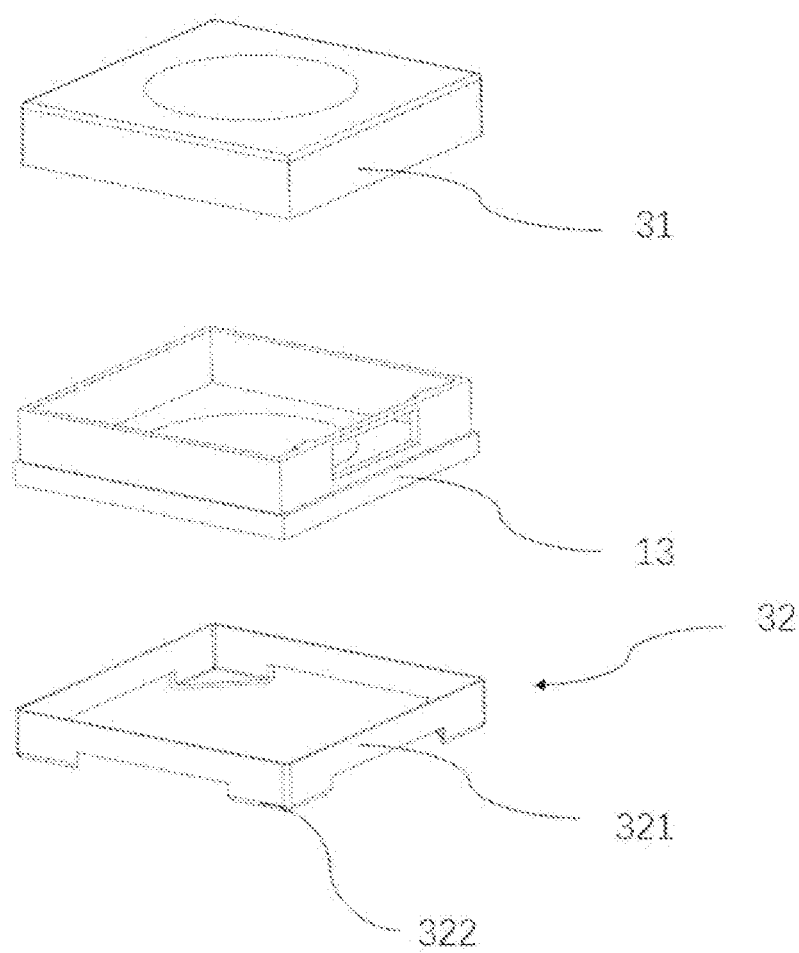
FIG. 10 is a schematic view of an outer frame structure of the driving device according to the above preferred embodiment of the present disclosure.

As shown in FIG. 10, the driving device further includes an outer frame 30 to which the auto-focus assembly 10 and the optical image stabilization assembly 20 of the driving device are fixed and protected by the outer frame 30. The outer frame 30 includes a housing 31 and a bottom frame 32, wherein the housing 31 and the bottom frame 32 are combined to form a protective space 301, wherein the auto-focus assembly 10 and the optical image stabilization assembly 20 are supported in the protective space 301 by the outer frame 30 to prevent the auto-focus assembly 10 and the optical image stabilization assembly 20 from falling off and being damaged due to external impact.

It is worth to mention that the outer frame 30 can block electromagnetic waves generated during operation of the camera module to produce an electromagnetic shielding effect. If electromagnetic waves generated during driving the camera module are emitted to the outside or are emitted to the outside of the camera module, the electromagnetic waves may affect other electronic components, which may lead to communication errors or failures. In the preferred embodiment of the present disclosure, the material of the housing 31 can be a metallic material and the housing 31 is grounded, so that the housing 31 serves as an electromagnetic shield. Alternatively, the material of the housing 31 can be a plastic material the surface of which is coated with a conductive material to block electromagnetic waves. This present disclosure is not limited to the material of the housing. The housing 31 has an opening so that light passing through the lens can be incident on the imaging assembly for imaging.

Preferably, the housing 31 is fixed to the upper portion of the fixed base 13, the bottom frame 32 is fixed to the lower portion of the fixed base 13, and the bottom frame 32 includes a frame body 321 and four supporting corners 322 extended inward from the corners of the frame body 321, and the optical image stabilization assembly 20 is supported at the supporting corners 322, so that the four bottom edges of the optical image stabilization assembly 20 can be linked with the imaging assembly, which not only can increase the bonding area and make the connection more firm, but also can further reduce the height size of the camera module relative to the imaging assembly connected to the bottom frame 32.

It is worth to mention that, in the embodiment, the anti-vibration travel along the direction perpendicular to the optical axis in the optical image stabilization can reach ±301 mm, the anti-vibration travel around the optical axis can reach ±10, and the auto-focusing travel can reach ±500 mm.

A driving device according to another embodiment of the present disclosure is illustrated in the following description with reference to FIGS. 11 to 12 of the drawings in the specification of the present disclosure. Different from the above-mentioned embodiment, in the preferred embodiment of the present disclosure, the number of vibration compensation coils along the X-axis direction is two, and the vibration compensation coils in the X-axis direction and the vibration compensation coils in the Y-axis direction can be energized simultaneously during the RZ-direction anti-vibration, so as to realize the RZ anti-vibration effect with a larger travel.

In detail, the vibration compensation coil 221 further includes a sixth vibration compensation coil unit 2216, wherein the first vibration compensation coil unit 2211 and the sixth vibration compensation coil unit 2216 are disposed on the same side of the vibration compensation base 21, i.e. on the other side corresponding to the focusing coil 121. The first vibration compensation coil unit 2211 and the sixth vibration compensation coil unit 2216 are disposed symmetrically based on the X-axis direction.

Figure 11:
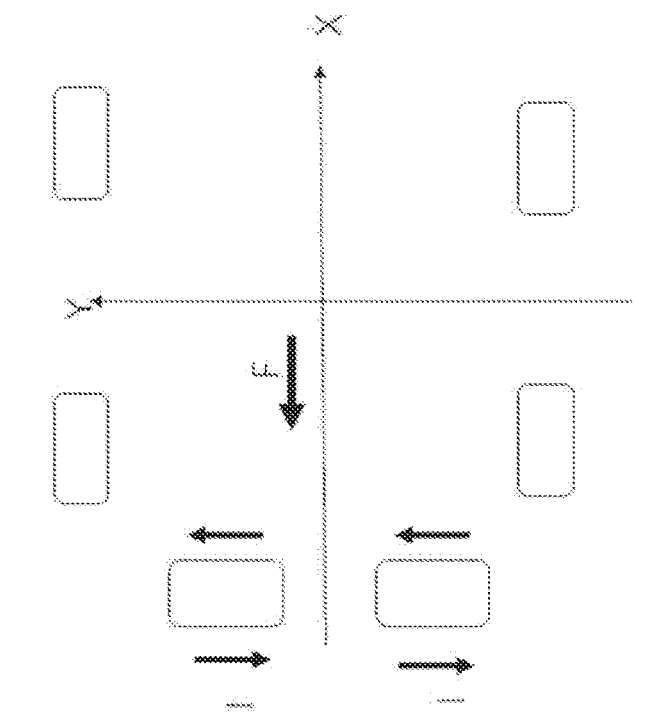
FIG. 11 is a schematic view showing that the driving device compensates for the X-axis direction movement according to another preferred embodiment of the present disclosure.
Figure 11:
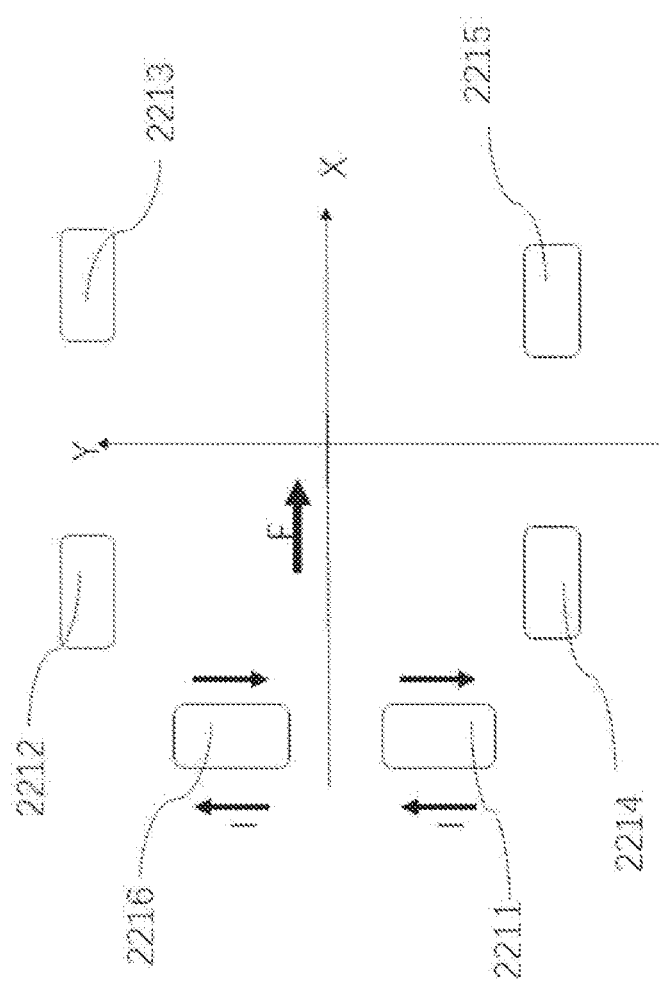

As shown in FIG. 11, in a case where the lens is to compensate in the X-axis direction, that is, in a case where the imaging assembly needs to be controlled to translate in the X-axis positive direction (right side of the X-axis), current in the clockwise direction is introduced to the first vibration compensation coil unit 2211 and the sixth vibration compensation coil unit 2216. The first vibration compensation coil unit 2211 and the sixth vibration compensation coil unit 2216 interact with the first vibration compensation magnet group 2221a, so that the first vibration compensation coil unit 2211 and the sixth vibration compensation coil unit 2216 are subjected to a positive force along the X-axis, and the first vibration compensation coil unit 2211 and the sixth vibration compensation coil unit 2216 drive the imaging assembly to move positively (right) along the X-axis through the vibration compensation base 21. Conversely, in a case where a counterclockwise current is supplied to the first vibration compensation coil unit 2211 and the sixth vibration compensation coil unit 2216, the first vibration compensation coil unit 2211 and the sixth vibration compensation coil unit 2216 are subjected to a negatively (left) force along the X-axis, and the first vibration compensation coil unit 2211 and the sixth vibration compensation coil unit 2216 drive the imaging assembly to move negatively (left) along the X-axis through the vibration compensation base 21 to realize optical anti-vibration in the X-axis direction.

Figure 12:
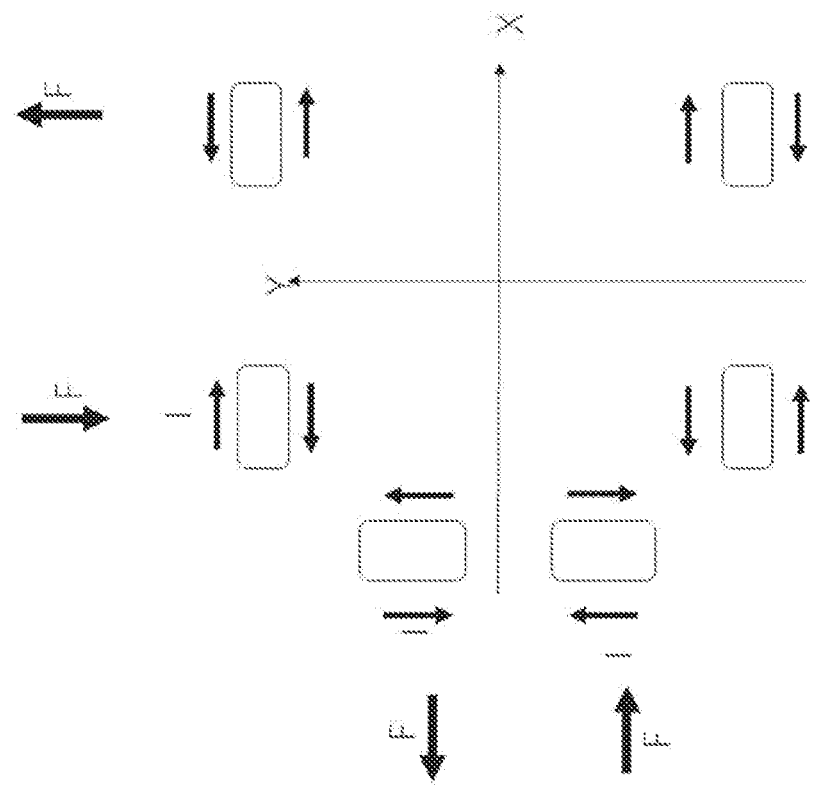
FIG. 12 is a schematic view showing that the driving device compensates for rotation along optical axis rotation according to the preferred embodiment of the present disclosure.
Figure 12:
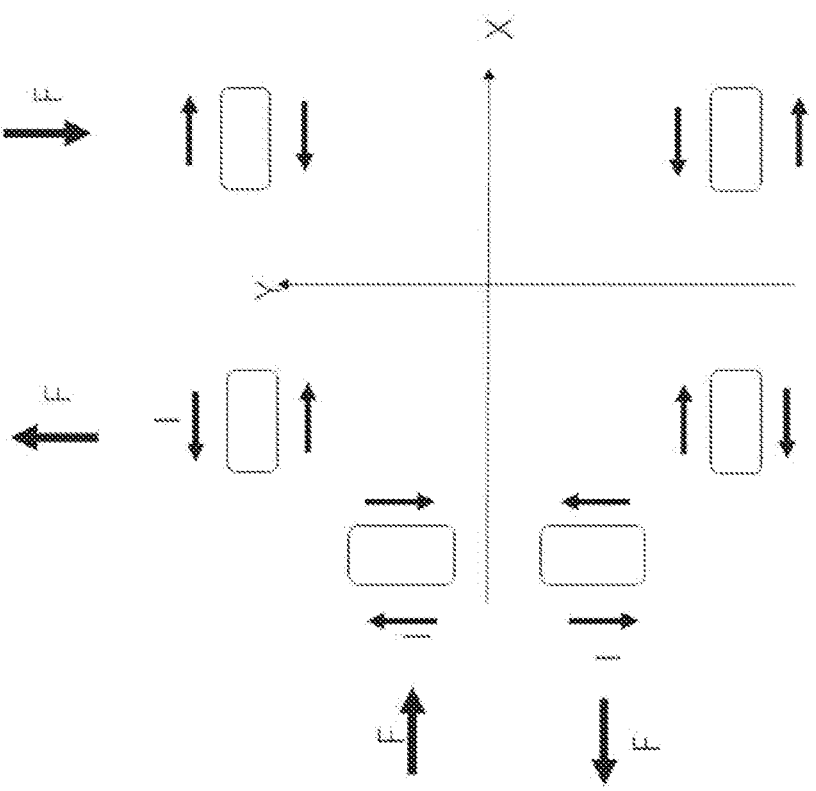

As shown in FIG. 12, in a case where the lens is to compensate for optical axis rotation, that is, in a case where it is necessary to control the imaging assembly to realize RZ clockwise rotation about the Z axis, the sixth, third and fourth vibration compensation coil units 2216, 2213 and 2214 are supplied with clockwise currents, and the first, second and fifth vibration compensation coil units 2211, 2212 and 2215 are supplied with counterclockwise currents. The third vibration compensation coil unit 2213, the fifth vibration compensation coil unit 2215 are subjected to a negative force along the Y axis, the second vibration compensation coil unit 2212 and the fourth vibration compensation coil unit 2214 are subjected to a positive force along the Y axis, the first vibration compensation coil unit 2211 is subjected to a negative force along the X axis, and the sixth vibration compensation coil unit 2216 is subjected to a positive force along the X axis, thereby forming a torsional force. The vibration compensation coil 221 drives the imaging assembly to rotate clockwise around the optical axis through the vibration compensation base 21 to realize anti-vibration in the RZ direction.

Conversely, in a case where it is necessary to control the imaging assembly to realize RZ counterclockwise rotation about the Z axis, the sixth, third, and fourth vibration compensation coil units 2216, 2213, and 2214 are supplied with counterclockwise currents, and the first, second, and fifth vibration compensation coil units 2211, 2212, and 2215 are supplied with clockwise currents. The third vibration compensation coil unit 2213, the fifth vibration compensation coil unit 2215 are subjected to a positive force along the Y axis, the second vibration compensation coil unit 2212 and the fourth vibration compensation coil unit 2214 are subjected to a negative force along the Y axis, the first vibration compensation coil unit 2211 is subjected to a positive force along the X axis, and the sixth vibration compensation coil unit 2216 is subjected to a negative force along the X axis, thereby forming a torsional force. The vibration compensation coil 221 drives the imaging assembly to rotate counterclockwise around the optical axis through the vibration compensation base 21 to realize anti-vibration in the RZ direction.

Figure 13:
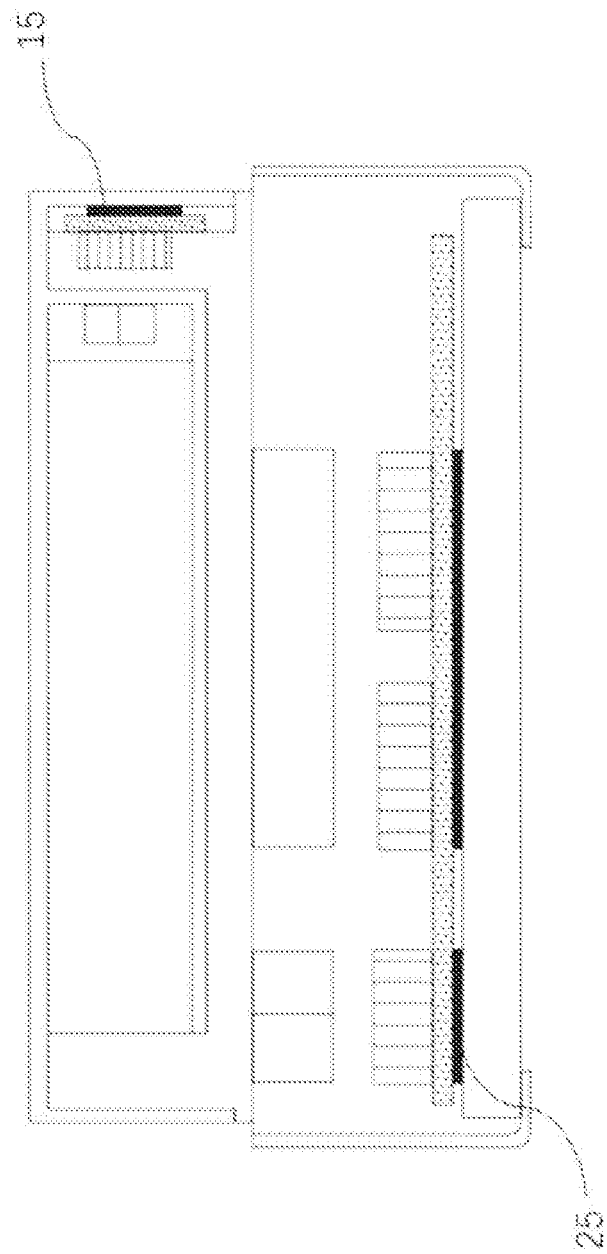
FIG. 13 is a cross-sectional view of a driving device along the optical axis direction according to another preferred embodiment of the present disclosure.

A driving device according to another aspect of the present disclosure is illustrated in the following description with reference to FIG. 13 of the drawings of the specification of the present disclosure. The auto-focus assembly 10 of the driving device further includes a focusing yoke 15, wherein the focusing yoke 15 is disposed on the focusing substrate 123 and is located on the corresponding side of the focusing coil 121. The focusing yoke 15 is corresponding to the focusing magnet 122 of the auto-focus assembly 10. The focusing yoke 15 can generate a magnetic force with the focusing magnet 122, and the auto-focus assembly 10 is pulled in the direction of the focusing yoke 15 by the magnetic force. In short, the focusing yoke 15 can reset the auto-focus assembly 10 by magnetic force.

Specifically, in a case where the focusing coil 121 is energized by applying a driving signal, the electromagnetic interaction between the focusing coil 121 and the focusing magnet 122 generates a driving force in the Z-axis direction. The focusing base 11 can be moved in the Z-axis direction by a driving force, and in a case where the driving signal of the focusing coil 121 is stopped, the focusing base 11 can be returned to an initial position by a magnetic force between the focusing magnet 122 and the focusing yoke 15. It can be understood that the initial position refers to the position of the focusing base 11 before the driving signal is applied to the focusing coil 121.

The optical image stabilization assembly 20 of the driving device further includes at least one anti-vibration yoke 25, wherein the anti-vibration yoke 25 is disposed on the vibration compensation base 21 and on the corresponding side of the vibration compensation coil 221. The anti-vibration yoke 25 may generate a magnetic force with the vibration compensation magnet 222 by which the optical image stabilization assembly 20 is pulled in the direction of the anti-vibration yoke 25. In short, the anti-vibration yoke 25 resets the optical image stabilization assembly 20 by magnetic force action.

In a case where the vibration compensation coil 221 is energized by applying a driving signal, the electromagnetic interaction between the vibration compensation coil 221 and the vibration compensation magnet 222 generates a driving force rotating in a direction perpendicular to and/or about the optical axis. The vibration compensation base 21 can be moved in a direction perpendicular to and/or rotated about the optical axis under the action of a driving force, and in a case where the driving signal of the vibration compensation coil 221 is stopped, the vibration compensation base 21 can be returned to an initial position by a magnetic force between the vibration compensation magnet 222 and the anti-vibration yoke 25. It is worth to mention that the number of the anti-vibration yokes 25 can be one or more pieces and the present disclosure is not limited.

In other embodiments of the present disclosure, the anti-vibration yoke 25 can be integrally molded to the vibration compensation base 21 in an insert molding manner, and the position of the anti-vibration yoke 25 is corresponding to the position of the vibration compensation magnet 222. With the embedded molding mode, the space occupied by the anti-vibration yoke 25 in the driving device can be reduced, which is beneficial to reducing the size of the driving device.

Figure 14:
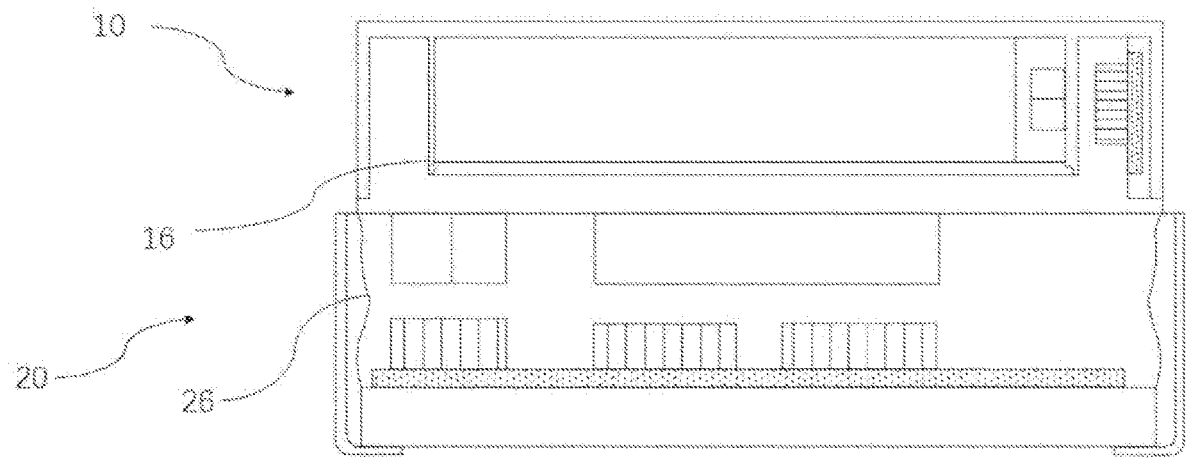
FIG. 14 is a cross-sectional view of a driving device along the optical axis direction according to another preferred embodiment of the present disclosure.

A driving device according to another aspect of the present disclosure is illustrated in the following description with reference to FIG. 14 of the drawings of the specification of the present disclosure. Different with the preferred embodiment described above, the reset component of the driving device is implemented as an elastic member.

In detail, the auto-focus assembly 10 of the driving device further includes at least one focusing reset member 16, wherein the focusing reset member 16 is employed to reset the auto-focus assembly 10 to the initial position after being energized. The focusing reset member 16 is provided between the focusing base 11 and the fixed base 13, wherein one end of the focusing reset member 16 is fixed to the focusing base 11 and the other end of the focusing reset member 16 is fixed to the fixed base 13. It is worth to mention that the focusing reset member 16 is located at four corners or four edges of the focusing base 11 and the fixed base 13 which is not limited in the present disclosure. Preferably, the focusing reset member 16 is an elastic member, such as a spring, a spring piece, or other elastic structure. In a case where the focusing base 11 of the auto-focus assembly 10 is moved, the focusing reset member 16 pulls the focusing base 11 to reset by an elastic force.

The optical image stabilization assembly 20 of the driving device further includes at least one anti-vibration reset member 26, wherein the anti-vibration reset member 26 is employed to reset the optical image stabilization assembly 20 to the initial position after being energized. The anti-vibration reset member 26 is provided between the vibration compensation base 21 and the fixed base 13, wherein one end of the anti-vibration reset member 26 is fixed to the vibration compensation base 21 and the other end of the anti-vibration reset member 26 is fixed to the fixed base 13. It is worth to mention that the anti-vibration reset member 26 is located at four corners or four edges of the vibration compensation base 21 and the fixed base 13 which is not limited in the present disclosure. Preferably, in the preferred embodiment of the present disclosure the anti-vibration reset member 26 can be a spring, a spring piece, or other elastic structure.

Figure 15:
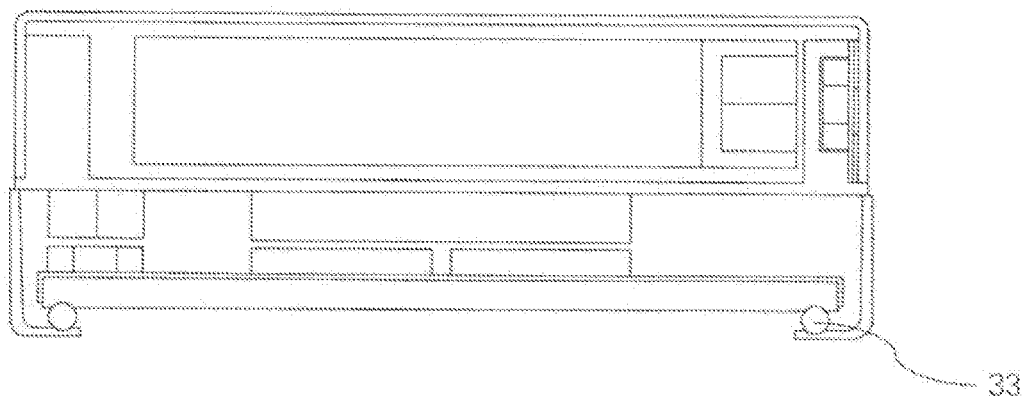
FIG. 15 is a cross-sectional view of a driving device along the optical axis direction according to another preferred embodiment of the present disclosure.

A driving device according to another aspect of the present disclosure is illustrated in the following description with reference to FIG. 15 of the drawings of the specification of the present disclosure. Since the vibration compensation base 21 is supported by the bottom frame 32, the above embodiment is different in that the outer frame 30 of the driving device further includes at least one frame roller 33, wherein the frame roller 33 is disposed between the bottom frame 32 and the vibration compensation base 21 so as to reduce the friction between the bottom frame 32 and the vibration compensation base 21 by the frame roller 33. It can be understood that the frame rollers 33 are employed to support the distance between the vibration compensation base 21 and the bottom frame 32 and to reduce friction by rolling friction.

The four corners of the bottom of the vibration compensation base 21 have four grooves with openings facing down, and four corners of the supporting portion of the bottom frame 32 also have four grooves with openings facing up. The grooves of the vibration compensation base 21 are corresponding to the grooves of the bottom frame 32 to form a roller movement space for receiving and restricting the frame rollers 33.

Figure 16:
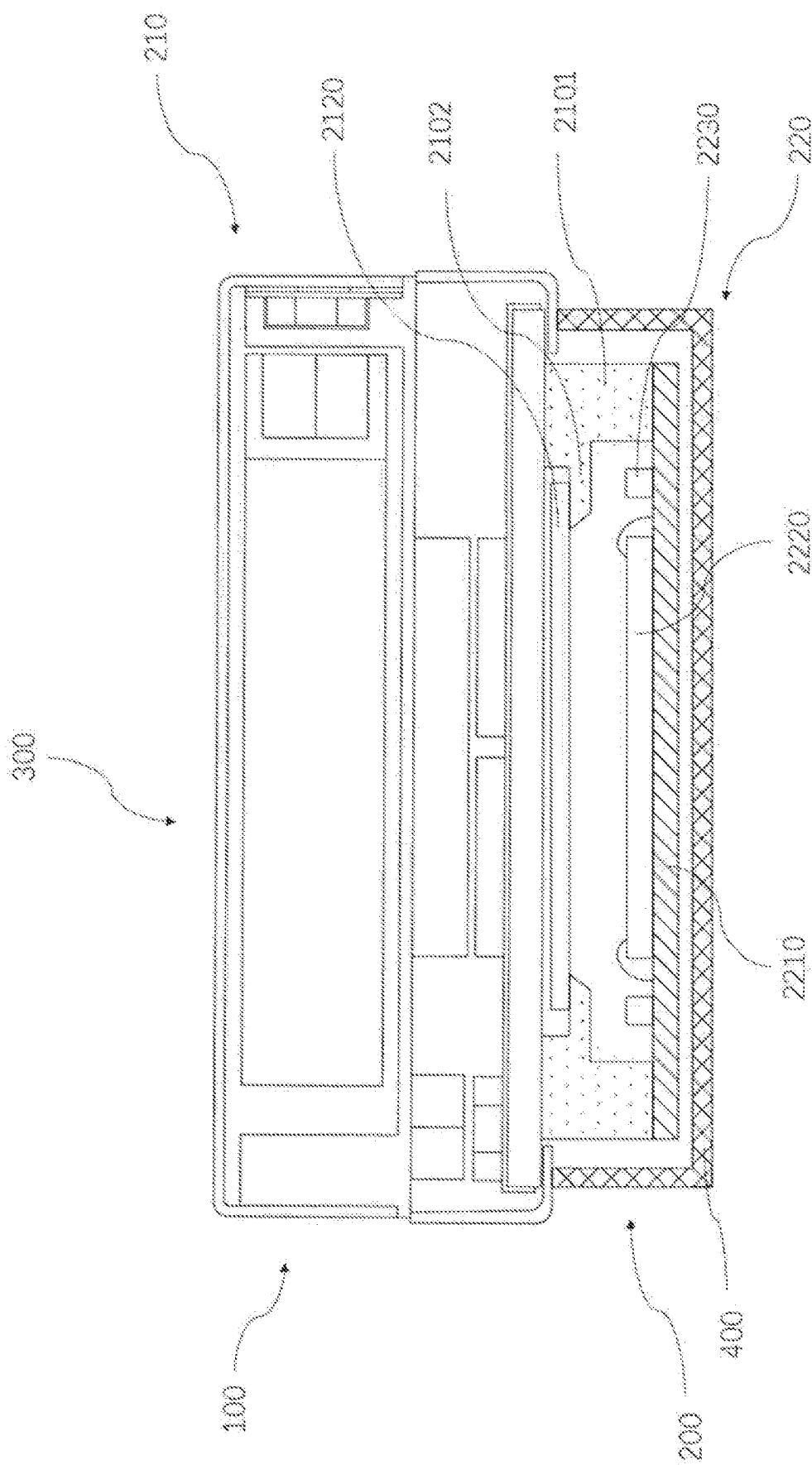
FIG. 16 is a cross-sectional view of a camera module along the optical axis direction according to a preferred embodiment of the present disclosure.

A camera module according to a preferred embodiment of the present disclosure is illustrated in the following description with reference to FIG. 16 of the drawings in the specification of the present disclosure. The camera module includes a driving device 100, an imaging assembly 200 and a lens 300, wherein the driving device 100 can be implemented as the driving device described in any of the above preferred embodiments, and the specific structure of the driving device 100 is not described here. The imaging assembly 200 and the lens 300 are provided at the driving device 100, wherein the lens 300 is provided at the auto-focus assembly 10 of the driving device 100, and the movement of the lens 300 is driven by the auto-focus assembly 10 to realize the auto-focus of the lens 300. The driving device 100 is disposed on the upper end of the imaging assembly 200, and the optical image stabilizing assembly 20 of the driving device 100 is connected to the imaging assembly 200 in a transmission manner, wherein the optical image stabilizing assembly 20 can drive the imaging assembly 200 to move, so as to realize the optical image stabilization of the imaging module.

In the present disclosure, the auto-focus assembly 10 drives the lens 300 to move along the optical axis direction to realize auto-focusing. The optical image stabilization assembly 20 drives the imaging assembly 200 to move in a direction perpendicular to the optical axis and/or rotate around the optical axis to realize optical image stabilization. This structure separating auto-focus and optical image stabilization, compared with the conventional independent imaging assembly movement, can realize auto-focus and optical image stabilization and have a simpler driving device. Compared with the conventional independent lens movement, auto-focusing and optical image stabilization can be realized, and a larger anti-vibration travel can be obtained, so that the larger vibration of the camera module can be compensated. In addition, this arrangement can avoid interference between the optical image stabilizing assembly 20 and the auto-focus assembly 10, thereby improving the imaging accuracy of the imaging module.

It is worth to mention that in the preferred embodiment of the present disclosure, the lens 300 is arranged on the focusing base 11 by means of glue buckle or thread or the like. In other alternative embodiments of the present disclosure, the focusing base 11 can be implemented as a barrel of the lens in which components such as optical lenses of the lens 300 are disposed within the focusing base 11. In other words, optionally, the lens 300 and the focusing base 11 of the auto-focus assembly 10 of the driving device 100 are integrated.

In detail, the imaging assembly 200 includes a filter assembly 210 and a circuit board assembly 220, wherein the circuit board assembly 220 is disposed below the filter assembly 210 along the optical axis direction. The filter assembly 210 of the imaging assembly 200 is fixed to the optical image stabilization assembly 20, and the optical image stabilization assembly 20 drives the filter assembly 210 of the imaging assembly 200 and the circuit board assembly 220 for optical image stabilization.

The filter assembly 210 includes a filter holder 2110 and at least one filter 2120 mounted on the filter holder 2110. The circuit board assembly 220 includes a circuit board 2210, at least one photosensitive chip 2220 and at least one electronic component 2230 mounted on the surface of the circuit board

2210, wherein the electronic component 2230 is located outside the photosensitive chip 2220. Further, the filter holder 2110 includes a lens base 2101 and a supporting portion 2102, wherein the supporting portion 2102 is extended from the lens base 2101 and is employed to attach the filter 2120 to the supporting portion 2102. The driving device 100 is mounted on the top surface of the lens base 2101.

It is worth to mention that, in the preferred embodiment of the present disclosure, the optical image stabilization assembly 20 can realize optical image stabilization by driving the entire imaging assembly 200, in which the circuit board 2210, the lens base 2101, and the optical filter 2120 are encapsulated as a whole to form a closed space. The photosensitive chip 2220 is received in the closed space, which improves the sealing performance of the photosensitive chip 2220 and ensures that the imaging of the photosensitive chip is not affected by dust during the manufacture or use of the camera module.

Preferably, the top portion of the lens base 2101 is connected in a transmission manner to the vibration compensation base 21, and since the vibration compensation base 21 is supported by the four supporting corners 322 of the bottom frame 32, four sides of the vibration compensation base 21 can be exposed to be connected to the lens base 2101.

The camera module further includes a bottom holder 400, wherein the bottom holder 400 is fixed to the bottom frame 32 of the driving device 100, and the bottom holder 400 and the bottom frame 32 form a bottom chamber, wherein the imaging assembly 200 is held in the bottom chamber to prevent the imaging module from being rushed out and causing damage to the camera module in a case where an external impact occurs.

Figure 17:
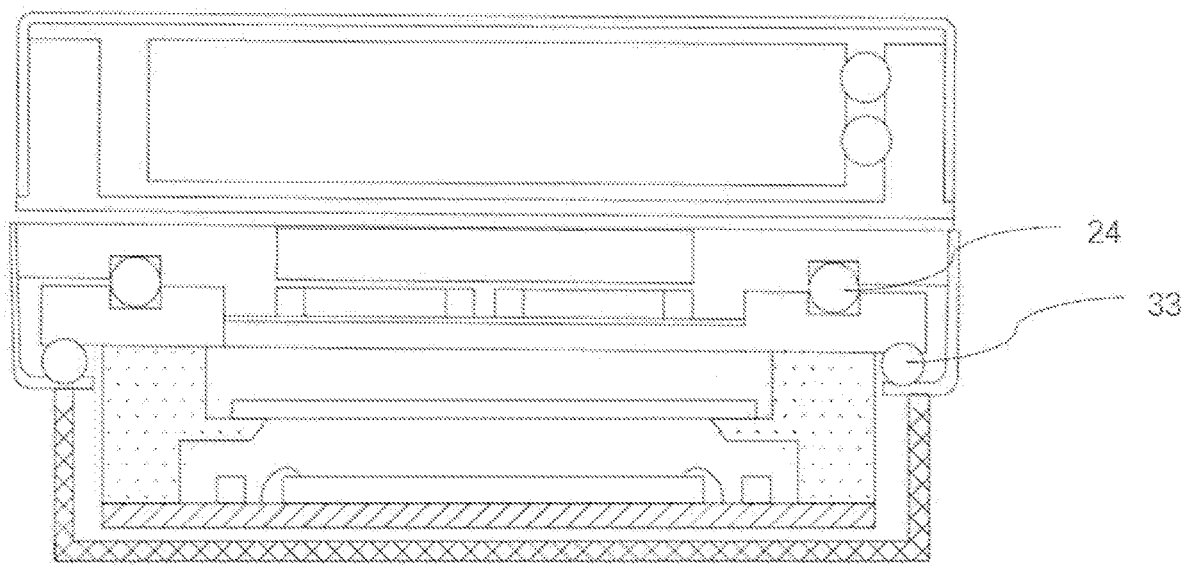
FIG. 17 is another cross-sectional view of the camera module along the optical axis direction according to the preferred embodiment of the present disclosure.

As shown in FIG. 17, the anti-vibration roller 24 is located between the vibration compensation base 21 and the fixed base 13, and the frame roller 33 is located between the vibration compensation base 21 and the bottom frame 32. In a case where the vibration compensation coil 221 is energized, the vibration compensation coil 221 interacts with the vibration compensation magnet 222 to generate a force perpendicular to and/or rotation around the optical axis direction, and drives the vibration compensation base 21 to drive the imaging assembly 200 to move in a direction perpendicular to and/or around the optical axis direction to realize optical image stabilization. The vibration compensation base 21 can be supported by the anti-vibration rollers 24 and the frame rollers 33 and a friction force generated during optical image stabilization is reduced.

Figure 18:
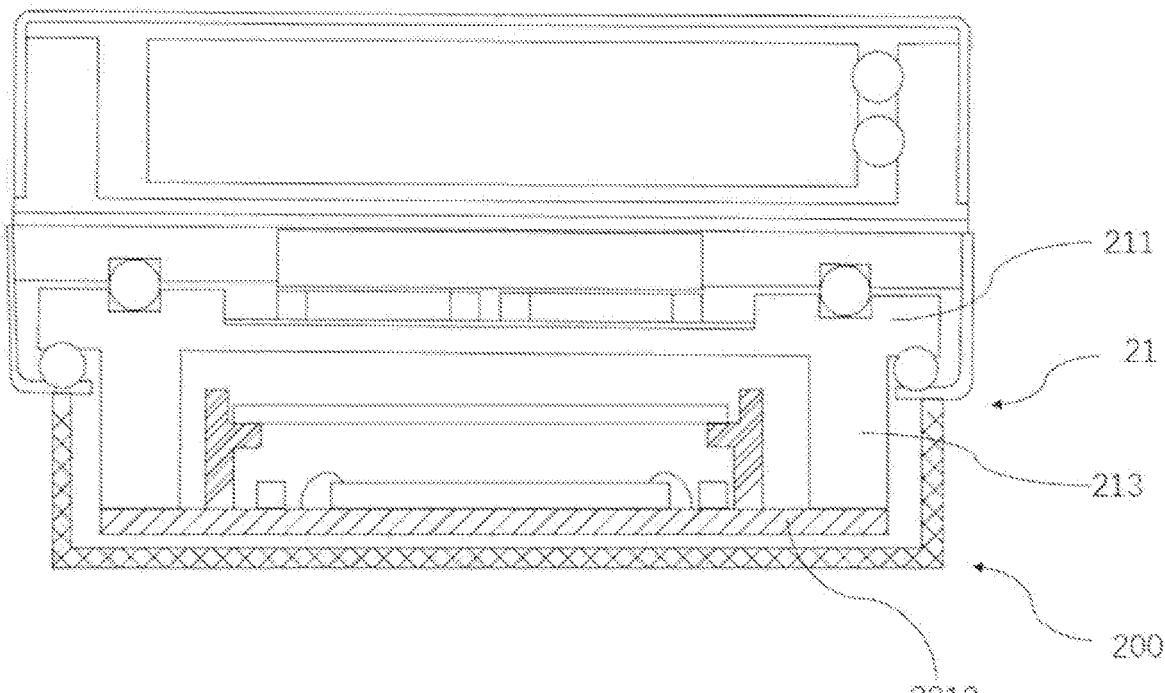
FIG. 18 is another cross-sectional view of a camera module along the optical axis direction according to a preferred embodiment of the present disclosure.

As shown in FIG. 18, different with the preferred embodiment described above, in the preferred embodiment of the present disclosure, the vibration compensation base 21 further includes a supporting leg 213 extended integrally downward from the base body 211 and connected to the circuit board 2210 of the imaging assembly 200. That is, the circuit board 2210 of the imaging assembly 200 is transmissibly connected to the vibration compensation base 21, and in a case where the vibration compensation coil 221 is energized, the vibration compensation coil 221 interacts with the vibration compensation magnet 222 to generate a force that rotates perpendicular to and/or around the optical axis direction. The vibration compensation coil 221 drives the vibration compensation base 21, and the vibration compensation base 21 drives the circuit board 2210 to move in a direction perpendicular to the optical axis direction and/or rotate around the optical axis direction, and the circuit board 2210 drives other components of the imaging assembly 200 to realize optical image stabilization.

Figure 19:
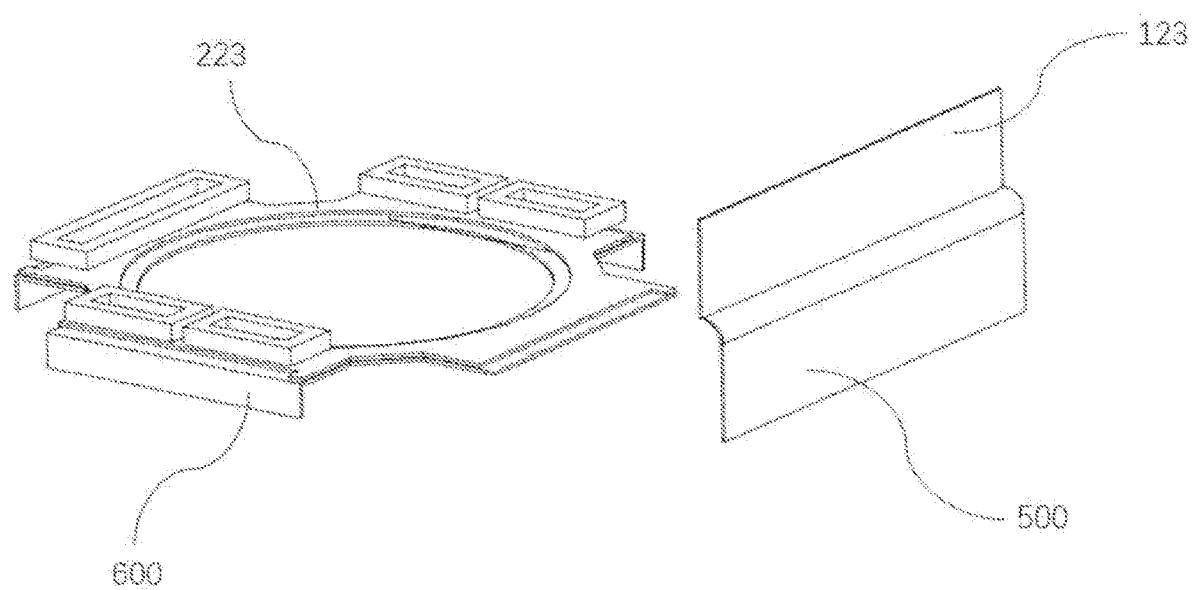
FIG. 19 is a schematic structural view of a connection of a driving device according to a preferred embodiment of the present disclosure.

As shown in FIG. 19 of the drawings of the present specification, the conduction of the auto-focus assembly 10 and the optical image stabilization assembly 20 of the driving device 100 of the camera module are illustrated. In the embodiment of the present disclosure, the focusing substrate 123 and the vibration compensation substrate 223 are in separate structure, and the focusing substrate 123 is in a vertical structure, and the vibration compensation substrate 223 is in a horizontal structure. In other words, the focusing substrate 123 and the vibration compensation substrate 223 are electrically connected to the circuit board 2210 of the imaging assembly 200 respectively. Preferably, the focusing substrate 123 and the vibration compensation substrate 223 are implemented as a flexible board circuit FPC.

The camera module further includes a first connecting belt 500 and a second connecting belt 600, wherein the focusing substrate 123 is electrically connected to the circuit board 2210 of the imaging assembly 200 by the first connecting belt 500, and the vibration compensation substrate 223 is electrically connected to the circuit board 2210 of the imaging assembly 200 by the second connecting belt 600. Preferably, the first connecting belt 500 and the second connecting belt 600 are flexible board circuits (FPC).

It is worth to mention that the vibration compensation substrate 223 is disposed horizontally, i.e. perpendicular to the optical axis direction, wherein the vibration compensation substrate 223 has a through hole so that light can pass through the through hole to reach the imaging assembly 200. It is understood that the number of the second connecting belts 600 can be one to three, and the plane on which the second connecting belts 600 are located is not the same as the plane on which the first connecting belt 500 is located to avoid causing electromagnetic interference. The second connecting belt 600 is bent downward from the edge of the vibration compensation substrate 21 and is electrically connected to the circuit board of the imaging assembly 200 to realize circuit conduction.

A driving device according to a second preferred embodiment of the present disclosure is illustrated in the following description with reference to FIGS. 20 to 27 of the drawings in the specification of the present disclosure. The driving device is adapted for a lens. The driving device drives a lens of a camera module and/or drives an imaging assembly of a camera module to move based on an optical axis O of the lens. The driving device has optical image stabilization and auto-focus functions. The driving device includes an auto-focus assembly 10' and an optical image stabilizing assembly 20', wherein the auto-focus assembly 10' drives the lens body to move along the optical axis direction to realize auto-focus, wherein the optical image stabilizing assembly 20' drives the imaging assembly to move perpendicular to the optical axis direction and/or rotate around the optical axis direction of the lens to realize optical image stabilization.

It is worth to mention that, in the preferred embodiment of the present disclosure, the optical image stabilization function and the auto-focus function of the driving device are separately arranged, so that not only the structure is simple, but also a larger anti-vibration travel can be obtained, so that a larger vibration of the camera module can be compensated.

In detail, the auto-focus assembly 10' includes a focusing base 11' and a focusing actuator 12', wherein the lens of the camera module is provided on the focusing base 11', the focusing base 11' is transmissibly connected to the focusing actuator 12', and the focusing base 11 is driven to move by the focusing actuator 12'. The focusing base 11' is driven by the focusing actuator 12' to drive the lens to move along the optical axis direction so as to realize optical focusing.

The lens of the camera module is disposed on the focusing base by glue, buckle, or thread. Preferably, the lens and the focusing base 11' have an integrated structure, that is, the focusing base 11' is a lens barrel of the lens, and the optical components of the lens, such as optical lenses, are arranged on the focusing base 11'. The focusing base 11' can also be defined as a carrier to drive the lens to move to realize auto-focusing. It will be understood by those skilled in the art that the integrated structure can reduce the size of the lens barrel in the lens and reduce the gap between the lens barrel and the carrier, thus achieving the beneficial effect of reducing the size of the imaging module.

The focusing base 11' has a lens aperture 110', wherein the lens is disposed on the lens aperture 110' of the focusing base 11', or the optical component of the lens is disposed on the lens aperture 110' of the focusing base 11'.

Figure 22:
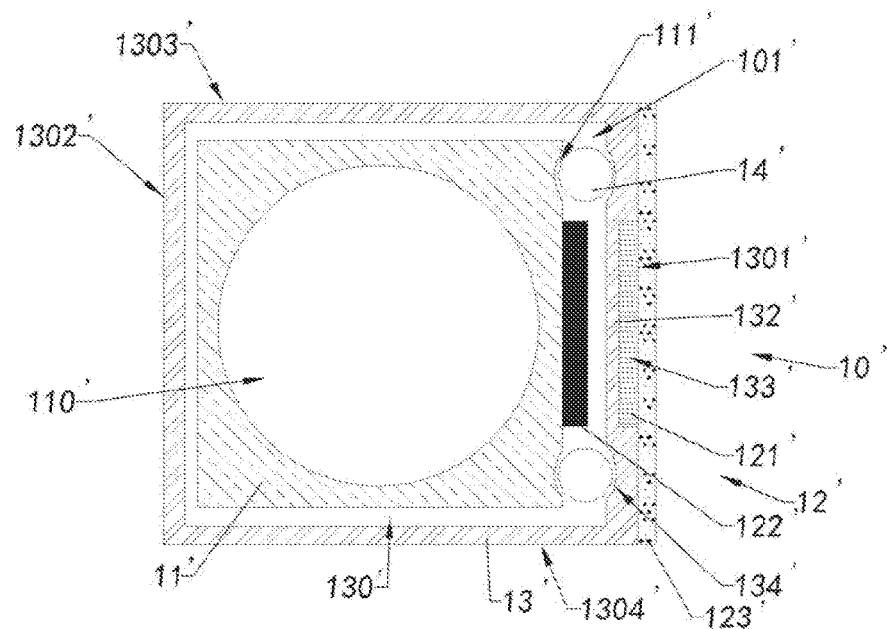
FIG. 22 is a cross-sectional view of an auto-focus assembly of the driving device along a direction perpendicular to the optical axis according to the preferred embodiment of the present disclosure.

As shown in FIG. 22, the focusing actuator 12' includes at least one focusing coil 121' and at least one focusing magnet 122', wherein the at least one focusing magnet 122' is disposed on an outer sidewall of the focusing base 11', wherein the focusing coil 121' and the focusing magnet 122' are disposed correspondingly. In a case where the focusing coil 121' is energized, a Lorentz force along the optical axis direction is generated between the focusing coil 121' and the focusing magnet 122', which drives the focusing base 11' to drive the lens to move along the optical axis direction to realize optical focusing.

It is worth to mention that in the preferred embodiment of the present disclosure, the focusing magnet 122' of the focusing actuator 12' is embedded in an outer sidewall of the focusing base 11', or the focusing magnet 122' is attached to the outer sidewall of the focusing base 11'. The manner in which the focusing magnet 122' is fixed is not limited here.

It is worth to mention that the focusing magnet 122' of the focusing actuator 12' may also be embedded or attached to an inner sidewall of the focusing base 11', that is, the focusing magnet 122' of the focusing actuator 12' may also be embedded or attached to a sidewall of the focusing base 11' so that the focusing magnet 122' and the focusing coil 121' are positioned corresponding each other.

The focusing actuator 12' further includes a focusing substrate 123', wherein the focusing substrate 123' is electrically connected to the focusing coil 121', and the focusing coil 121' of the focusing actuator 12' is electrically conducted by the focusing substrate 123'. Preferably, in the preferred embodiment of the present disclosure the focusing substrate 123' of the focusing actuator 12' is a flexible printed circuit board (FPC).

The focusing magnet 122' can be a group of magnets, the focusing magnet 122' is a magnet having an N pole and an S pole, and the number of the magnets can be one or more.

The focusing actuator 12' further includes at least one focusing magnetic inductive member 124', wherein the focusing magnetic inductive member 124' is corresponding to the focusing magnet 122', and the focusing magnetic inductive member 124' senses the position of the focusing magnet 122' and feeds back the change of the magnetic field caused by the change of the position of the focusing magnet 122'. Preferably, in the preferred embodiment of the present disclosure, the focusing magnetic inductive member 124' is a Hall sensor, wherein the focusing magnetic inductive member 124' is disposed on the focusing substrate 123'. Alternatively, in the preferred embodiment of the present disclosure the focusing magnetic inductive member 124' is a circuit module built into the focusing substrate 123'.

The focusing magnetic inductive member 124' is electrically connected to the focusing substrate 123'. During auto-focusing, the focusing magnet 122' moves along the optical axis direction with the lens, while the focusing magnetic inductive member 124' remains stationary. Because the up-down movement of the focusing magnet 122' causes a change in the magnetic field near the focusing magnetic inductive member 124', the focusing magnetic inductive member 124' senses the change, feeds back to the driving circuit of the focusing substrate 123', and adjusts the input current, so that the whole structure has a closed-loop system, thereby realizing the auto-focusing function quickly and accurately.

Figure 20:
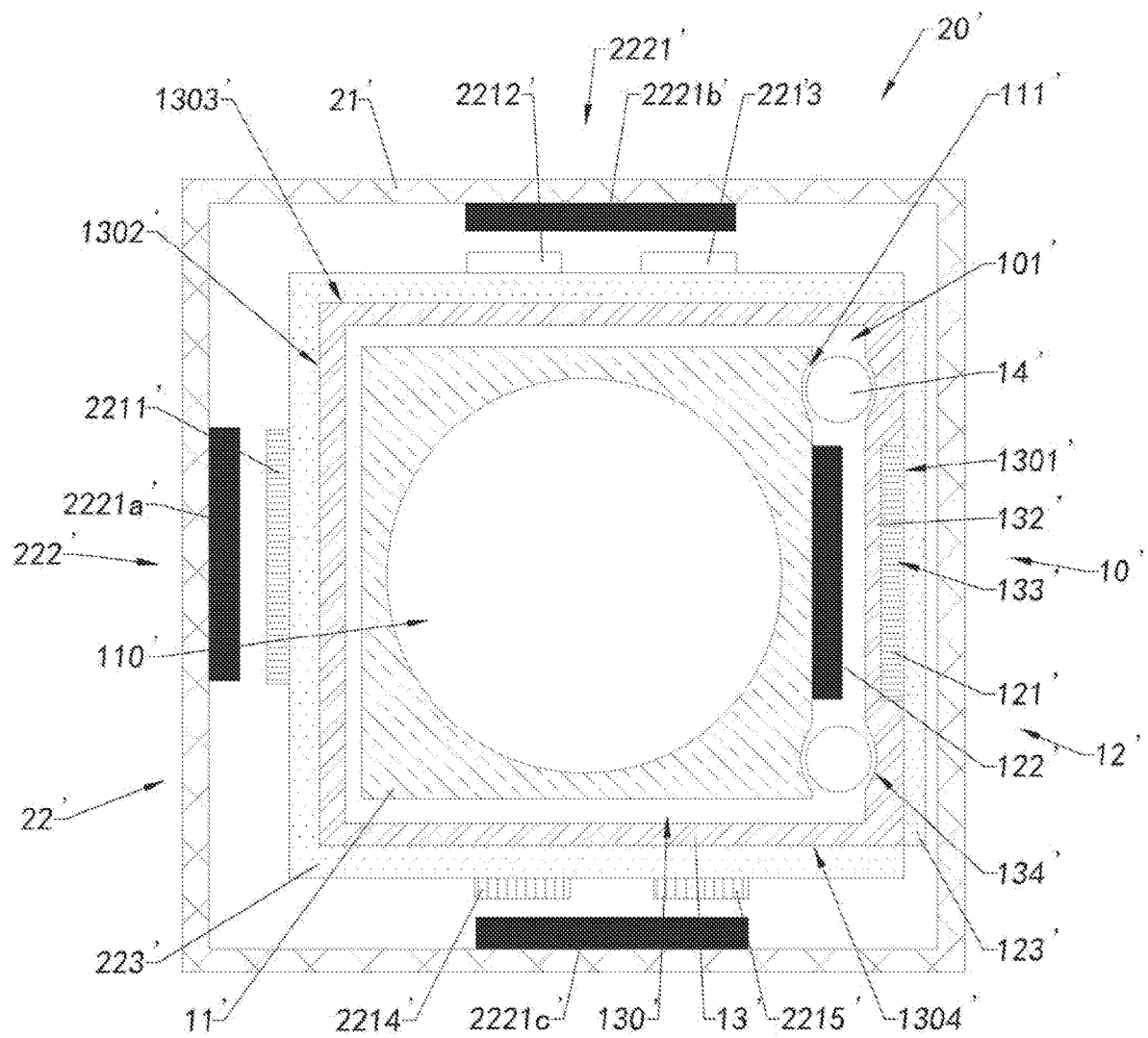
FIG. 20 is a schematic view of a driving device according to a second preferred embodiment of the present disclosure.
Figure 21:
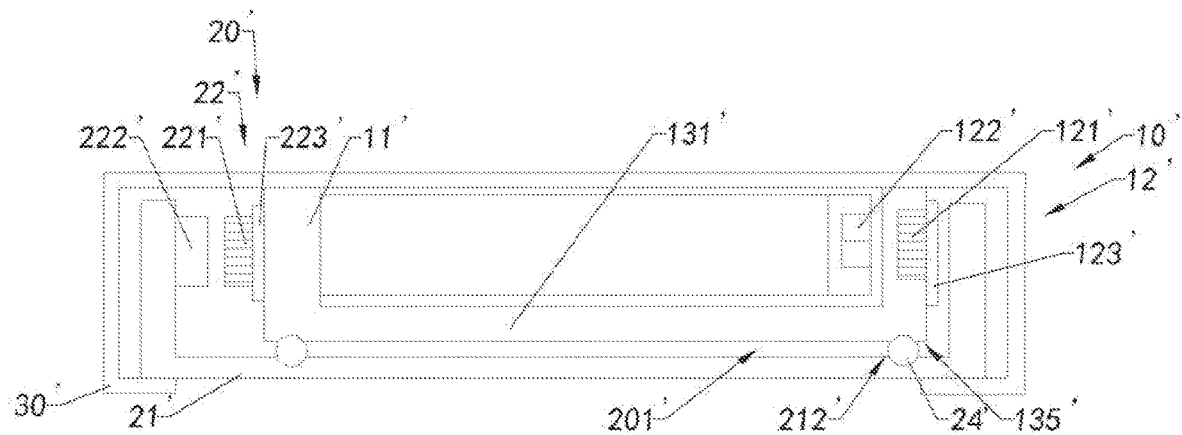
FIG. 21 is a cross-sectional view of the driving device along the optical axis direction according to the preferred embodiment of the present disclosure.

As shown in FIGS. 20 to 22, the auto-focus assembly 10' further includes a fixed base 13', wherein the focusing base 11' and the focusing actuator 12' are provided on the fixed base 13'. The fixed base 13' has a focusing chamber 130' in which the focusing base 11' and the focusing magnet 122' of the focusing actuator 12' are movably provided in the focusing chamber 130' of the fixed base 13' along the optical axis direction. The focusing coil 121' of the focusing actuator 12' and the focusing substrate 123' are fixed to the fixed base 13', wherein the focusing coil 121' is supported by the fixed base 13' and generates a magnetic force driving the focusing magnet 122' to move.

The fixed base 13' is a hollow structure passing through along the optical axis direction, wherein the fixed base 13' includes a base plate 131' and at least one supporting sidewall 132' which integrally is extended upward from the outer side of the base plate 131', wherein the focusing coil 121' of the focusing actuator 12' and the focusing substrate 123' are provided on the supporting sidewall 132' of the fixed base 13'. The base plate 131' and the supporting sidewall 132' of the fixed base 13' are perpendicular to each other, and perpendicular to each other means that they are 90° perpendicular or the perpendicular tolerance within 3°.

The fixed base 13' is further provided with at least an actuator mounting portion 133' in which the focusing coil 121' and the focusing substrate 123' of the focusing actuator 12' are fixed to the actuator mounting portion 133' of the fixed base 13', and the focusing coil 121' and the focusing substrate 123' of the focusing actuator 12' are fixed and supported by the actuator mounting portion 133'.

Preferably, the actuator mounting portion 133' is a groove formed in the supporting sidewall 132' of the fixed base 13', where the position of the actuator mounting portion 133' is corresponding to the position of the focusing magnet 122' of the focusing actuator 12'. Alternatively, the actuator mounting portion 133' to which the focusing coil 121' is mounted is a through hole formed in the supporting sidewall 132' of the fixed base 13'.

Preferably, the focusing substrate 123' of the focusing actuator 12' is attached to the outside of the supporting sidewall 132' of the fixed base 13'. It is worth to mention that the focusing coil 121' is provided on the actuator mounting portion 133' formed on the supporting sidewall 132', and the focusing substrate 123' can be more flatly attached to the outer sidewall of the fixed base 13' without being dropped because the focusing coil 121' is raised and cannot be firmly attached.

It is worth to mention that the magnetic field generated when the focusing coil 121' is energized can interact with the magnetic field of the focusing magnet 122' to generate a driving force along the optical axis direction and drive the lens to move along the optical axis direction to realize auto-focusing.

The fixed base 13' has a first outer sidewall 1301', a second outer sidewall 1302', a third outer sidewall 1303', and a fourth outer sidewall 1304', wherein the first outer sidewall 1301' and the second outer sidewall 1302' are disposed back to back, and the third outer sidewall 1303' and the fourth outer sidewall 1304' are disposed back to back. In the preferred embodiment of the present disclosure, the focusing coil 121' of the focusing actuator 12' is disposed on the first outer sidewall 1301' of the fixed base 13'. It will be understood that the actuator mounting portion 133' is a groove formed in the first outer sidewall 1301'. It is worth to mention that the focusing coil 121' may also be embedded or attached to an inner sidewall of the fixed base 13', i.e. the focusing coil 121' can be embedded or attached to a sidewall of the fixed base 13'.

The auto-focus assembly 10' further includes at least one focusing roller unit 14', wherein the focusing roller unit 14' is disposed between the focusing base 11' and the fixed base 13'. In a case where the focusing substrate 123' of the focusing actuator 12' is energized, the focusing coil 121' and the focusing magnet 122' generate force, and the focusing magnet 122' is driven to move along the optical axis direction by the focusing substrate 123'. The focusing roller unit 14' is employed to reduce resistance to movement of the focusing base 11' and to support and maintain a distance between the focusing base 11' and the fixed base 13' so that the lens can stably move along the optical axis direction.

The auto-focus assembly further includes at least one roller rail groove 101' is disposed between the focusing base 11' and the fixed base 13', the focusing roller unit 14' is disposed in the roller rail groove 101', the distance between the focusing base 11' and the fixed base 13' is supported and maintained by the focusing roller unit 14', and the movement of the focusing base 11' relative to the fixed base 13' along the optical axis direction is provided. The roller rail groove 101' is provided along the optical axis direction and is formed between the outer sidewall of the focusing base 11' and the inner sidewall of the fixed base 13'.

Specifically, the outer sidewall of the focusing base 11' has at least one first rail 111' in the Z-axis direction (optical axis direction), and the inner sidewall of the fixed base 13' has at least one second rail 134' in the Z-axis direction (optical axis direction), the position of the first rail 111' being disposed corresponding the position of the second rail 134', wherein the roller rail groove 101' is formed between the first rail 111' of the focusing base 11' and the second rail 134' of the fixed base 13' to provide movement of the focusing base 11' along the optical axis direction (Z-axis direction) with respect to the fixed base 13'. Since the roller rail groove 101' is defined to have directivity, that is, along the optical axis direction. Therefore, the focusing roller unit 14' can be moved in the Z-axis direction, and the moving direction of the lens can be made more accurate at the time of auto-focusing.

Preferably, in the preferred embodiment of the present disclosure, the number of the roller rail grooves 101' is two, and in a case where the roller rail grooves 101' are formed on one side of the focusing magnet 122', the roller rail grooves 101' are respectively formed on two sides of the focusing magnet 122', so that the movement of the focusing base 11' is more stable without inclination during auto-focusing. Alternatively, in other alternative embodiments of the present disclosure the roller rail groove 101' is formed on other sidewalls of the focusing base 11' and the fixed base 13' and is not limited by the present disclosure.

As shown in FIGS. 20 and 21, the optical image stabilization assembly 20' includes a vibration compensation base 21' and a vibration compensation actuator 22', wherein the vibration compensation base 21' is located below the fixed base 13', that is, the focusing base 11' and the fixed base 13' are sheathed inside the vibration compensation base 21'. During optical image stabilization, the vibration compensation base 21' is driven based on the compensation value and moved relative to the fixed base 13' to realize optical image stabilization of the lens. It is worth to mention that the movement of the optical image stabilization assembly 20' in the direction perpendicular to the optical axis or rotation around the optical axis can facilitate the lens to achieve OIS of a larger travel, including XOY direction compensation and RZ direction compensation. It is worth to mention that the vibration compensation base 21' of the optical image stabilization assembly 20' is connected to an imaging assembly of the camera module in a transmission manner, and in a case where the camera module needs vibration compensation, the vibration compensation base 21' of the optical image stabilization assembly 20' is forced to drive the imaging assembly of the camera module to compensate in the XOY direction and the RZ direction.

The vibration compensation actuator 22' further includes at least one vibration compensation coil 221' disposed on the outer sidewall of the fixed base 13', and at least one vibration compensation magnet 222' disposed on the inner sidewall of the vibration compensation base 21', and the vibration compensation coil 221' is positioned relative to the vibration compensation magnet 222'. It is worth to mention that in the preferred embodiment of the present disclosure, the vibration compensation coil 221' of the vibration compensation actuator 22' is disposed correspondingly with the vibration compensation magnet 222', and the position of the vibration compensation actuator 22' is not on the same side of the fixed base 13' as the position of the focusing actuator 12' of the auto-focus assembly 10'. In other words, the vibration compensation coil 221' of the vibration compensation actuator 22' can be disposed on other side of the sides of the focusing actuator 12' where the focusing coil 121' is located, such as a side adjacent to and/or facing to the focusing coil 121'. Therefore, the magnetic field generated by the vibration compensation magnet does not affect the magnetic field generated by the auto-focusing magnet, and magnetic interference does not occur during optical image stabilization and auto-focus, thus avoiding affecting the imaging accuracy of the lens during optical image stabilization and/or auto-focus.

In a case where the vibration compensation coil 221' of the vibration compensation actuator 22' is energized, a Lorentz force is generated between the vibration compensation coil 221' and the vibration compensation magnet 222' which rotates perpendicular to and/or around the optical axis to drive the vibration compensation base 21' to drive an imaging assembly of the camera module to move perpendicular to and/or around the optical axis to realize optical anti-vibration.

The vibration compensation actuator 22' further includes a vibration compensation substrate 223', wherein the vibration compensation substrate 223' is electrically connected to the vibration compensation coil 221' of the vibration compensation actuator 22'. The vibration compensation coil 221' of the vibration compensation actuator 22' is electrically conductive to the imaging assembly through the vibration compensation substrate 223'. The vibration compensation substrate 223' is fixed to an outer sidewall of the fixed base

13', wherein the vibration compensation coil 221' is provided on the vibration compensation substrate 223', and the vibration compensation coil 221' is supported on the fixed base 13' by the vibration compensation substrate 223'. Therefore, it can be understood that in a case where the vibration compensation substrate 223' energizes the vibration compensation coil 221', the vibration compensation coil 221 drives the vibration compensation magnet 222' supported by the fixed base 13', so that the vibration compensation magnet 222' drives the vibration compensation base 21' to move or rotate in a specific direction. It is worth to mention that, in the preferred embodiment of the present disclosure, the vibration compensation substrate 223' is fixed to the other three outer sidewalls of the fixed base 13' except the focusing substrate 123', and the vibration compensation coil 221' is supported by the fixed base 13'. It will be understood that in the preferred embodiment of the present disclosure, the vibration compensation substrate 223' is supported on the second outer sidewall 1302', the third outer sidewall 1303', and the fourth outer sidewall 1304' of the fixed base 13'.

In the preferred embodiment of the present disclosure, the vibration compensation magnet 222' is disposed on three adjacent inner sidewalls of the vibration compensation base 21', and the sidewall on which the vibration compensation magnet 222' is located is different from the sidewall on which the auto-focusing magnet 122' is located, so that the auto-focus assembly 10' and the optical image stabilization assembly 20' do not interfere. In other words, the magnetic field generated by the vibration compensation magnet 222' does not affect the magnetic field generated by the auto-focusing magnet 122', and magnetic interference does not occur during optical image stabilization and auto-focusing, thus avoiding affecting the imaging accuracy of the lens during optical image stabilization and/or auto-focusing. That is to say, in a case where the lens moves in the X direction, the Y direction and/or the RZ direction, the lens does not shift in the Z axis direction; And, in a case where the lens moves in the Z-axis direction, the lens does not shift in the X-direction, the Y-direction, and/or the RZ direction.

It is worth to mention that in the preferred embodiment of the present disclosure, the vibration compensation substrate 223' is provided on the other three outer sidewalls of the fixed base 13' (i.e., other outer sidewalls that support the focusing substrate 123'), and three vibration compensation coils 221' are provided on the vibration compensation substrate 223'. The vibration compensation coil 221' is disposed outside the vibration compensation substrate 223', and three corresponding vibration compensation magnets 222' are disposed on the inner sidewall of the vibration compensation base 21' by attaching or embedding, that is, the vibration compensation magnets 222' can be embedded or attached to one sidewall of the vibration compensation base 21', so that the vibration compensation magnets 222' and the vibration compensation coil 221' are positioned relative to each other.

The vibration compensation magnet 222' further includes three vibration compensation magnet groups 2221', namely a first vibration compensation magnet group 2221a', a second vibration compensation magnet group 2221b', and a third vibration compensation magnet group 2221c', wherein each of the vibration compensation magnet groups (2221a', 2221b', and 2221c') is a magnet having an N pole and an S pole, and the number of the magnets can be one or more.

Preferably, the vertical planes on which the vibration compensation coil 221' and the focusing coil 121' are located are respectively located on four sides of the fixed base 13'. In a plane perpendicular to the optical axis direction (i.e., the XOY direction), the first vibration compensation magnet groups 2221a' is located on the inner sidewall of the vibration compensation base 21' in the X-axis direction, and the second vibration compensation magnet groups 2221b' and the third vibration compensation magnet groups 2221c' are located on the inner sidewall of the vibration compensation base 21' in the Y-axis direction, i.e. the first vibration compensation magnet groups 2221a' is used for X-axis direction anti-vibration, and the second vibration compensation magnet groups 2221b' and the third vibration compensation magnet groups 2221c' are used for Y-axis direction and RZ direction anti-vibration.

It is worth to mention that, in the preferred embodiment of the present disclosure, the first vibration compensation magnet group 2221a' is corresponding to the second outer sidewall 1302' of the fixed base 13', the second vibration compensation magnet group 2221b' is corresponding to the third outer sidewall 1303' of the fixed base 13', and the third vibration compensation magnet group 2221a is corresponding to the fourth outer sidewall 1304' of the fixed base 13'.

The vertical plane of the first vibration compensation magnet group 2221a is corresponding to the vertical plane of the focusing magnet 122', and the vertical plane of the second vibration compensation magnet group 2221b is corresponding to the vertical plane of the third vibration compensation magnet group 2221c. That is, the three vibration compensation magnet groups 2221' and the focusing magnet 122' are respectively disposed on four sides where the driving device does not intersect, so that the optical image stabilization assembly 20' and the auto-focus assembly 10' do not interfere with each other.

In other words, the magnetic field generated by the vibration compensation magnet 2221' does not affect the magnetic field generated by the auto-focusing magnet 122', and magnetic interference does not occur during optical image stabilization and auto-focusing, thus avoiding affecting the imaging accuracy of the lens during optical image stabilization and/or auto-focusing. That is to say, in a case where the lens moves in the X direction, the Y direction and/or the RZ direction, the lens does not shift in the Z axis direction; And, in a case where the lens moves in the Z-axis direction, the lens does not shift in the X-direction, the Y-direction, and/or the RZ direction.

Preferably, the vibration compensation substrate 223' is implemented as a flexible circuit board (FPC), wherein the vibration compensation substrate 223' is supported on the outer sidewall of the fixed base 13', and the vibration compensation coil 221' located outside the vibration compensation substrate 223' is disposed corresponding to the vibration compensation magnet groups 2221'. In a case where the vibration compensation coil 221' is energized, a Lorentz force is generated between the vibration compensation coil 221' and the vibration compensation magnet group 2221' which rotates perpendicular to and/or around the optical axis, and the vibration compensation magnet group 2221' drives the vibration compensation base 21' to drive the imaging assembly of the camera module to move perpendicular to and/or around the optical axis of the lens, thus realizing optical anti-vibration.

It is worth to mention that, in the preferred embodiment of the present disclosure, the vibration compensation substrate 223' is disposed on the outer side of the fixed base 13' along the optical axis direction, the vibration compensation coil 221' is supported on the fixed base 13' by the vibration compensation substrate 223', the vibration compensation coil 221' is supported by the fixed base 13' to drive the vibration compensation magnet group 2221', and then the vibration compensation base 21' drives or drives the imaging assembly to move perpendicular to the optical axis direction and/or rotate around the lens optical axis direction to realize optical image stabilization.

As shown in FIG. 20, in the preferred embodiment of the present disclosure, the vibration compensation substrate 223' and the focusing substrate 123' are provided together on four sides of the outer sidewall of the fixed base 13'. It is worth to mention that the pin or wire extended from the bottom of the vibration compensation substrate 223' and the focusing substrate 123' are electrically connected to the circuit board of the imaging assembly to achieve circuit conduction.

In the preferred embodiment of the present disclosure, in a case where the focusing coil 121' is energized, the interaction between the focusing coil 121' and the focusing magnet 122' generates a driving force along the optical axis direction, and drives the focusing base 11' to move along the optical axis direction to realize auto-focusing of the lens. In this process, the focusing coil 121' does not move, and the focusing base 11' is driven by the focusing magnet 122'. After the vibration compensation coil 221' is energized, the interaction between the vibration compensation coil 221' and the vibration compensation magnet 222' generates a driving force that rotates perpendicular to and/or about the optical axis direction, and drives a force that rotates perpendicular to and/or about the optical axis direction of the vibration compensation magnet 222' to achieve optical image stabilization. During this process, the vibration compensation coil 221' does not move and the vibration compensation base 21' is driven by the vibration compensation magnet 222'.

The vibration compensation coil 221' further includes a first vibration compensation coil unit 2211', a second vibration compensation coil unit 2212', a third vibration compensation coil unit 2213', a fourth vibration compensation coil unit 2214', and a fifth vibration compensation coil unit 2215', wherein the first vibration compensation coil unit 2211', the second vibration compensation coil unit 2212', the third vibration compensation coil unit 2213', the fourth vibration compensation coil unit 2214', and the fifth vibration compensation coil unit 2215' are disposed on the upper surface of the vibration compensation base 223', and each of the vibration compensation coil units faces the vibration compensation magnet groups 2221'.

The first vibration compensation coil unit 2211' is disposed on a side directly facing to the first vibration compensation magnet group 2221a' i.e. on the other side corresponding to the focusing coil 121'. In a case where the first vibration compensation coil unit 2211' is energized, the magnetic force between the first vibration compensation coil unit 2211' and the first vibration compensation magnet group is for anti-vibration in the X-axis direction. The second vibration compensation coil unit 2212', the third vibration compensation coil unit 2213', the fourth vibration compensation coil unit 2214', and the fifth vibration compensation coil unit 2215' are provided on two sides adjacent to the first vibration compensation coil unit 2211', wherein the magnetic force between the second vibration compensation coil unit 2212', the third vibration compensation coil unit 2213', the fourth vibration compensation coil unit 2214', and the fifth vibration compensation coil unit 2215' and the second vibration compensation magnet group 2221b and the third vibration compensation magnet group 2221c after being energized is for anti-vibration in the Y-axis direction and the RZ direction.

It is worth to mention that in the preferred embodiment of the present disclosure the second vibration compensation coil unit 2212' and the fourth vibration compensation coil unit 2214' are disposed corresponding each other in the forward direction based on the X-axis direction. The third vibration compensation coil unit 2213' and the fifth vibration compensation coil unit 2215' are disposed corresponding each other in the forward direction based on the Y-axis direction. The second vibration compensation coil unit 2212' and the fifth vibration compensation coil unit 2215' are disposed diagonally based on the plane where the XOY axis is located. The third vibration compensation coil unit 2213' and the fourth vibration compensation coil unit 2214' are disposed diagonally based on the plane where the XOY axis is located.

Preferably, the second vibration compensation coil unit 2212', the third vibration compensation coil unit 2213' are provided on a side facing to the second vibration compensation magnet group 2221b, and the fourth vibration compensation coil unit 2214' and the fifth vibration compensation coil unit 2215' are provided on a side facing to the third vibration compensation magnet group 2221c.

Figure 24:
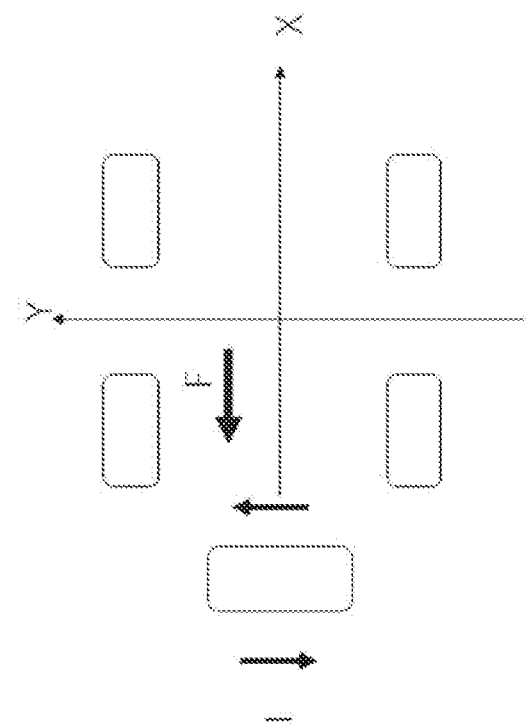
FIG. 24 is a schematic view showing that the driving device compensates for movement along the X-axis direction according to the preferred embodiment of the present disclosure.
Figure 24:
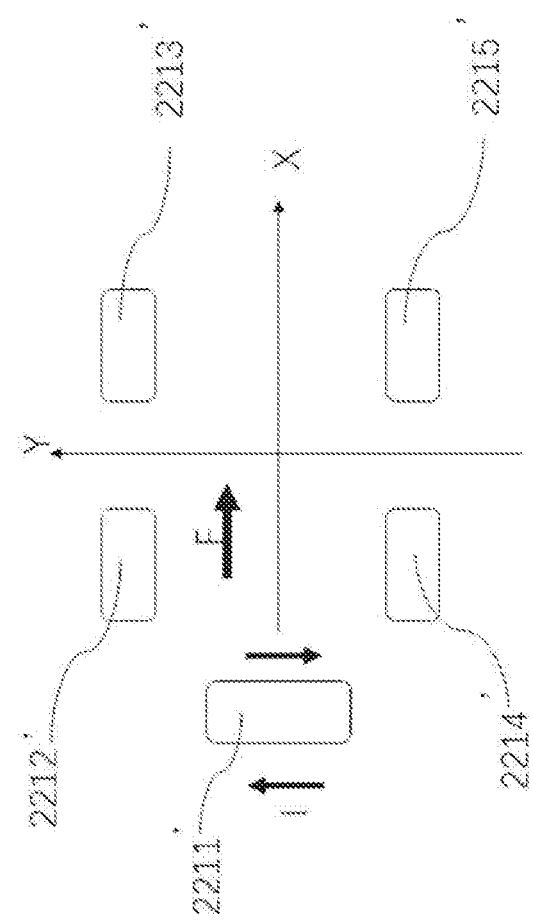

As shown in FIG. 24, in a case where the lens is to compensate in the X-axis direction, i.e. in a case where the imaging assembly needs to be controlled to move forward along the X-axis (for example, along the right side of the X-axis), a clockwise current is applied to the first vibration compensation coil unit 2211', and the first vibration compensation coil unit 2211' interacts with the first vibration compensation magnet group 2221a, so that the first vibration compensation coil unit 2211' is subjected to the forward force along the X-axis provided by the first vibration compensation magnet group 2221a, and then the imaging assembly is driven to move along the right side of the X-axis by the first vibration compensation coil unit 2211' through the vibration compensation base 21'. Conversely, in a case where a counterclockwise current is applied to the first vibration compensation coil unit 2211', the first vibration compensation coil unit 2211' is subjected to a negative force along the X-axis provided by the first vibration compensation magnet group 2221a, and then the first vibration compensation coil unit 2211' drives the imaging assembly to move along the left side of the X-axis through the vibration compensation base 21', thereby realizing optical anti-vibration in the X-axis direction.

Figure 25:
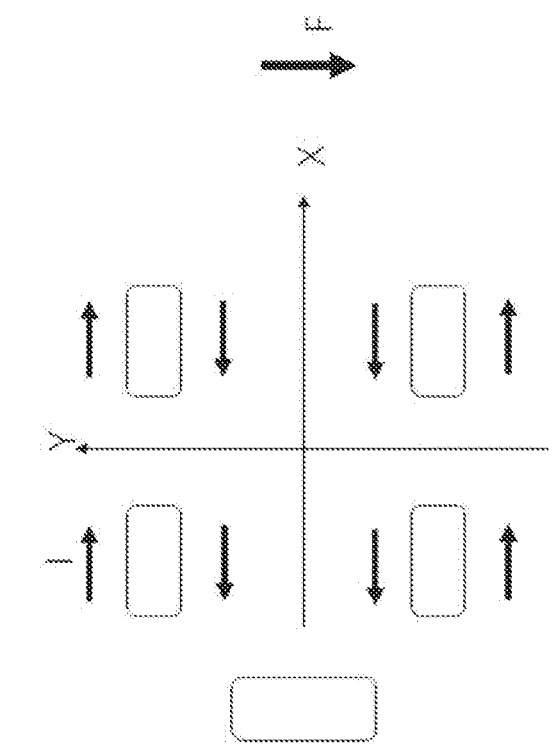
FIG. 25 is a schematic view showing that the driving device compensates for movement along the Y-axis direction according to the preferred embodiment of the present disclosure.
Figure 25:
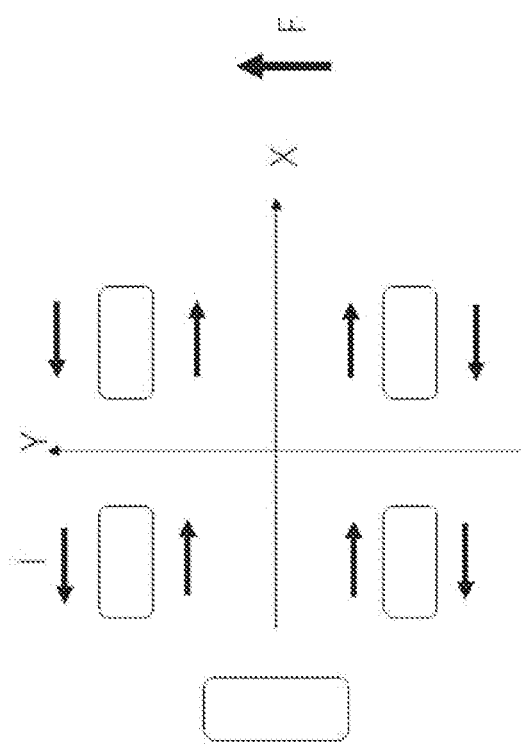

As shown in FIG. 25, in a case where the lens is to compensate for the Y-axis direction, i.e. in a case where the imaging assembly needs to be controlled to translate in the Y-axis forward direction, the second vibration compensation coil unit 2212', the third vibration compensation coil unit 2213' are supplied with counterclockwise current, and the fourth vibration compensation coil unit 2214' and the fifth vibration compensation coil unit 2215' are supplied with clockwise current. The second vibration compensation coil unit 2212' and the third vibration compensation coil unit 2213' interact with the second vibration compensation magnet group 2221b such that the second vibration compensation coil unit 2212' and the third vibration compensation coil unit 2213' are subjected to a force in the positive direction along the Y axis. The fourth vibration compensation coil unit 2214' and the fifth vibration compensation coil unit 2215' interact with the third vibration compensation magnet group 2221c such that the fourth vibration compensation coil unit 2214' and the fifth vibration compensation coil unit 2215' are subjected to a force in the positive direction along the Y axis. In short, in a case where the second vibration compensation coil unit 2212', the third vibration compensation coil unit 2213' are supplied with current in the counterclockwise direction, and the fourth vibration compensation coil unit 2214' and the fifth vibration compensation coil unit 2215' are supplied with current in the clockwise direction, the vibration compensation coil 221' is applied in the forward direction along the Y axis, and the vibration compensation coil 221' drives the imaging assembly to move in the forward direction along the Y axis through the vibration compensation base 21'. Conversely, the second vibration compensation coil unit 2212', the third vibration compensation coil unit 2213' are supplied with a clockwise current, the fourth vibration compensation coil unit 2214' and the fifth vibration compensation coil unit 2215' are supplied with a counterclockwise current, the vibration compensation coil 221' is subjected to a force in the negative direction along the Y axis, and the vibration compensation coil 221' drives the imaging assembly to move in the negative direction along the Y axis through the vibration compensation base 21'.

Figure 26:
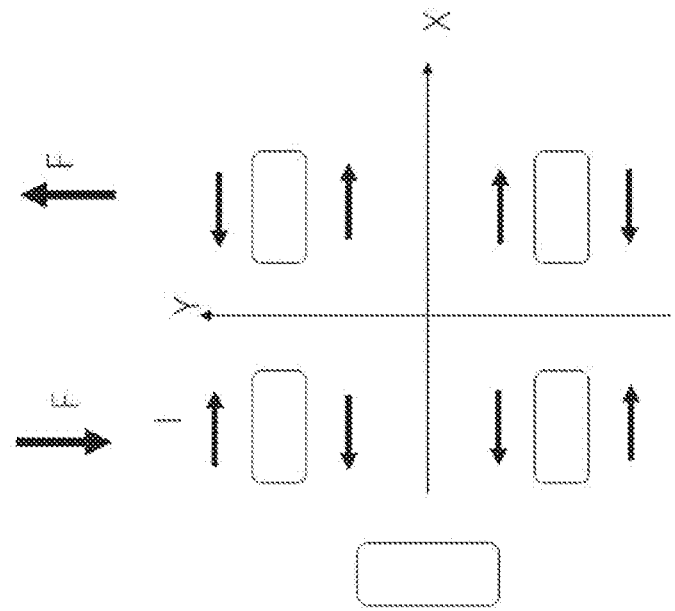
FIG. 26 is a schematic view showing that the driving device compensates for rotation along optical axis rotation according to the preferred embodiment of the present disclosure.
Figure 26:
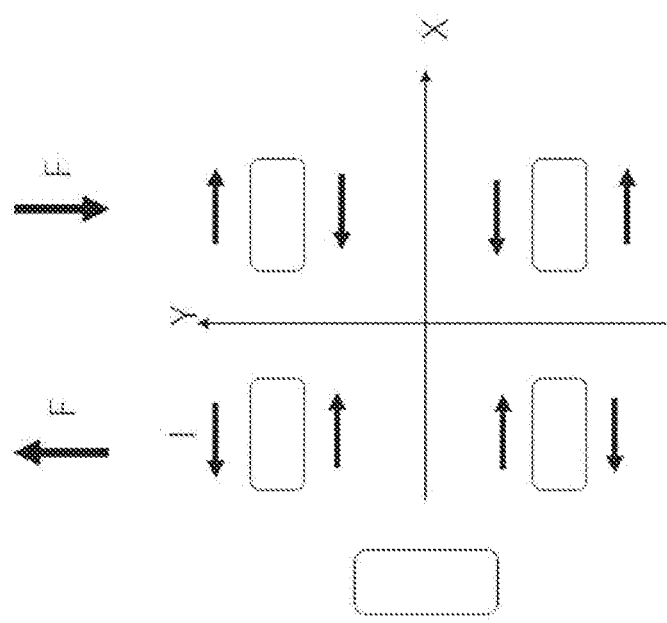

As shown in FIG. 26, in a case where the lens is to compensate for the rotation of the optical axis, i.e. in a case where it is necessary to control the imaging assembly to realize RZ clockwise rotation about the optical axis, the third vibration compensation coil unit 2213', the fourth vibration compensation coil unit 2214' are supplied with current in the clockwise direction, and the second vibration compensation coil unit 2212', the fifth vibration compensation coil unit 2215' are supplied with current in the counterclockwise direction. The third vibration compensation coil unit 2213' and the fifth vibration compensation coil unit 2215' are subjected to a force in the Y-axis negative direction. The second vibration compensation coil unit 2212' and the fourth vibration compensation coil unit 2214' are subjected to a Y-axis positive force, so two sides of the vibration compensation coil 221' are subjected to a positive force and a negative force in the Y-axis direction, thereby forming a clockwise torsional force. The vibration compensation coil 221' drives the imaging assembly to rotate clockwise around the optical axis through the vibration compensation base 21' to realize anti-vibration in the RZ direction. Conversely, the second vibration compensation coil unit 2212' and the fifth vibration compensation coil unit 2215' are supplied with current in the clockwise direction, and the third vibration compensation coil unit 2213' and the fourth vibration compensation coil unit 2214' are supplied with current in the counterclockwise direction. The third vibration compensation coil unit 2213' and the fifth vibration compensation coil unit 2215' are subjected to a force in the Y-axis positive direction. The second vibration compensation coil unit 2212' and the fourth vibration compensation coil unit 2214' are subjected to a force in the negative direction of the Y axis, thereby forming a counterclockwise torsional force. The vibration compensation coil 221' drives the imaging assembly to rotate counterclockwise around the optical axis to realize anti-vibration in the RZ direction.

The optical image stabilization assembly 20' further includes at least one vibration magnetic induction member 23', the vibration magnetic induction member 23' is electrically connected to the vibration compensation substrate 223', and the vibration magnetic induction member 23' is disposed face to face with the vibration compensation magnet groups 2221'. Preferably, the vibration magnetic induction member 23' is provided on the vibration compensation substrate 223', which is employed to sense the position of the vibration compensation magnet groups 2221' and feedback on a change in the magnetic field due to a change in the position of the vibration magnetic induction member 223' with respect to the vibration compensation magnet groups 2221'.

It is worth to mention that during optical image stabilization, the vibration compensation coil 221' rotates along with the imaging assembly in the direction perpendicular to and/or around the optical axis while the vibration compensation magnet groups 2221' remain stationary. The movement of the vibration compensation coil 221' causes the vibration magnetic inductance element 23' to change the magnetic field relative to the vibration compensation magnet group 2221', and the vibration magnetic inductance element 23' senses the change and feeds back to the driving circuit through the vibration compensation substrate 223' to adjust the input current, so that the whole structure forms a closed-loop system, thereby realizing the optical image stabilization function quickly and accurately.

Preferably, in the preferred embodiment of the present disclosure the vibration compensation magnet groups 2221' is implemented as a Hall element.

The optical image stabilization assembly 20' further includes at least one anti-vibration roller 24', the anti-vibration roller 24' is disposed between the vibration compensation base 21' and the fixed base 13' for supporting and maintaining a distance between the vibration compensation base 21' and the fixed base 13'. The vibration compensation base 21' includes a base body 211' and at least one roller receiving groove 212', wherein the roller receiving groove 212' has a slot, and the anti-vibration roller 24' is disposed in the roller receiving groove 212' of the vibration compensation base 21'. It is worth to mention that the receiving space of the roller receiving groove 24' is slightly larger than the roller diameter of the anti-vibration roller 24' to allow the anti-vibration roller 24' to roll in the roller receiving groove 212' and to reduce the friction between the vibration compensation base 21' and the fixed base 13' by the rolling friction of the anti-vibration roller 24'.

Preferably, in the preferred embodiment of the present disclosure, the number of the anti-vibration rollers 24' of the optical image stabilization assembly 20' is four, wherein the number of the roller receiving grooves 212' of the vibration compensation base 21' corresponds to the number of the anti-vibration rollers 24'. Preferably, the roller receiving grooves 212' are located at four corner positions of the base body 211' of the vibration compensation base 21'.

The anti-vibration roller 24' is supported between the upper side of the vibration compensation base 21' and the lower side of the fixed base 13', and forms an anti-vibration adjustment space 201', wherein the anti-vibration roller 24' supports and maintains the distance between the vibration compensation base 21' and the fixed base 13, and reduces the friction between the vibration compensation base 21' and the fixed base 13' by rolling friction instead of sliding friction.

The fixed base 13' further includes at least a lower groove 135' formed on the lower surface of the fixed base 13' and facing the roller receiving groove 212' of the vibration compensation base 21'. The anti-vibration roller 24' is limited between the lower groove 135' of the fixed base 13' and the roller receiving groove 212'. It will be understood that the lower groove 135' and the roller receiving groove 212' together form the anti-vibration adjustment space 201'. It will be understood that in the preferred embodiment of the present disclosure, the number of the lower grooves 135' of the fixed base 13' is four, wherein the lower grooves 135' are facing to the roller receiving grooves 212' of the vibration compensation base 21', forming four of the anti-vibration adjustment spaces 201' to provide rotation of the vibration compensation base 21' relative to the fixed base 13' in a direction perpendicular to and/or around the optical axis.

It is worth to mention that the anti-vibration adjustment space 201' is formed at the four corners of the vibration compensation base 21' and the fixed base 13', which reduces the space occupation of the driving device, and the supporting action of the vibration roller 24' can keep a certain gap between the vibration compensation magnet groups 2221' and the vibration compensation coil 221', thereby making the vibration compensation base 21' move more smoothly.

Figure 27:
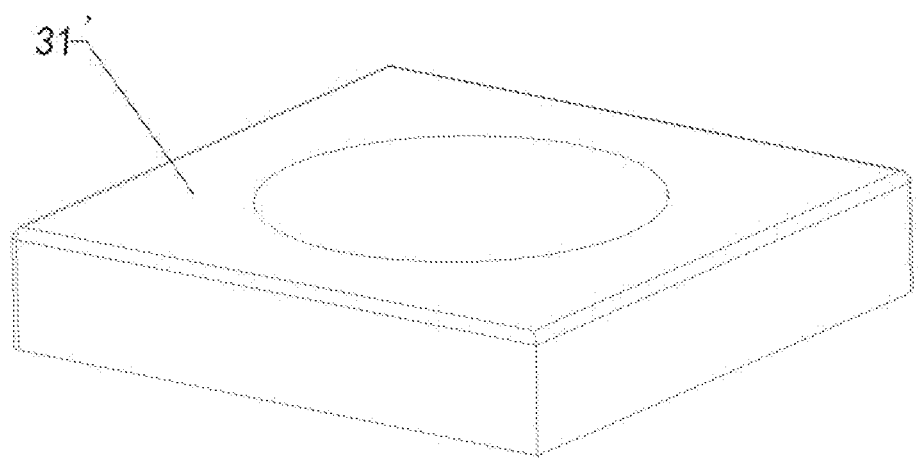
FIG. 27 is a schematic view of an outer frame structure of the driving device according to the above preferred embodiment of the present disclosure.
Figure 27:
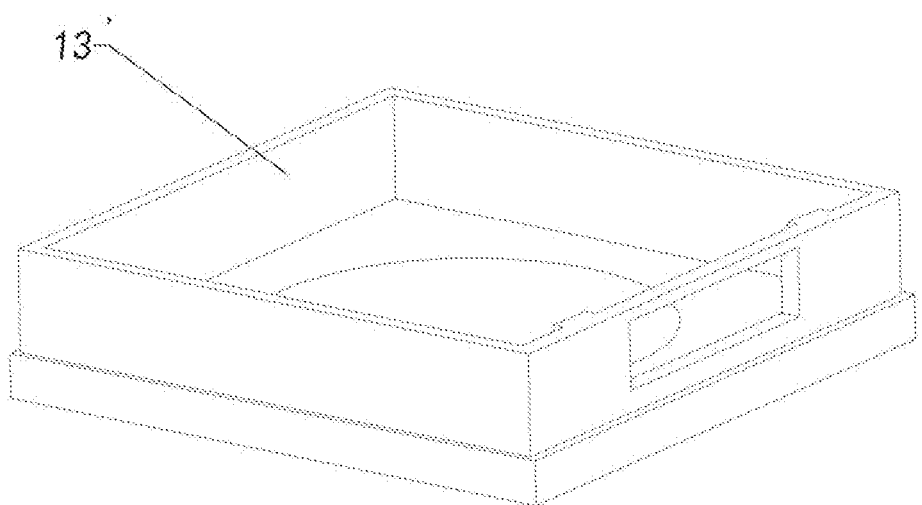
Figure 27:
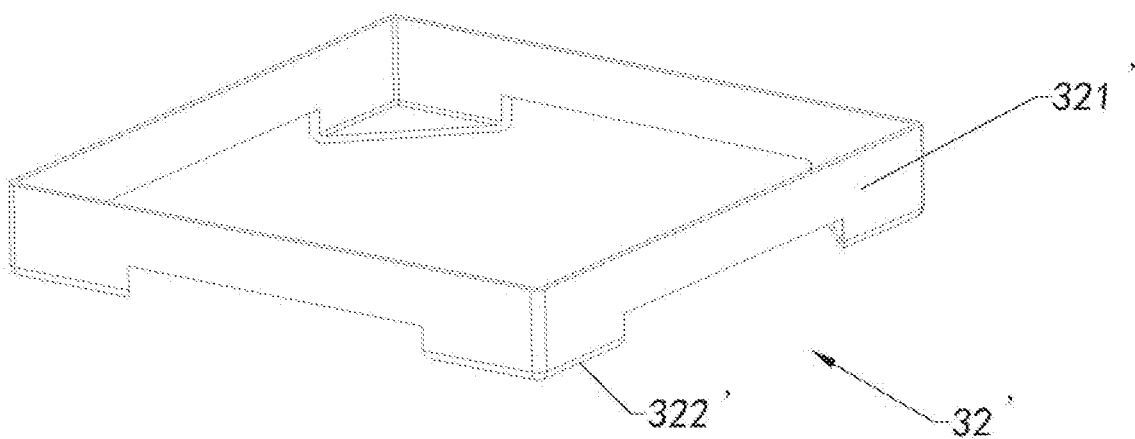

As shown in FIG. 27, the driving device further includes an outer frame 30' to which the auto-focus assembly 10' and the optical image stabilization assembly 20' of the driving device are fixed and protected by the outer frame 30'. The outer frame 30' includes a housing 31' and a bottom frame 32', wherein the housing 31' and the bottom frame 32' are combined to form a protective space 301', wherein the auto-focus assembly 10' and the optical image stabilization assembly 20' are supported in the protective space 301' by the outer frame 30' to prevent the auto-focus assembly 10' and the optical image stabilization assembly 20' from falling off and being damaged due to external impact.

It is worth to mention that the outer frame 30' can block electromagnetic waves generated during operation of the camera module to produce an electromagnetic shielding effect. If electromagnetic waves generated during driving the camera module are emitted to the outside or are emitted to the outside of the camera module, the electromagnetic waves may affect other electronic components, which may lead to communication errors or failures. In the preferred embodiment of the present disclosure, the material of the housing 31' can be a metallic material and the housing 31' is grounded, so that the housing 31' serves as an electromagnetic shield. Alternatively, the material of the housing 31' can be a plastic material the surface of which is coated with a conductive material to block electromagnetic waves. This present disclosure is not limited to the material of the housing. The housing 31' has an opening so that light passing through the lens can be incident on the imaging assembly for imaging.

Preferably, the housing 31' is fixed to the upper portion of the fixed base 13', the bottom frame 32' is fixed to the lower portion of the fixed base 13', and the bottom frame 32' includes a frame body 321' and four supporting corners 322' extended inward from the corners of the frame body 321', and the optical image stabilization assembly 20' is supported at the supporting corners 322', so that the four bottom edges of the optical image stabilization assembly 20' can be linked with the imaging assembly, which not only can increase the bonding area and make the connection more firm, but also can further reduce the height size of the camera module relative to the imaging assembly connected to the bottom frame 32'.

It is worth to mention that, in the embodiment, the anti-vibration travel along the direction perpendicular to the optical axis in the optical image stabilization can reach ±301 mm, the anti-vibration travel around the optical axis can reach ±1°, and the auto-focusing travel can reach ±500 mm.

Figure 28:
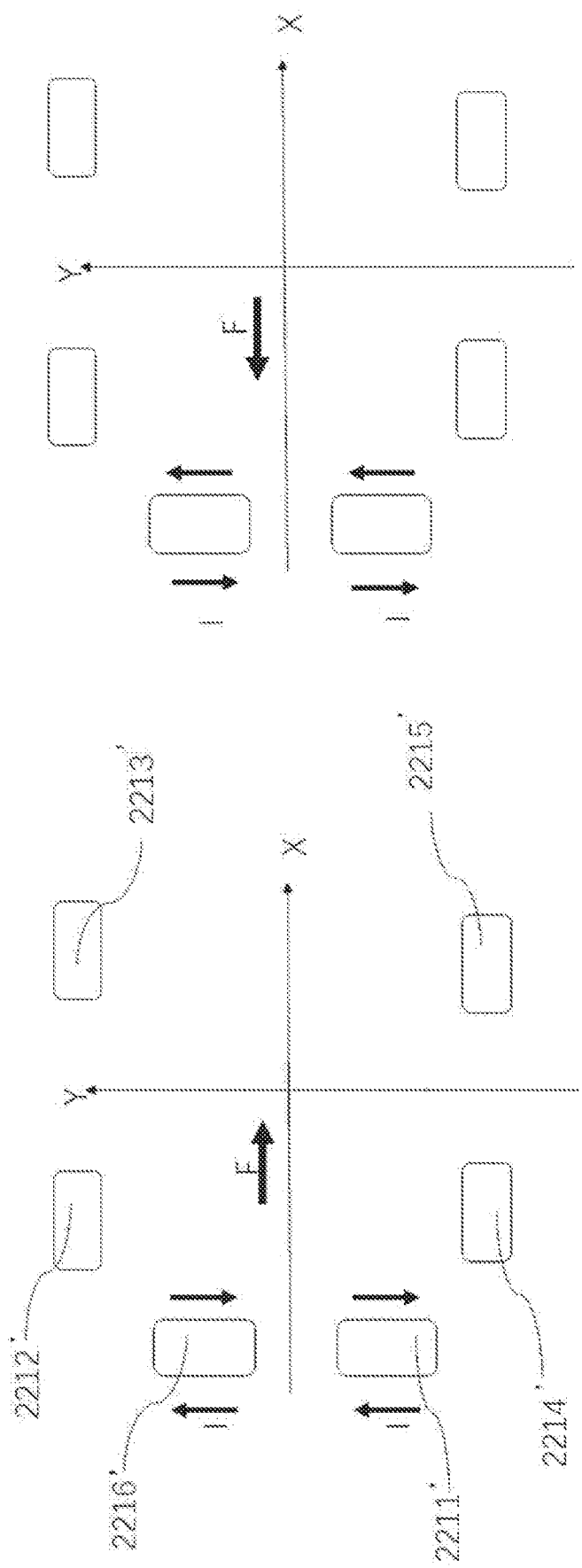
FIG. 28 is a schematic view showing that a driving device compensates for movement along X-axis direction movement according to another preferred embodiment of the present disclosure.
Figure 29:
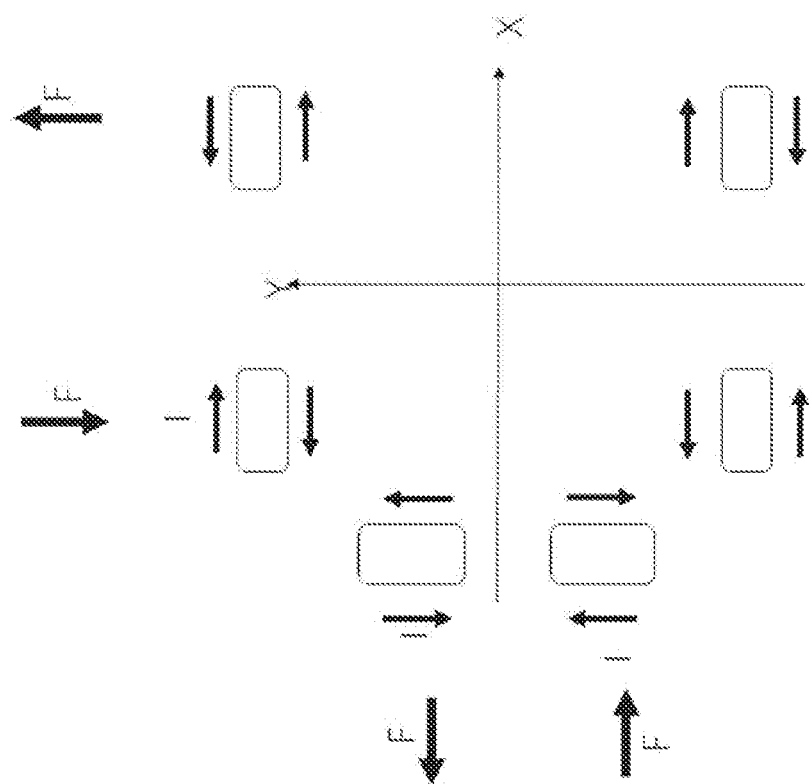
FIG. 29 is a schematic view of showing that a driving device compensates for rotation along optical axis according to the preferred embodiment of the present disclosure.
Figure 29:
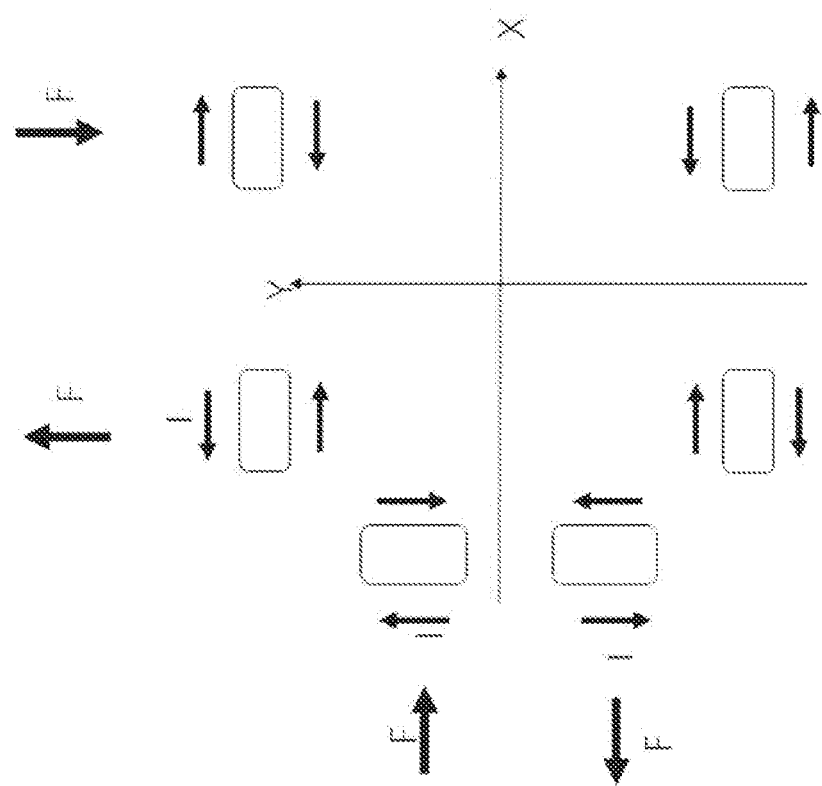

As shown in FIGS. 28 and 29, a driving device according to another embodiment of the present disclosure is illustrated in the following description. Different from the above-mentioned embodiment, in the preferred embodiment of the present disclosure, the number of vibration compensation coils along the X-axis direction is two, and the vibration compensation coils in the X-axis direction and the vibration compensation coils in the Y-axis direction can be energized simultaneously during the RZ-direction anti-vibration, so as to realize the RZ anti-vibration effect with a larger travel.

In detail, the vibration compensation coil 221' further includes a sixth vibration compensation coil unit 2216', wherein the first vibration compensation coil unit 2211' and the sixth vibration compensation coil unit 2216' are disposed outside the vibration compensation substrate 223' and on the other side corresponding to the focusing coil 121'. The first vibration compensation coil unit 2211' and the sixth vibration compensation coil unit 2216' are disposed symmetrically based on the X-axis direction.

As shown in FIG. 28, in a case where the lens is to compensate in the X-axis direction, that is, in a case where the imaging assembly needs to be controlled to translate in the X-axis positive direction (right side of the X-axis), current in the clockwise direction is introduced to the first vibration compensation coil unit 2211' and the sixth vibration compensation coil unit 2216'. The first vibration compensation coil unit 2211' and the sixth vibration compensation coil unit 2216' interact with the first vibration compensation magnet group 2221a, so that the first vibration compensation coil unit 2211' and the sixth vibration compensation coil unit 2216' are subjected to a positive force along the X-axis, and the first vibration compensation coil unit 2211' and the sixth vibration compensation coil unit 2216' drive the imaging assembly to move positively (right) along the X-axis through the vibration compensation base 21'. Conversely, in a case where a counterclockwise current is supplied to the first vibration compensation coil unit 2211' and the sixth vibration compensation coil unit 2216', the first vibration compensation coil unit 2211' and the sixth vibration compensation coil unit 2216' are subjected to a negatively (left) force along the X-axis, and the first vibration compensation coil unit 2211' and the sixth vibration compensation coil unit 2216' drive the imaging assembly to move negatively (left) along the X-axis through the vibration compensation base 21' to realize optical anti-vibration in the X-axis direction.

As shown in FIG. 29, in a case where the lens is to compensate for optical axis rotation, that is, in a case where it is necessary to control the imaging assembly to realize RZ clockwise rotation about the Z axis, the sixth, third and fourth vibration compensation coil units 2216'. 2213' and 2214' are supplied with clockwise currents, and the first, second and fifth vibration compensation coil units 2211'. 2212' and 2215' are supplied with counterclockwise currents. The third vibration compensation coil unit 2213', the fifth vibration compensation coil unit 2215' are subjected to a negative force along the Y axis, the second vibration compensation coil unit 2212' and the fourth vibration compensation coil unit 2214' are subjected to a positive force along the Y axis, the first vibration compensation coil unit 2211' is subjected to a negative force along the X axis, and the sixth vibration compensation coil unit 2216' is subjected to a positive force along the X axis, thereby forming a torsional force. The vibration compensation coil 221' drives the imaging assembly to rotate clockwise around the optical axis through the vibration compensation base 21' to realize anti-vibration in the RZ direction.

Conversely, in a case where it is necessary to control the imaging assembly to realize RZ counterclockwise rotation about the Z axis, the sixth, third, and fourth vibration compensation coil units 2216'. 2213', and 2214' are supplied with counterclockwise currents, and the first, second, and fifth vibration compensation coil units 2211', 2212', and 2215' are supplied with clockwise currents. The third vibration compensation coil unit 2213', the fifth vibration compensation coil unit 2215' are subjected to a positive force along the Y axis, the second vibration compensation coil unit 2212' and the fourth vibration compensation coil unit 2214' are subjected to a negative force along the Y axis, the first vibration compensation coil unit 2211' is subjected to a positive force along the X axis, and the sixth vibration compensation coil unit 2216' is subjected to a negative force along the X axis, thereby forming a torsional force. The vibration compensation coil 221' drives the imaging assembly to rotate counterclockwise around the optical axis through the vibration compensation base 21' to realize anti-vibration in the RZ direction.

Figure 23:
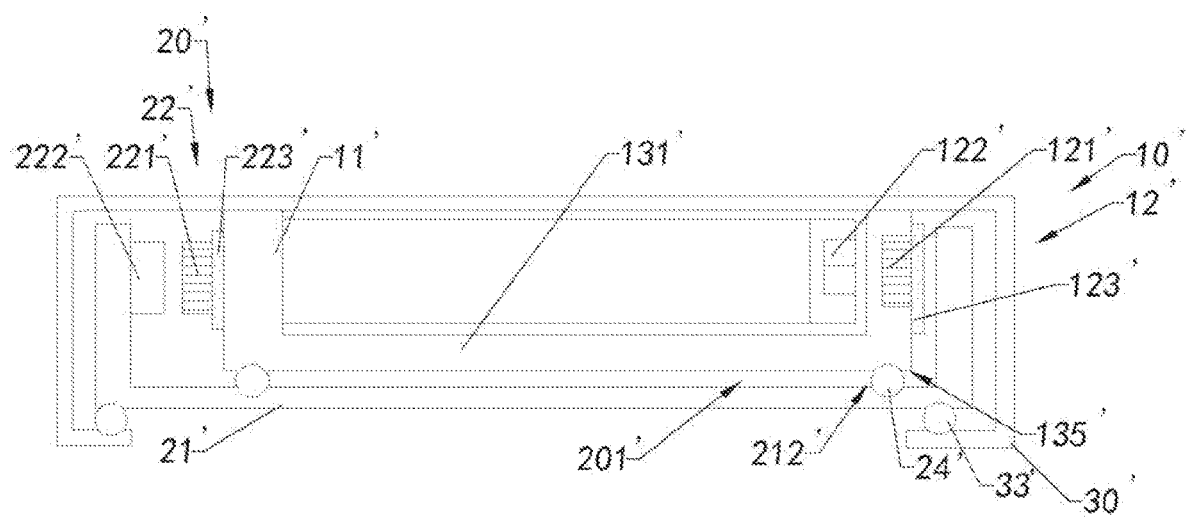
FIG. 23 is another cross-sectional view of the driving device along the optical axis direction according to the preferred embodiment of the present disclosure.

A driving device according to another aspect of the present disclosure is illustrated in the following description with reference to FIG. 23 of the drawings of the specification of the present disclosure. Since the vibration compensation base 21' is supported by the bottom frame 32', the above embodiment is different in that the outer frame 30' of the driving device further includes at least one frame roller 33', wherein the frame roller 33' is disposed between the bottom frame 32' and the vibration compensation base 21' so as to reduce the friction between the bottom frame 32' and the vibration compensation base 21' by the frame roller 33'. It can be understood that the frame rollers 33' are employed to support the distance between the vibration compensation base 21' and the bottom frame 32' and to reduce friction by rolling friction.

The four corners of the bottom of the vibration compensation base 21' have four grooves with openings facing down, and four corners of the support portion of the bottom frame 32' also have four grooves with openings facing up. The grooves of the vibration compensation base 21' are corresponding to the grooves of the bottom frame 32' to form a roller movement space for receiving and restricting the frame rollers 33'.

Figure 34:
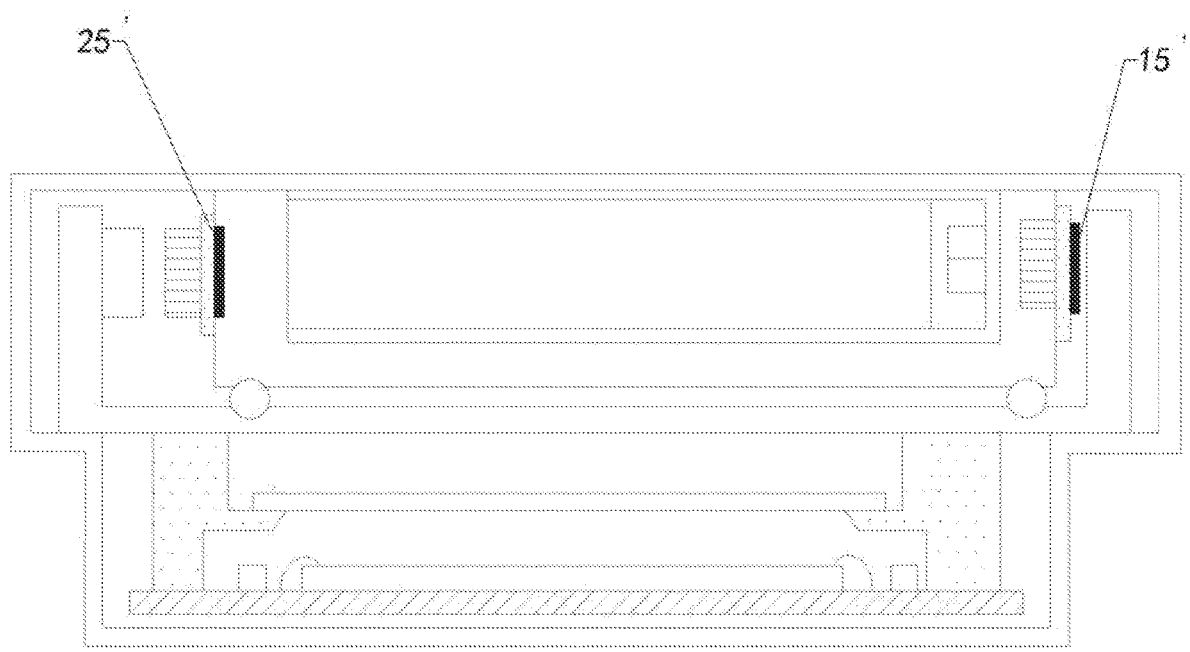
FIG. 34 is another cross-sectional view of the camera module along the optical axis direction according to the preferred embodiment of the present disclosure.

As shown in FIG. 34, the auto-focus assembly 10' of the driving device further includes a focusing yoke 15', wherein the focusing yoke 15' is disposed on the focusing substrate 123' and on the corresponding side of the focusing coil 121'. The focusing yoke 15' is corresponding to the focusing magnet 122' of the auto-focus assembly 10'. The focusing yoke 15' can generate a magnetic force with the focusing magnet 122', and the auto-focus assembly 10' is pulled in the direction of the focusing yoke 15' by the magnetic force. In short, the focusing yoke 15' can reset the auto-focus assembly 10' by magnetic force.

Specifically, in a case where the focusing coil 121' is energized by applying a driving signal, the electromagnetic interaction between the focusing coil 121' and the focusing magnet 122' generates a driving force in the Z-axis direction. The focusing base 11' can be moved in the Z-axis direction by a driving force, and in a case where the driving signal of the focusing coil 121' is stopped, the focusing base 11' can be returned to an initial position by a magnetic force between the focusing magnet 122' and the focusing yoke 15'. It can be understood that the initial position refers to the position of the focusing base 11' before the driving signal is applied to the focusing coil 121'.

The optical image stabilization assembly 20' of the driving device further includes at least one anti-vibration yoke 25', wherein the anti-vibration yoke 25' is disposed on the fixed base 13' and is disposed back-to-back with the vibration compensation coil 221' relative to the vibration compensation substrate 223'. The anti-vibration yoke 25' may generate a magnetic force with the vibration compensation magnet 222' by which the optical image stabilization assembly 20' is pulled in the direction of the anti-vibration yoke 25'. In short, the anti-vibration yoke 25' resets the optical image stabilization assembly 20' by magnetic force action.

In a case where the vibration compensation coil 221' is energized by applying a driving signal, the electromagnetic interaction between the vibration compensation coil 221' and the vibration compensation magnet 222' generates a driving force rotating in a direction perpendicular to and/or about the optical axis. The vibration compensation base 21' can be moved in a direction perpendicular to and/or rotated about the optical axis under the action of a driving force, and in a case where the driving signal of the vibration compensation coil 221' is stopped, the vibration compensation base 21' can be returned to an initial position by a magnetic force between the vibration compensation magnet 222' and the anti-vibration yoke 25'. It is worth to mention that the number of the anti-vibration yokes 25' can be one or more pieces and the present disclosure is not limited.

In other embodiments of the present disclosure, the anti-vibration yoke 25' can be integrally molded in an insert molding manner on the fixed base 13', and the position of the anti-vibration yoke 25' is corresponding to the position of the vibration compensation magnet 222'. With the embedded molding mode, the space occupied by the anti-vibration yoke 25' in the driving device can be reduced, which is beneficial to reducing the size of the driving device.

Figure 30:
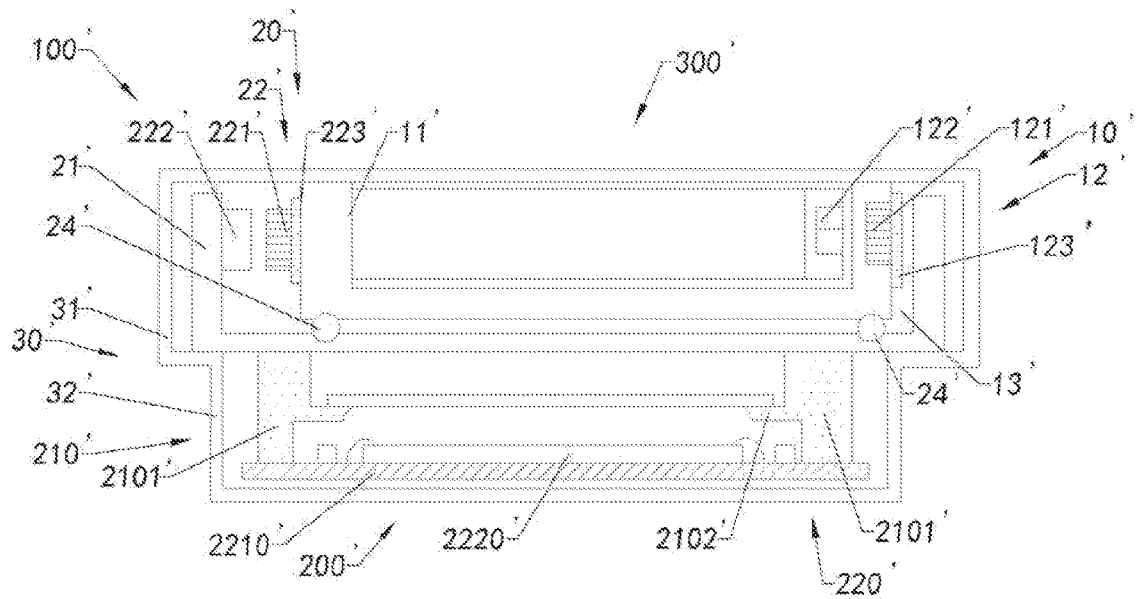
FIG. 30 is a cross-sectional view of a camera module along the optical axis direction according to a preferred embodiment of the present disclosure.

A camera module according to a preferred embodiment of the present disclosure is illustrated in the following description with reference to FIGS. 30 to 32 of the drawings in the specification of the present disclosure. The camera module includes a driving device 100', an imaging assembly 200' and a lens 300', wherein the driving device 100' can be implemented as the driving device described in any of the above preferred embodiments, and the specific structure of the driving device 100' is not described here. The imaging assembly 200' and the lens 300' are provided at the driving device 100', wherein the lens 300' is provided at the auto-focus assembly 10' of the driving device 100', and the movement of the lens 300' is driven by the auto-focus assembly 10' to realize the auto-focus of the lens 300'. The driving device 100' is disposed on the upper end of the imaging assembly 200', and the optical image stabilizing assembly 20' of the driving device 100' is connected to the imaging assembly 200' in a transmission manner, wherein the optical image stabilizing assembly 20' can drive the imaging assembly 200' to move, so as to realize the optical image stabilization of the imaging module.

It is worth to mention that in the preferred embodiment of the present disclosure, the lens 300' is arranged on the focusing base 11' by means of glue buckle or thread or the like. In other alternative embodiments of the present disclosure, the focusing base 11' can be implemented as a barrel of the lens in which components such as optical lenses of the lens 300' are disposed within the focusing base 11'. In other words, optionally, the lens 300' and the focusing base 11' of the auto-focus assembly 10' of the driving device 100' are integrated.

In detail, the imaging assembly 200' includes a filter assembly 210' and a circuit board assembly 220', wherein the circuit board assembly 220' is disposed below the filter assembly 210' along the optical axis direction. The filter assembly 210' of the imaging assembly 200' is fixed to the optical image stabilization assembly 20', and the optical image stabilization assembly 20' drives the filter assembly 210' of the imaging assembly 200' and the circuit board assembly 220' for optical image stabilization.

The filter assembly 210' includes a filter holder 2110' and at least one filter 2120' mounted on the filter holder 2110'.

The circuit board assembly 220' includes a circuit board 2210', at least one photosensitive chip 2220' and at least one electronic component 2230' mounted on the surface of the circuit board 2210', wherein the electronic component 2230' is located outside the photosensitive chip 2220'. Further, the filter holder 2110' includes a lens base 2101' and a supporting portion 2102', wherein the supporting portion 2102' is extended from the lens base 2101' and is employed to attach the filter 2120' to the supporting portion 2102'. The driving device 100' is mounted on the top surface of the lens base 2101'.

It is worth to mention that, in the preferred embodiment of the present disclosure, the optical image stabilization assembly 20' can achieve optical image stabilization by driving the entire imaging assembly 200', wherein the circuit board 2210' is transmissibly connected to the vibration compensation base 21' of the optical image stabilization assembly 20', i.e. in a case where the vibration compensation coil 221' of the optical image stabilization assembly 20' is energized, the circuit board 2210' of the imaging assembly 200' is driven by the vibration compensation base 21' to move or rotate in a specific direction to achieve optical image stabilization. It is worth to mention that in the preferred embodiment of the present disclosure the imaging assembly 200' is received in the outer frame 30'. It is worth to mention that the photosensitive chip 2220' is received in the outer frame 30', which improves the sealing property of the photosensitive chip 2220' and ensures that the imaging of the photosensitive chip is not affected by dust during the manufacture or use of the camera module.

Preferably, the top portion of the lens base 2101' is connected in a transmission manner to the vibration compensation base 21', and since the vibration compensation base 21' is supported by the four supporting corners 322' of the bottom frame 32', four sides of the vibration compensation base 21' can be exposed to be connected to the lens base 2101'.

Figure 31:
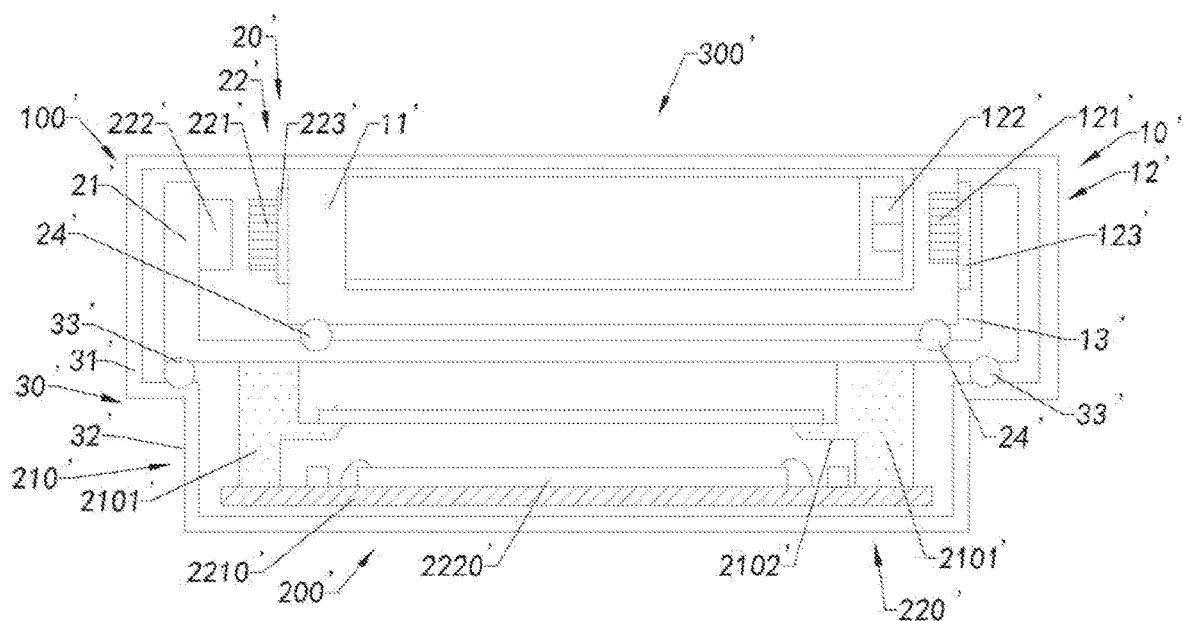
FIG. 31 is another cross-sectional view of the camera module along the optical axis direction according to the preferred embodiment of the present disclosure.
Figure 32:
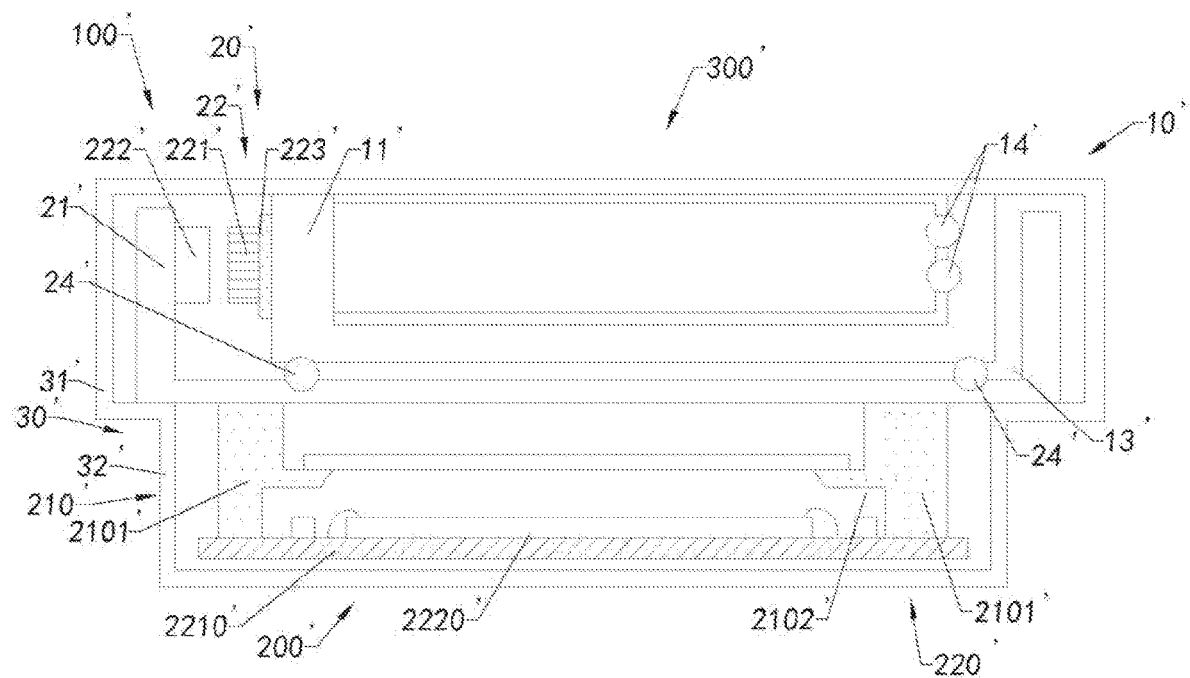
FIG. 32 is another cross-sectional view of the camera module along the optical axis direction according to the preferred embodiment of the present disclosure.

As shown in FIGS. 31 and 32, the anti-vibration roller 24' is located between the vibration compensation base 21' and the fixed base 13', and the frame roller 33' is located between the vibration compensation base 21' and the bottom frame 32'. In a case where the vibration compensation coil 221' is energized, the vibration compensation coil 221' interacts with the vibration compensation magnet 222' to generate a force perpendicular to and/or rotation around the optical axis direction, and drives the vibration compensation base 21' to drive the imaging assembly 200' to move in a direction perpendicular to and/or around the optical axis direction to realize optical image stabilization. The vibration compensation base 21' can be supported by the anti-vibration rollers 24' and the frame rollers 33' and a friction force generated during optical image stabilization is reduced.

Figure 33:
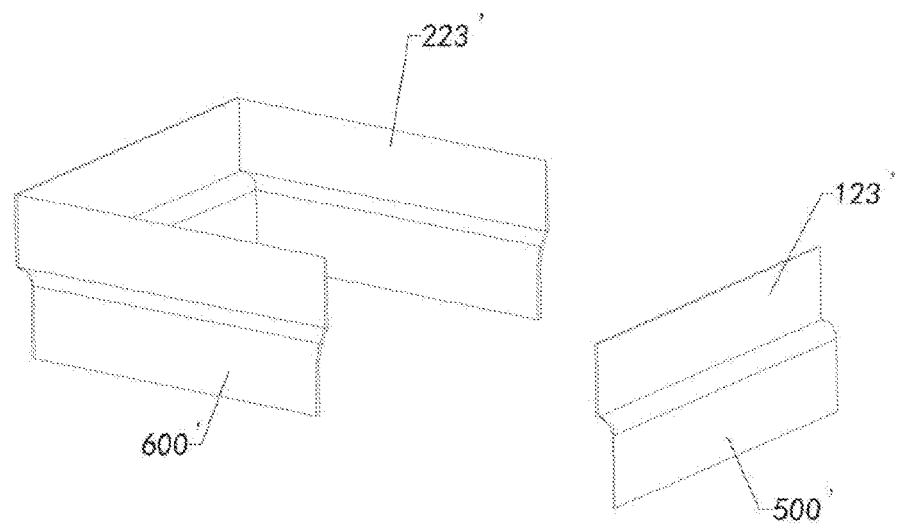
FIG. 33 is a structural schematic view of the conduction of an imaging module according to a preferred embodiment of the present disclosure.

As shown in FIG. 33 of the drawings of the present specification, the conduction of the auto-focus assembly 10' and the optical image stabilization assembly 20' of the driving device 100' of the camera module are illustrated. In the embodiment of the present disclosure, the focusing substrate 123' and the vibration compensation substrate 223' are in separate structure, and the focusing substrate 123' is in a vertical structure, and the vibration compensation substrate 223' is in a horizontal structure. The focusing substrate 123' and the vibration compensation substrate 223' are arranged around the outer periphery of the fixed base 13'. Preferably, the focusing substrate 123' and the vibration compensation substrate 223' are implemented as a flexible board circuit FPC.

The camera module further includes a first connecting belt 500' and a second connecting belt 600', wherein the focusing substrate 123' is electrically connected to the circuit board 2210' of the imaging assembly 200' by the first connecting belt 500', and the vibration compensation substrate 223' is electrically connected to the circuit board 2210' of the imaging assembly 200' by the second connecting belt 600'. Preferably, the first connecting belt 500' and the second connecting belt 600' are flexible board circuits (FPC).

It is understood that the number of the second connecting belts 600' can be one to three, and the plane in which the second connecting belts 600' are located along the optical axis direction is not the same as the plane in which the first connecting belt 500' is located along the optical axis direction to avoid causing electromagnetic interference.

It will be understood by those skilled in the art that the embodiments of the present disclosure shown in the above description and the appended drawings are by way of example only and are not limiting to the present disclosure. The object of the present disclosure has been fully and effectively achieved. The functional and structural principles of the present disclosure have been shown and explained in the embodiments, and the embodiments of the present disclosure may be modified or modified without departing from the said principles.

What is claimed is:

1. A driving device, comprising:
an auto-focus assembly, wherein the auto-focus assembly includes a focusing base, a focusing actuator and a fixed base, wherein the focusing actuator includes at least one focusing coil and at least one focusing magnet disposed on an outer sidewall of the focusing base, and the focusing coil is supported by the fixed base and corresponds to the focusing magnet so as to drive the focusing base to move; and
an optical image stabilization assembly, wherein the optical image stabilization assembly includes a vibration compensation base and a vibration compensation actuator, wherein the vibration compensation actuator includes at least one vibration compensation coil and at least one vibration compensation magnet supported on the bottom of the fixed base, wherein the vibration compensation coil is disposed on the vibration compensation base and corresponding to the vibration compensation magnet for driving the vibration compensation base to move, wherein the position of the vibration compensation actuator is not on the same side of the fixed base as the position of the focusing actuator of the auto-focus assembly, wherein the focusing actuator further includes a focusing substrate, and the focusing coil is electrically connected to the focusing substrate, whereby the focusing substrate is electrically connected to the focusing coil to the imaging assembly, wherein the fixed base includes a base plate and at least one supporting sidewall integrally extended upward from the outer side of the base plate, the fixed base is further provided with an actuator mounting portion, the actuator mounting portion is formed on the supporting sidewall, the focusing coil is disposed on the actuator mounting portion of the fixed base, and the focusing substrate is attached to the supporting sidewall.

2. A driving device, comprising:
an auto-focus assembly, wherein the auto-focus assembly includes a focusing base, a focusing actuator and a fixed base, wherein the focusing actuator includes at least one focusing coil and at least one focusing magnet disposed on an outer sidewall of the focusing base, and the focusing coil is supported by the fixed base and corresponds to the focusing magnet so as to drive the focusing base to move; and an optical image stabilization assembly, wherein the optical image stabilization assembly includes a vibration compensation base and a vibration compensation actuator, wherein the vibration compensation actuator includes at least one vibration compensation coil and at least one vibration compensation magnet supported on the bottom of the fixed base, wherein the vibration compensation coil is disposed on the vibration compensation base and corresponding to the vibration compensation magnet for driving the vibration compensation base to move, wherein the position of the vibration compensation actuator is not on the same side of the fixed base as the position of the focusing actuator of the auto-focus assembly, wherein the focusing actuator further includes a focusing substrate, and the focusing coil is electrically connected to the focusing substrate, whereby the focusing substrate is electrically connected to the focusing coil to the imaging assembly, wherein the auto-focus assembly further includes at least one focusing roller unit, at least one roller rail groove is disposed between the focusing base and the fixed base, the focusing roller unit is disposed in the roller rail groove, the distance between the focusing base and the fixed base is supported and maintained by the focusing roller unit, and the movement of the focusing base relative to the fixed base along the optical axis direction is provided.

3. A driving device, comprising:
an auto-focus assembly, wherein the auto-focus assembly includes a focusing base, a focusing actuator and a fixed base, wherein the focusing actuator includes at least one focusing coil and at least one focusing magnet disposed on an outer sidewall of the focusing base, and the focusing coil is supported by the fixed base and corresponds to the focusing magnet so as to drive the focusing base to move; and an optical image stabilization assembly, wherein the optical image stabilization assembly includes a vibration compensation base and a vibration compensation actuator, wherein the vibration compensation actuator includes at least one vibration compensation coil and at least one vibration compensation magnet supported on the bottom of the fixed base, wherein the vibration compensation coil is disposed on the vibration compensation base and corresponding to the vibration compensation magnet for driving the vibration compensation base to move, wherein the position of the vibration compensation actuator is not on the same side of the fixed base as the position of the focusing actuator of the auto-focus assembly, wherein the vibration compensation actuator further includes a vibration compensation substrate, wherein the vibration compensation substrate is electrically connected to the vibration compensation coil of the vibration compensation actuator, wherein the vibration compensation magnet further includes three vibration compensation magnet groups, wherein a vertical plane of the first vibration compensation magnet group is corresponding to a vertical plane of the focusing magnet, and a vertical plane of the second vibration compensation magnet group is corresponding to a vertical plane of the third vibration compensation magnet group and is located on two sides of the first vibration compensation magnet group.

4. The driving device according to claim 3, wherein the vibration compensation coil is disposed on the vibration compensation substrate, wherein the vibration compensation substrate is disposed on the upper surface of the vibration compensation base in a direction perpendicular to the optical axis.

5. The driving device according to claim 4, wherein the optical image stabilization assembly further includes at least one vibration magnetic induction member, the vibration magnetic induction member is electrically connected to the vibration compensation substrate, and the vibration magnetic induction member is disposed face to face with the vibration compensation magnet groups.

6. The driving device according to claim 4, wherein the optical image stabilization assembly further includes at least one anti-vibration roller disposed between the vibration compensation base and the fixed base for supporting and maintaining a distance between the vibration compensation base and the fixed base.

7. A driving device, comprising:
an auto-focus assembly, wherein the auto-focus assembly includes a focusing base, a focusing actuator and a fixed base, wherein the focusing actuator includes at least one focusing coil disposed on a sidewall of the focusing base, and at least one focusing magnet disposed on the focusing base and corresponds to the focusing coil, so as to drive the focusing base to move for auto-focusing; and an optical image stabilization assembly, wherein the optical image stabilization assembly includes a vibration compensation base and a vibration compensation actuator, wherein the vibration compensation actuator includes at least one vibration compensation coil and at least one vibration compensation magnet, wherein the vibration compensation magnet is disposed on at least one sidewall of the vibration compensation base, the vibration compensation coil is supported by the fixed base and corresponds to the vibration compensation magnet to drive the vibration compensation base to move for optical image stabilization, wherein the position of the vibration compensation actuator is not on the same side of the fixed base as the position of the focusing actuator of the auto-focus assembly, wherein the focusing actuator further includes a focusing substrate, wherein the focusing coil is electrically connected to the focusing substrate, wherein the focusing substrate is disposed on an outer sidewall of the fixed base.

8. The driving device according to claim 7, wherein the fixed base includes a base plate and at least one supporting sidewall integrally extended upward from the outer side of the base plate, the fixed base is further provided with an actuator mounting portion, the actuator mounting portion is formed on the supporting sidewall, the focusing coil is disposed on the actuator mounting portion of the fixed base, and the focusing substrate is attached to the supporting sidewall.

9. The driving device according to claim 8, wherein the auto-focus assembly further includes at least one focusing roller unit, at least one roller rail groove is disposed between the focusing base and the fixed base, the focusing roller unit is disposed in the roller rail groove, the distance between the focusing base and the fixed base is supported and maintained by the focusing roller unit, and the movement of the focusing base relative to the fixed base along the optical axis direction is provided.

10. The driving device according to claim 7, wherein the vibration compensation actuator further includes a vibration compensation substrate, wherein the vibration compensation substrate is electrically connected to the vibration compensation coil of the vibration compensation actuator.

11. The driving device according to claim 10, wherein the fixed base has a first outer sidewall, a second outer sidewall, a third outer sidewall and a fourth outer sidewall, the focusing coil is disposed on the first outer sidewall of the fixed base, and the vibration compensation substrate is disposed on the second outer sidewall, the third outer sidewall and the fourth outer sidewall of the fixed base.

12. The driving device according to claim 11, wherein the vibration compensation coil and the focusing coil are located on a sidewall of the fixed base.

13. The driving device according to claim 11, wherein the vibration compensation magnet further includes three vibration compensation magnet groups, wherein the first vibration compensation magnet group faces the second lateral wall of the fixed base, the second vibration compensation magnet group faces the third lateral wall of the fixed base, and the third vibration compensation magnet group faces the fourth lateral wall of the fixed base.

* * * * *